(12) United States Patent
Panigot

(10) Patent No.: US 10,059,357 B2
(45) Date of Patent: Aug. 28, 2018

(54) COLLAPSIBLE UTILITY CART

(71) Applicant: Sunny Fold, LLC, Germantown, MD (US)

(72) Inventor: Joseph E. Panigot, Germantown, MD (US)

(73) Assignee: Sunny Ford, LLC, Germantown, MD (US)

(*) Notice: Subject to any disclaimer, the term of this patent is extended or adjusted under 35 U.S.C. 154(b) by 0 days.

(21) Appl. No.: 15/427,112

(22) Filed: Feb. 8, 2017

(65) Prior Publication Data

US 2017/0166230 A1    Jun. 15, 2017

Related U.S. Application Data

(60) Division of application No. 14/840,251, filed on Aug. 31, 2015, now Pat. No. 9,598,095, which is a continuation of application No. 14/037,448, filed on Sep. 26, 2013, now Pat. No. 9,150,230.

(60) Provisional application No. 61/705,753, filed on Sep. 26, 2012.

(51) Int. Cl.
    *B62B 3/02*       (2006.01)
    *B62B 1/20*       (2006.01)

(52) U.S. Cl.
    CPC .............. *B62B 3/022* (2013.01); *B62B 1/208* (2013.01); *B62B 3/027* (2013.01); *B62B 2205/02* (2013.01); *B62B 2205/06* (2013.01)

(58) Field of Classification Search
    CPC .... B62B 1/00; B62B 1/02–1/045; B62B 1/10; B62B 1/12; B62B 1/18; B62B 1/20; B62B 1/208
    See application file for complete search history.

(56) References Cited

U.S. PATENT DOCUMENTS

| | | |
|---|---|---|
| 2,757,937 A | 8/1956 | Illsley |
| 3,043,603 A | 7/1962 | Major, Sr. |
| 3,147,748 A | 9/1964 | Frank |
| 3,166,339 A | 1/1965 | Earley |
| 3,227,467 A | 1/1966 | Fugitt, Sr. |
| 3,400,943 A | 9/1968 | Meiklejohn |
| 3,424,474 A | 1/1969 | Karnow et al. |
| 3,962,853 A * | 6/1976 | Schwalm ............. A01D 75/002 56/228 |
| 4,114,916 A | 9/1978 | Oyama |
| 4,262,928 A | 4/1981 | Leitzel |
| 4,323,260 A | 4/1982 | Suchy |
| 4,355,818 A | 10/1982 | Watts |
| 4,362,307 A | 12/1982 | Nakatani |
| 4,362,309 A | 12/1982 | Stamper |
| 4,376,547 A | 3/1983 | Dominko |
| 4,561,674 A * | 12/1985 | Alessio ..................... B62B 1/20 280/47.21 |
| 4,645,262 A | 2/1987 | Furubotten |

(Continued)

*Primary Examiner* — Erez Gurari
(74) *Attorney, Agent, or Firm* — Edell, Shapiro & Finnan, LLC

(57) ABSTRACT

A cart includes a platform assembly, a handle assembly, first wheel assembly and a second wheel assembly. In use, the cart may folded from a deployed position in which it rolls along a surface to transport items, to a stowed position, in which it is collapsed in a compact geometry for storage. The cart may be further integrated into a chair, chaize lounge, garden cart, bicycle utility cart or a bicycle passenger cart.

18 Claims, 43 Drawing Sheets

(56) References Cited

U.S. PATENT DOCUMENTS

| | | |
|---|---|---|
| 4,671,522 A | 6/1987 | Fragione, Jr. |
| 4,733,905 A | 3/1988 | Buickerood et al. |
| 4,790,559 A | 12/1988 | Edmonds |
| 4,915,408 A | 4/1990 | Clemence et al. |
| 5,072,958 A | 12/1991 | Young |
| 5,106,112 A | 4/1992 | Sargent |
| 5,176,393 A | 1/1993 | Robertson et al. |
| 5,265,892 A | 11/1993 | Said |
| 5,312,006 A | 5/1994 | Lag |
| 5,364,112 A * | 11/1994 | Jackson ............... A47C 7/006 280/30 |
| 5,395,163 A * | 3/1995 | Mandell ............... B60P 1/283 298/2 |
| 5,474,316 A | 12/1995 | Britton |
| 5,667,163 A * | 9/1997 | Sordahl ............... B65H 49/32 242/403.1 |
| 5,692,779 A * | 12/1997 | Hedgepeth ........... B62D 63/062 280/769 |
| 5,885,047 A | 3/1999 | Davis et al. |
| 5,887,879 A | 3/1999 | Chumley |
| 5,979,921 A | 11/1999 | Derven et al. |
| 6,186,520 B1 * | 2/2001 | Barten ............... B62B 1/042 280/30 |
| 6,241,276 B1 * | 6/2001 | Wilburn ............... B62B 1/20 280/47.18 |
| 6,364,596 B1 * | 4/2002 | Spencer ............... B62B 1/12 280/47.18 |
| 6,375,200 B1 | 4/2002 | Harter |
| 6,460,866 B1 | 10/2002 | Altschul et al. |
| 6,471,236 B1 * | 10/2002 | Eskridge ............... B62B 1/12 280/641 |
| 6,471,237 B1 | 10/2002 | Bedsole |
| 6,557,867 B1 * | 5/2003 | Angstadt ............... A01M 31/006 280/30 |
| 6,808,186 B1 * | 10/2004 | Su ............... B60B 37/10 280/47.24 |
| 6,886,836 B1 | 5/2005 | Wise |
| 6,938,905 B1 * | 9/2005 | Tsai ............... B62B 1/002 280/30 |
| 7,017,939 B2 | 3/2006 | Darling, III |
| 7,025,363 B1 * | 4/2006 | Leight ............... B62B 1/10 280/47.131 |
| 7,040,635 B1 | 5/2006 | Remole |
| 7,264,265 B2 | 9/2007 | Shapiro |
| 7,316,407 B1 * | 1/2008 | Elden ............... B62B 1/12 280/124.12 |
| 7,448,632 B1 * | 11/2008 | Nieto ............... B62B 1/006 280/47.18 |
| 7,464,947 B2 | 12/2008 | Cortese |
| 8,474,856 B2 | 7/2013 | Hawkes |
| 8,608,188 B2 | 12/2013 | Goldszer |
| 8,764,046 B2 * | 7/2014 | Baldemor ............... B62B 1/002 280/47.29 |
| 9,050,988 B1 * | 6/2015 | McLeod ............... B62B 3/022 |
| 9,150,230 B2 | 10/2015 | Panigot |
| 2002/0096862 A1 | 7/2002 | Fang |
| 2002/0163163 A1 | 11/2002 | Shapiro |
| 2003/0034636 A1 | 2/2003 | Ng |
| 2004/0046342 A1 | 3/2004 | Lin |
| 2005/0258621 A1 | 11/2005 | Johnson et al. |
| 2006/0061053 A1 | 3/2006 | Cortese |
| 2006/0207831 A1 | 9/2006 | Moore et al. |
| 2007/0194560 A1 | 8/2007 | Zink |
| 2008/0272578 A1 | 11/2008 | Tsai |
| 2008/0314300 A1 * | 12/2008 | Bowsher ............... A01C 17/005 111/11 |
| 2009/0058047 A1 | 3/2009 | Brosh et al. |
| 2010/0078907 A1 * | 4/2010 | Voves ............... B62B 1/12 280/47.24 |
| 2010/0078912 A1 * | 4/2010 | Chang ............... B62B 1/20 280/204 |
| 2010/0308563 A1 | 12/2010 | Martin |
| 2011/0274526 A1 * | 11/2011 | Kusick ............... B62B 1/04 414/457 |
| 2011/0291390 A1 | 12/2011 | Benimeli |
| 2012/0038123 A1 | 2/2012 | Li |
| 2012/0153587 A1 * | 6/2012 | Ryan ............... B62B 1/12 280/47.27 |
| 2012/0160576 A1 * | 6/2012 | Anasiewicz ............... B62B 5/0033 180/19.1 |
| 2012/0160577 A1 * | 6/2012 | Anasiewicz ............... B62D 51/04 180/19.1 |
| 2012/0217727 A1 * | 8/2012 | Lee ............... B62B 1/008 280/652 |
| 2013/0049333 A1 | 2/2013 | Yang |
| 2013/0153322 A1 | 6/2013 | Constin |
| 2014/0097599 A1 | 4/2014 | Panigot |
| 2016/0039441 A1 | 2/2016 | Panigot |

\* cited by examiner

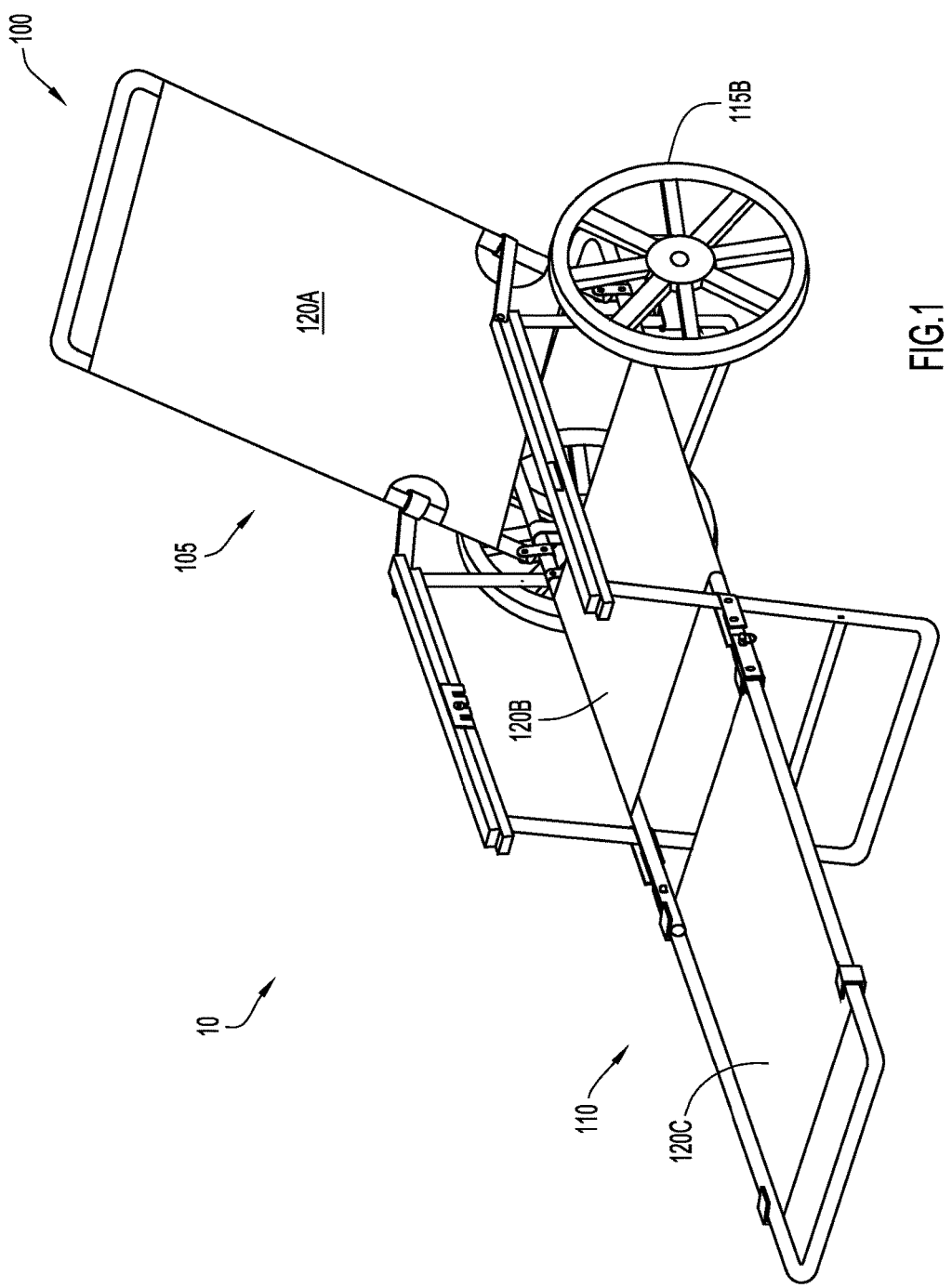

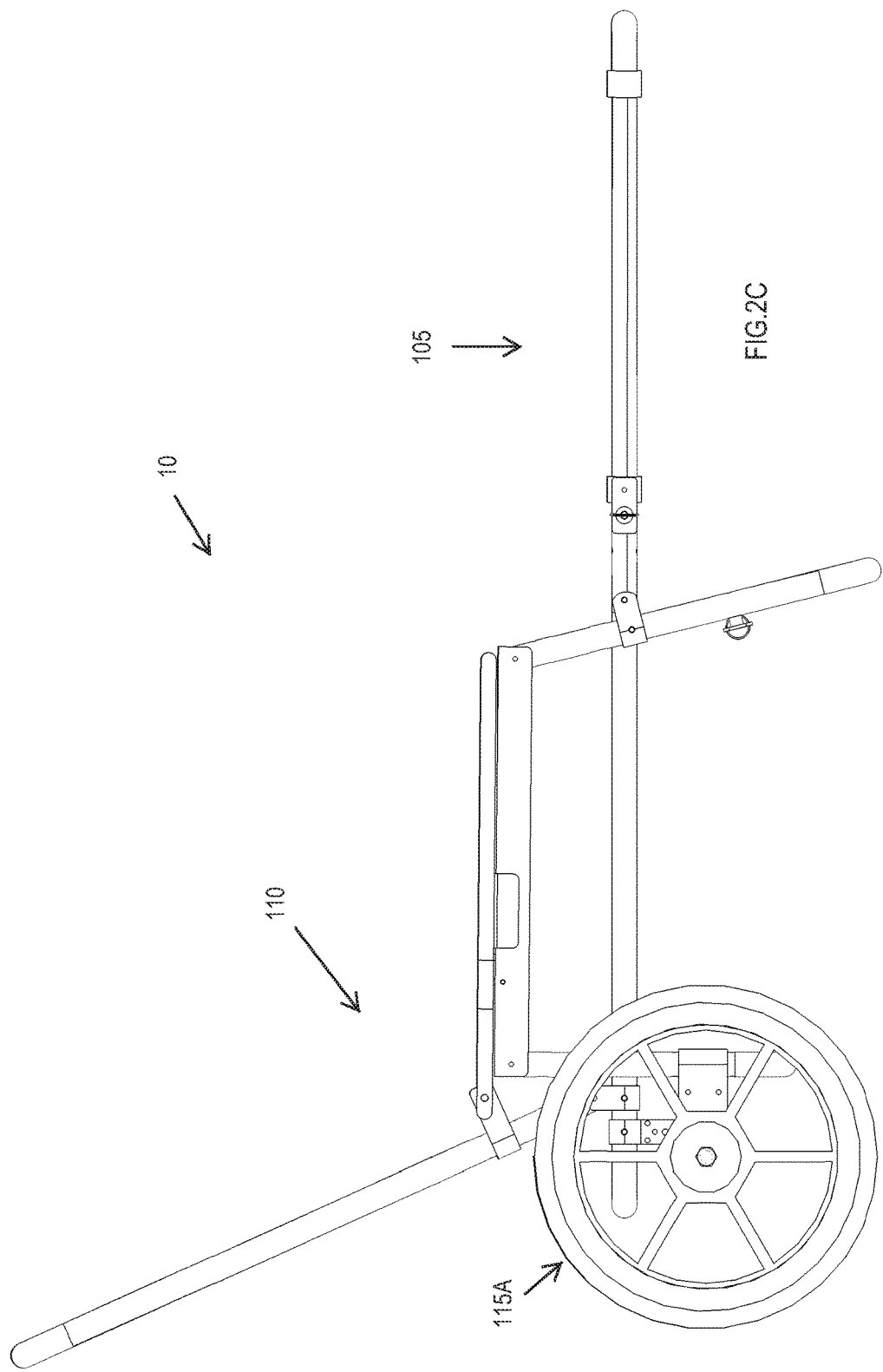

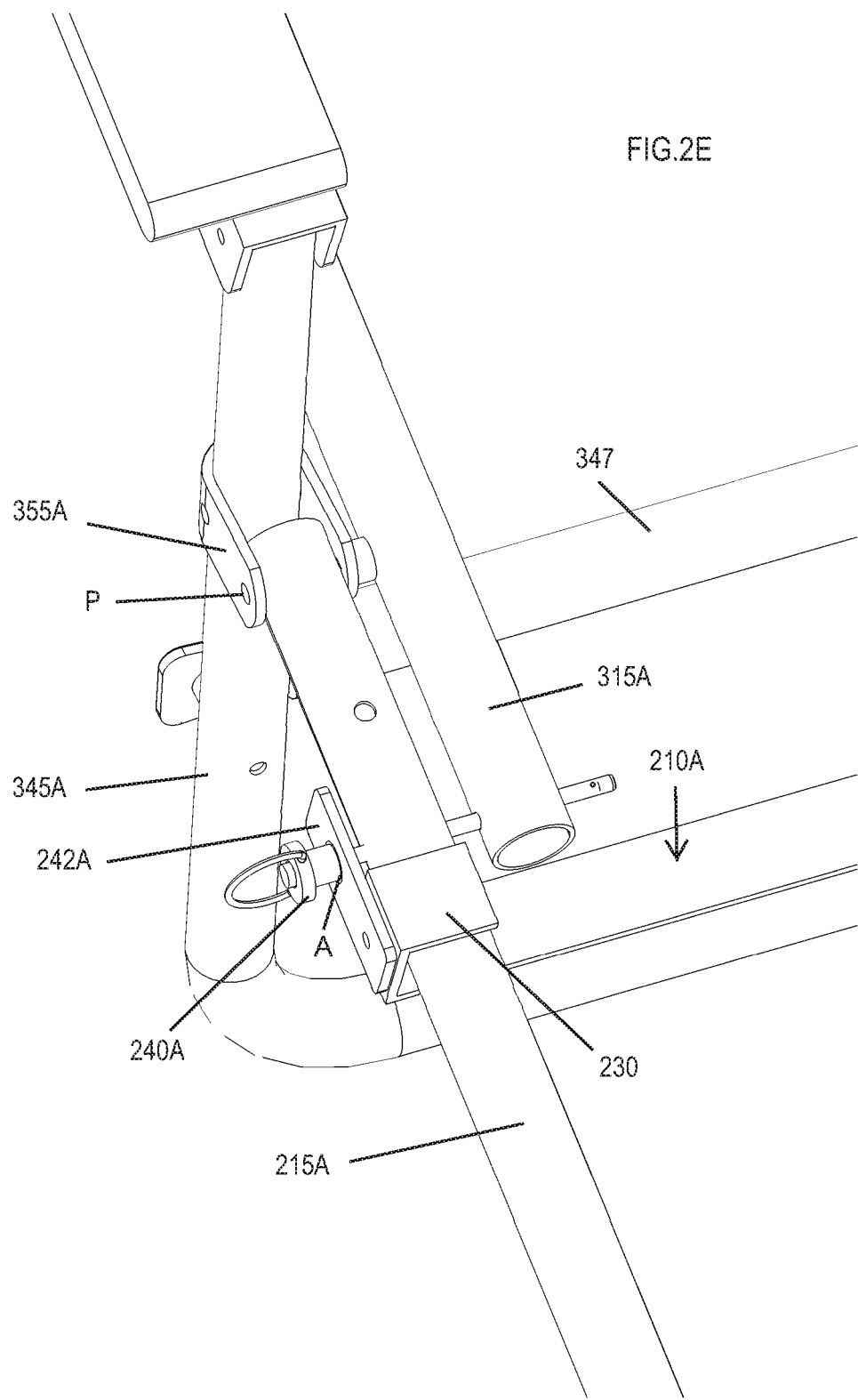

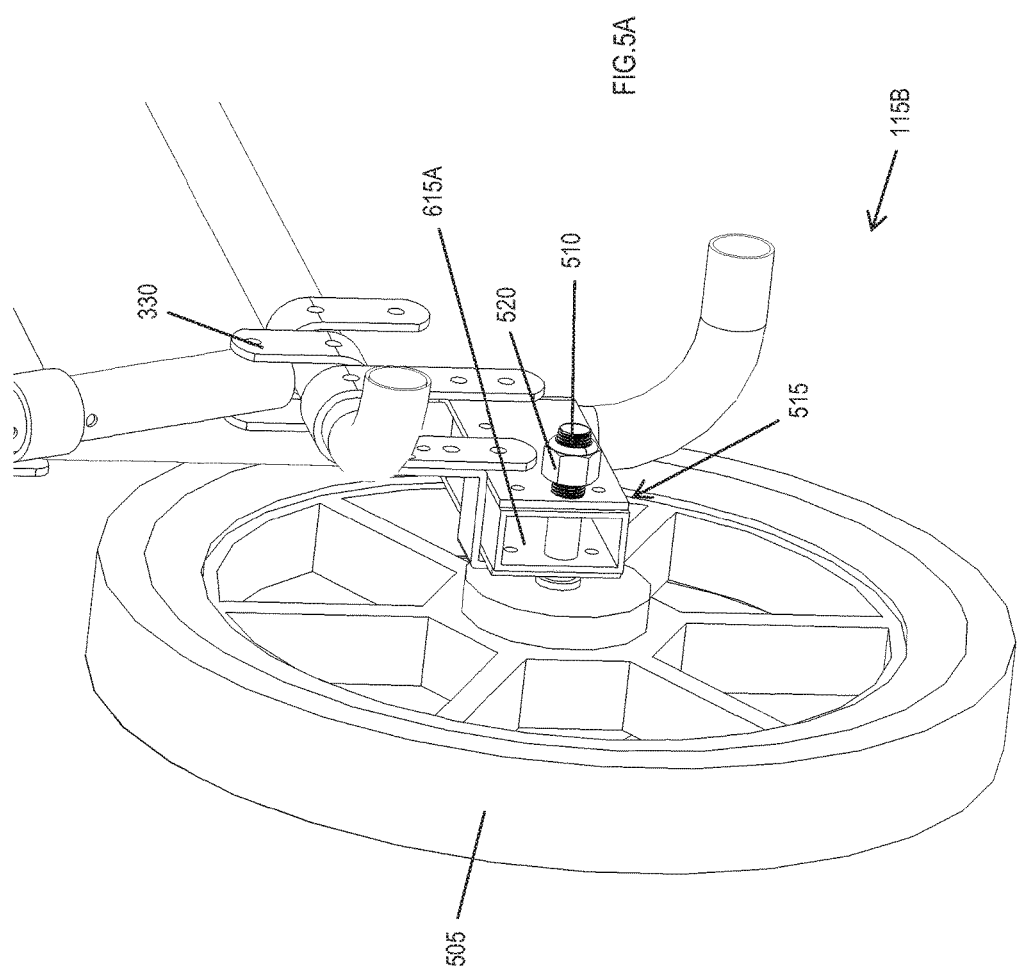

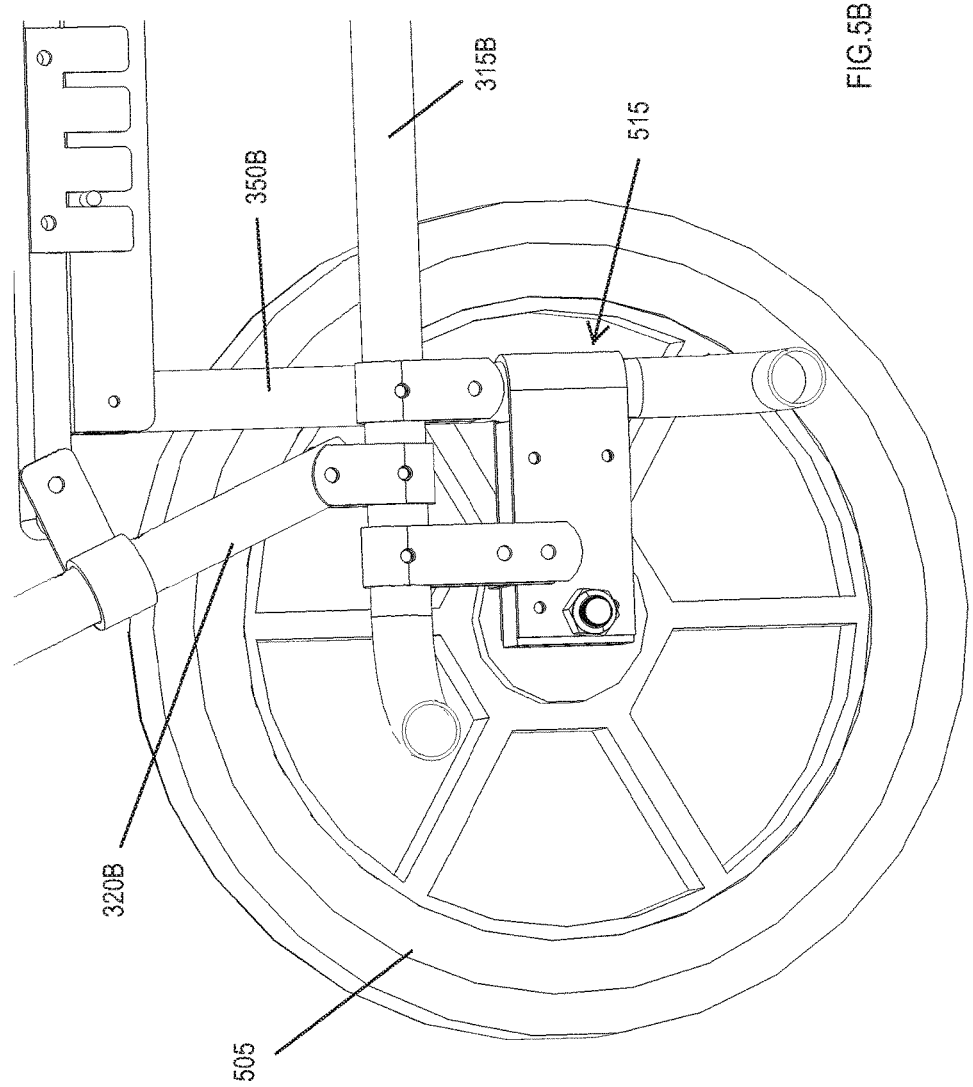

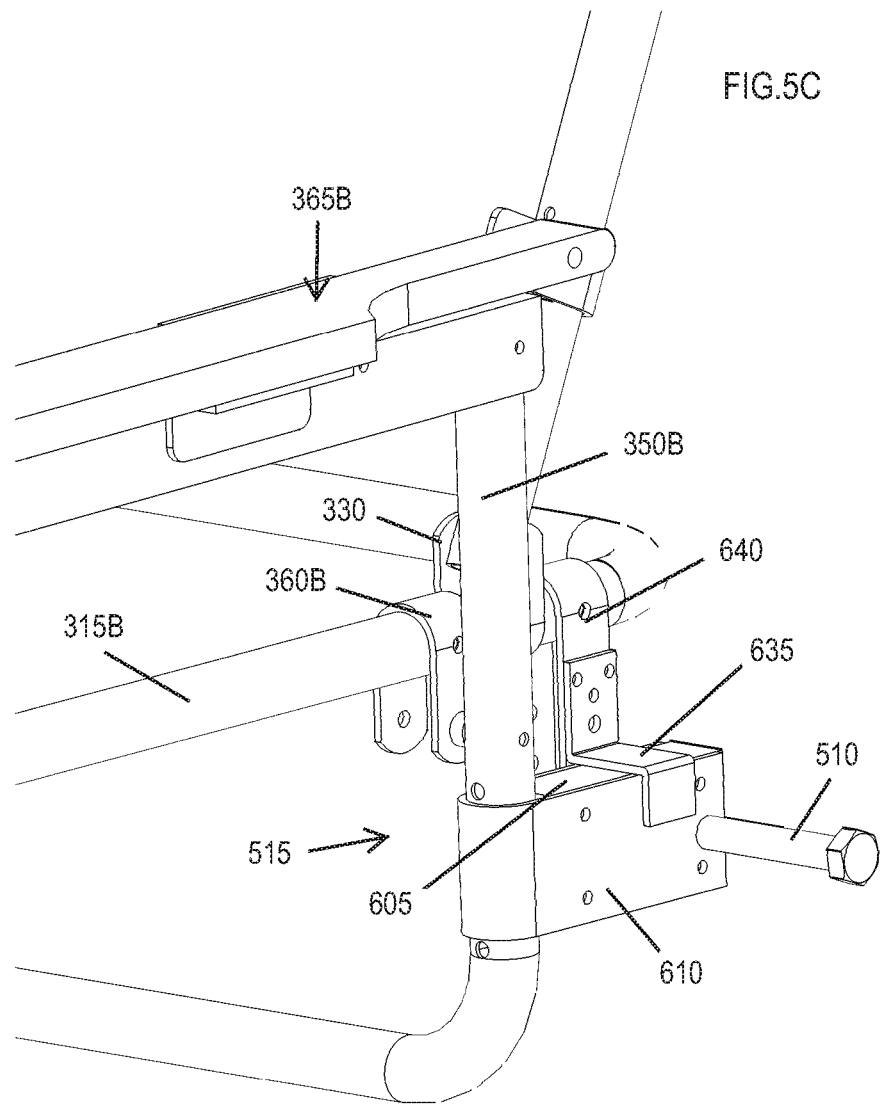

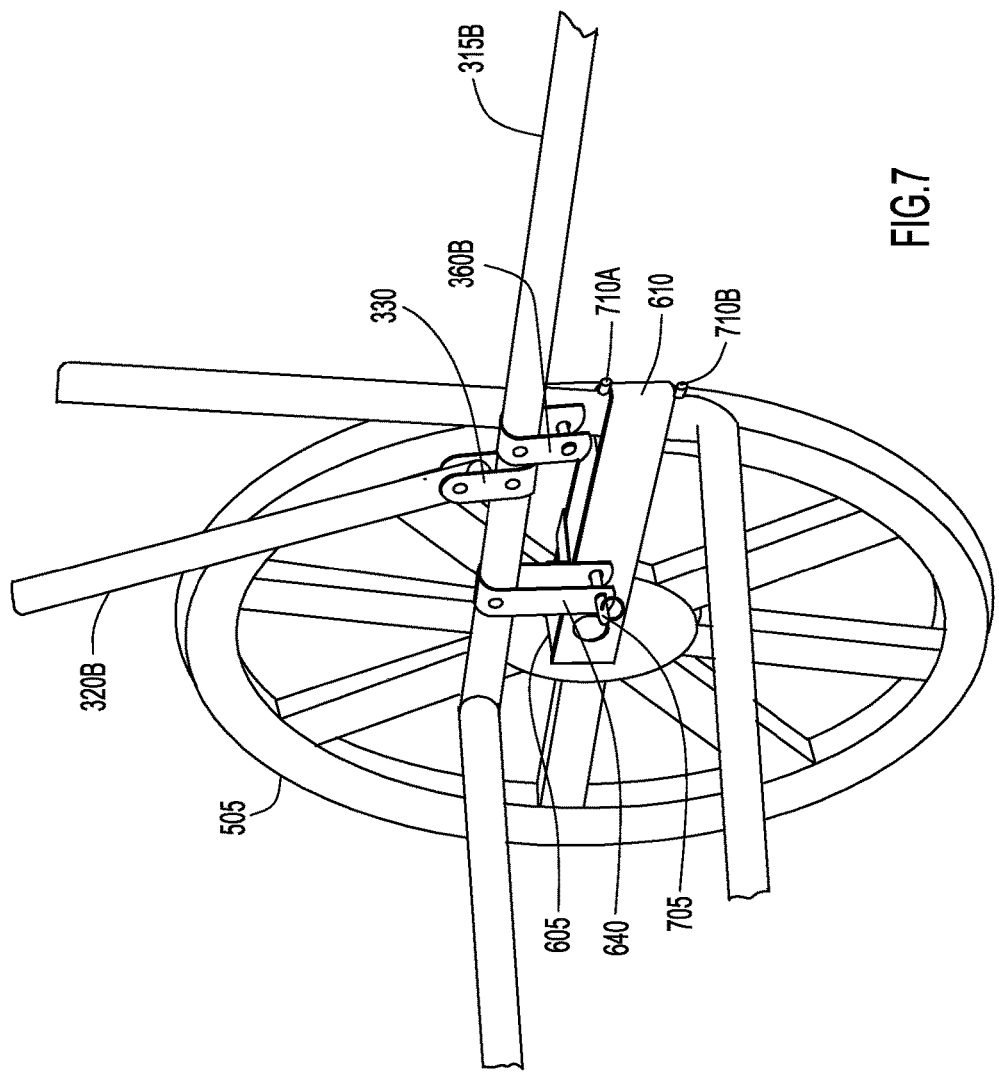

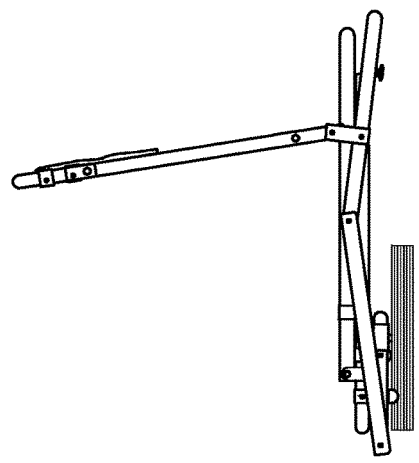
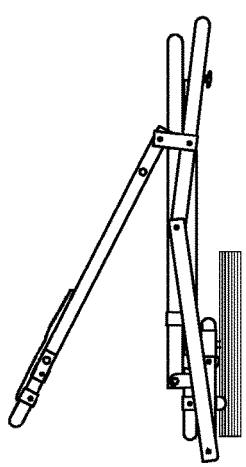
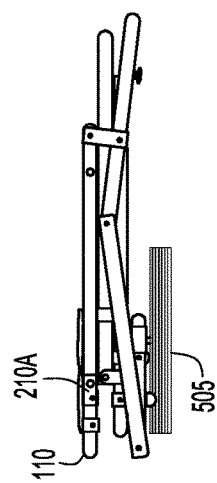
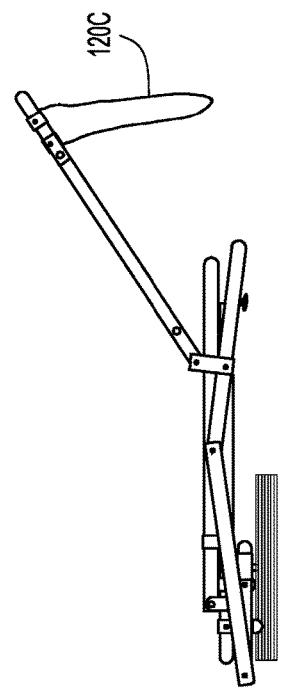
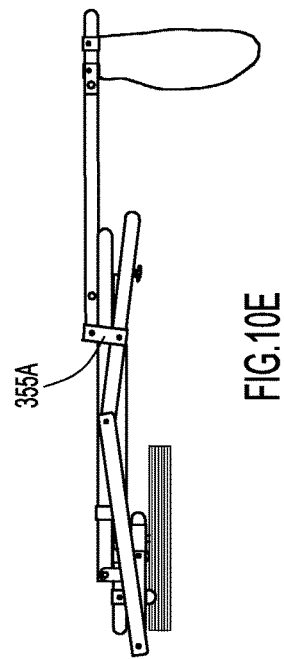

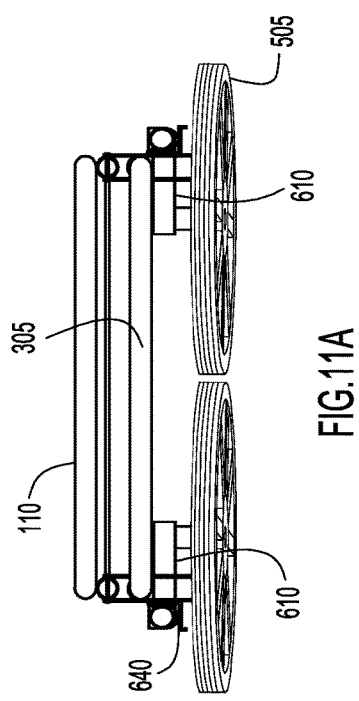
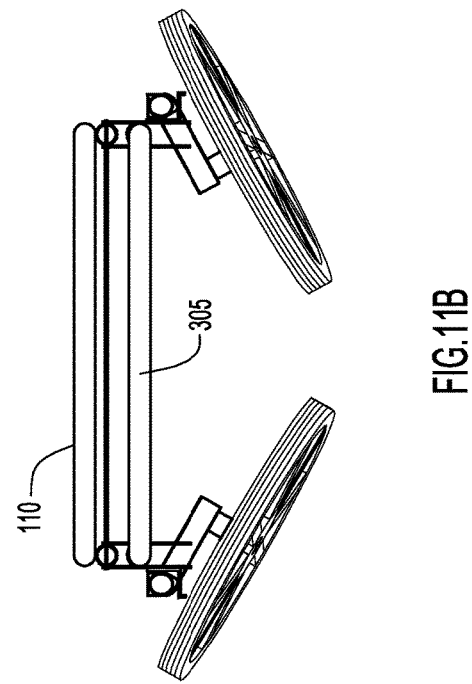
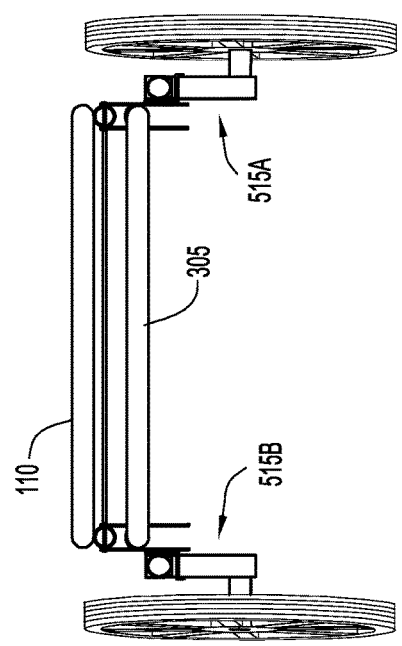

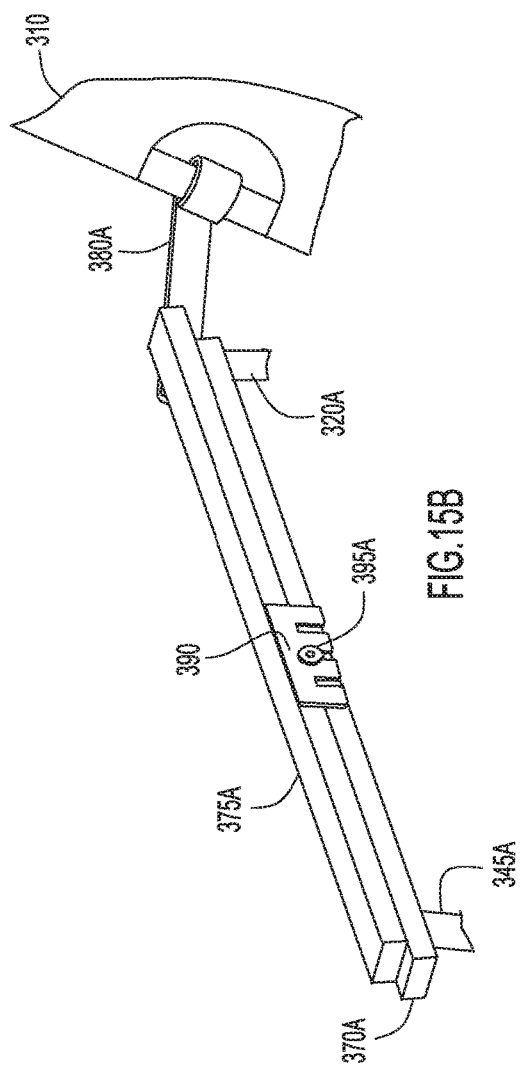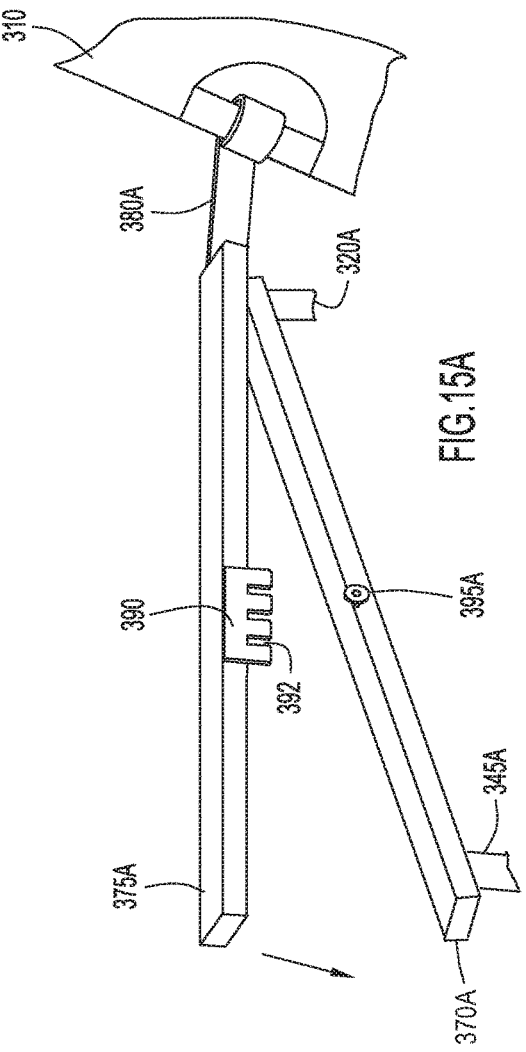

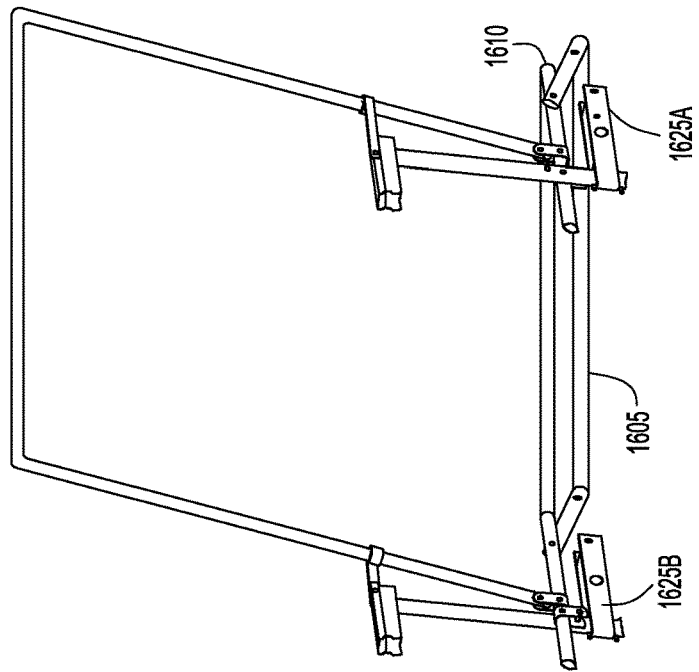
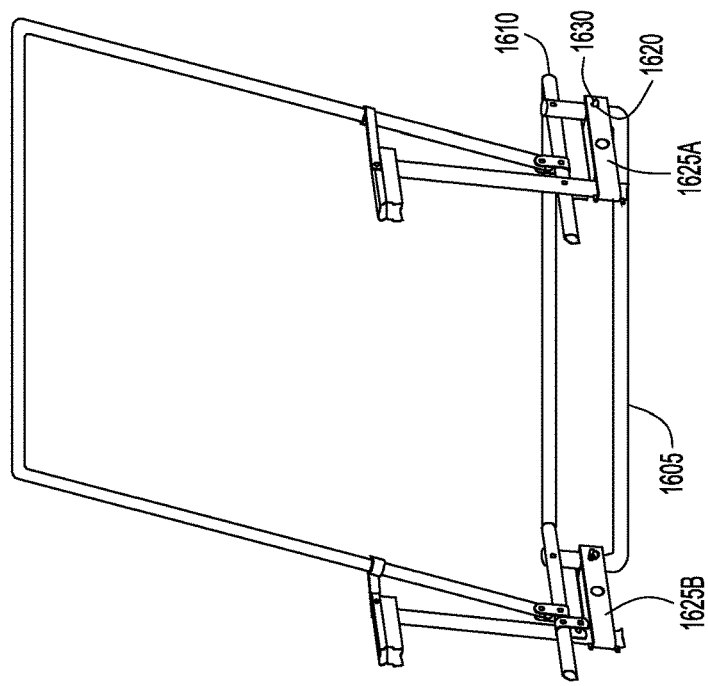

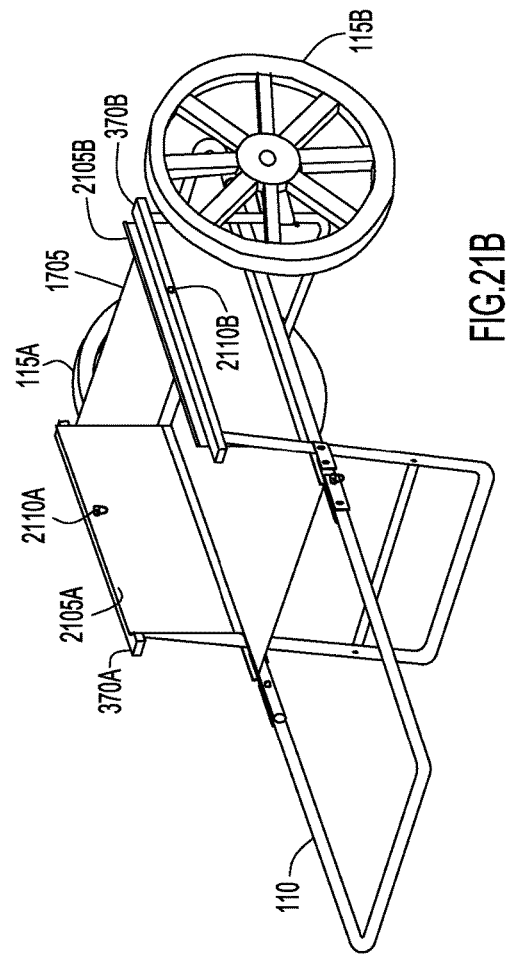
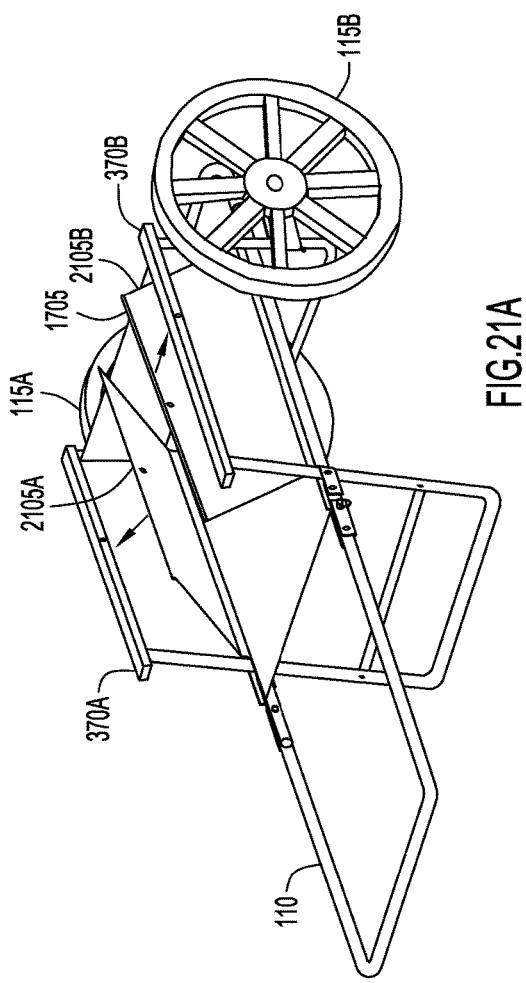
FIG.21B
FIG.21A

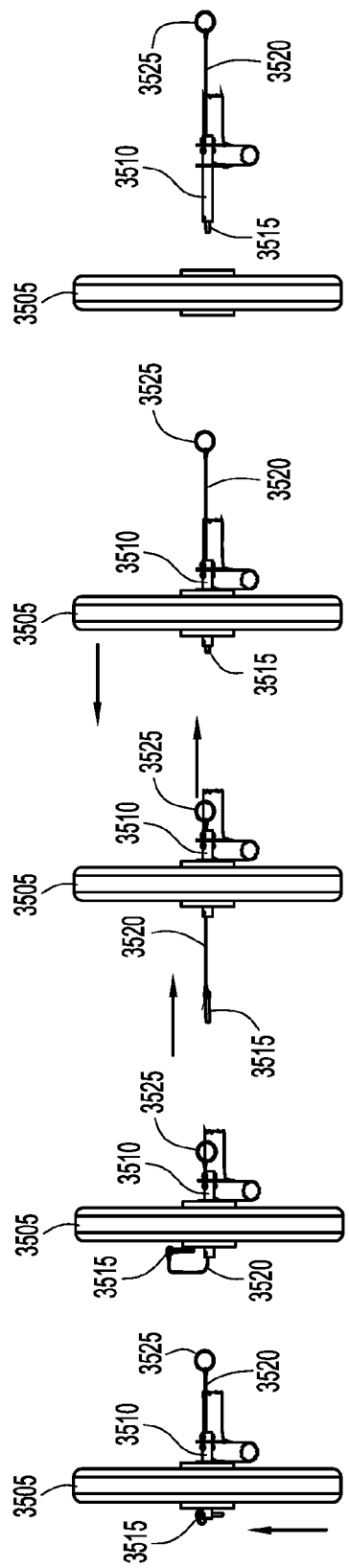

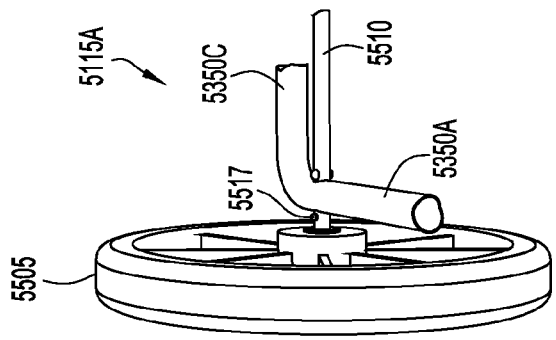
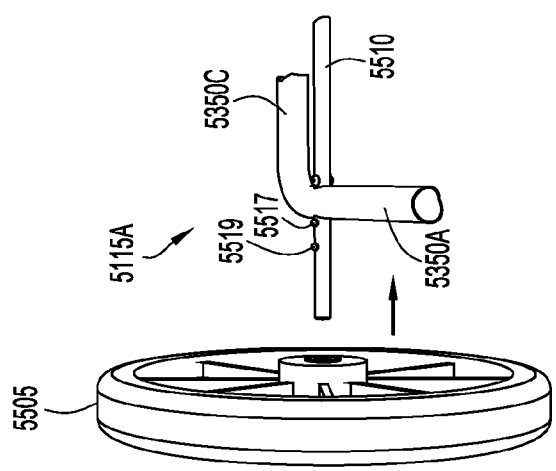
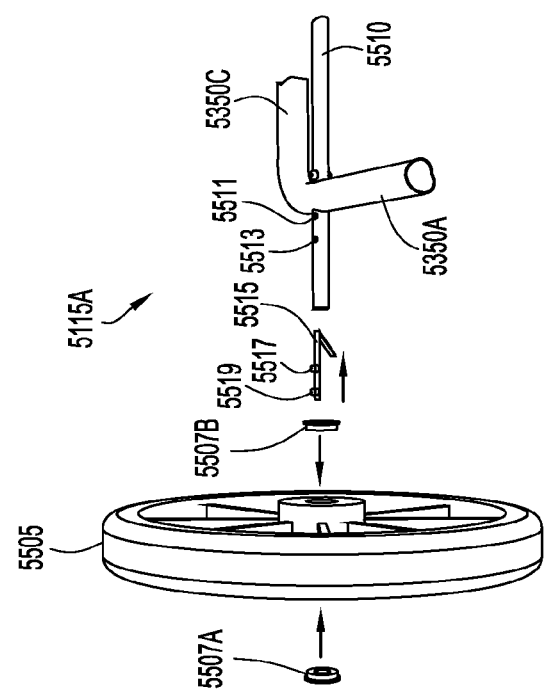

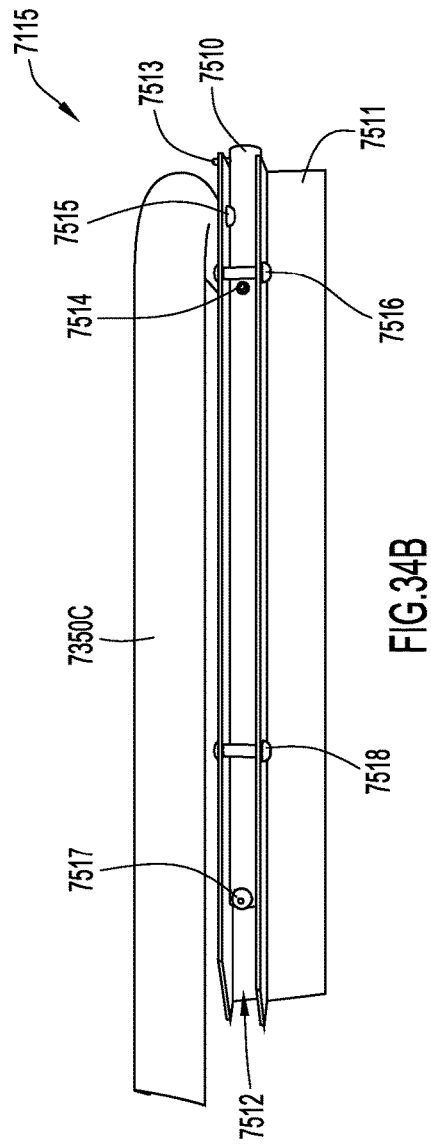
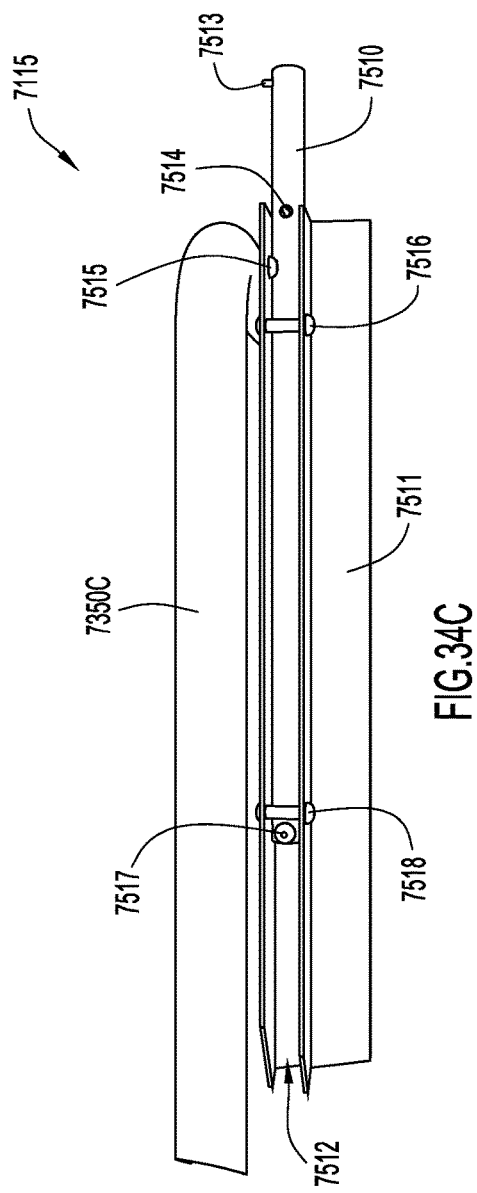

COLLAPSIBLE UTILITY CART

CROSS-REFERENCE TO RELATED APPLICATION

This application is a divisional of U.S. patent application Ser. No. 14/840,251, filed on Aug. 31, 2015, entitled "Collapsible Utility Cart," which is a continuation of U.S. patent application Ser. No. 14/037,448, filed on Sep. 26, 2013, entitled "Collapsible Utility Cart," the entire disclosures of which are incorporated herein by reference in their entirety. Furthermore, this application incorporates herein by reference, in its entirety, the disclosure of U.S. Provisional Patent Application No. 61/705,753, filed Sep. 26, 2012, entitled "Collapsible Utility Cart."

FIELD OF THE INVENTION

This invention is directed toward a collapsible utility cart and, in particular, a cart having foldable wheel assemblies.

BACKGROUND OF THE INVENTION

Conventional wheel assemblies typically include a wheel attached to a piece which in turn was pivotally attached to the frame of the cart. When the cart was deployed, the wheel assembly would be pivoted to rest against the bottom surface of the cart. These types of carts suffer from the limitation that the length of each wheel assembly (assuming each has the same length) is limited by the width of the cart. Otherwise, if the wheel assemblies are too long, they will impede each other from folding. If the width of the cart is increased to accommodate such wheel assemblies, the compactness of the cart will be reduced.

For many of these carts, the piece of the wheel assembly to which the wheel is attached consists of a single wall because the diameter of the wheels is too great to have a dual wall wheel assembly that can be pivotally attached to the frame of the cart. If the cart is carrying a heavy load, the single wall attachment piece may buckle if excessive lateral or sideways stress is placed upon the piece. Such a situation may exist if the cart tips slightly or is traveling on a slanted or uneven surface.

It would thus be desirable to provide a cart that can be adapted to have high ground clearance and compactness with wheel assemblies that will not easily buckle if the cart experiences tipping or travels on a slanted or uneven surface. It would be additionally desirable for such a cart to have a backstop for which an obtuse angle of recline can be selected and maintained and to have side rails.

SUMMARY OF THE INVENTION

The present invention is directed toward a reconfigurable cart including a platform assembly, a handle assembly, a first wheel assembly, and a second wheel assembly. In use, the cart may folded from a deployed position in which it rolls along a surface to transport items, to a stowed position, in which it is collapsed in a compact geometry for storage. The cart may be further integrated into a chair, chaise lounge, garden cart, bicycle utility cart or a bicycle passenger cart.

BRIEF DESCRIPTION OF THE DRAWINGS

FIG. 1 illustrates a perspective view of a cart in accordance with an embodiment of the invention, showing the cart in its deployed configuration.

FIG. 2C illustrates a side view in elevation of the cart frame shown in FIG. 2A.

FIG. 2E illustrates a close of view of connection between the handle assembly and the support assembly.

FIGS. 5A and 5B illustrate cross-sectional views of the cart, showing the components of the wheel assembly in accordance with an embodiment of the invention.

FIG. 5C illustrates the wheel assembly of the cart, with the wheel removed for clarity.

FIG. 7 illustrates the wheel assembly of FIG. 5A, further showing a locking pin connection.

FIGS. 10A-15B illustrate the reconfiguration of the cart from its stowed configuration to its deployed configuration. Specifically, FIGS. 10A-10E show the deployment of the handle assembly, FIGS. 11A-11C show the deployment of the wheel assemblies, FIGS. 14A-14C and FIGS. 15A-15B show the deployment of the armrest.

FIGS. 16A and 16B illustrate a supporting assembly in accordance with another embodiment of the invention.

FIGS. 21A and 21B illustrate a perspective view of a cart in accordance with another embodiment of the invention.

FIGS. 27A-27E illustrate the disengagement of the wheel from the frame of the cart shown in FIG. 24.

FIGS. 32A-32C illustrate the engagement of the wheel with the wheel assembly of the cart in accordance with another embodiment the invention.

FIGS. 34A-34C illustrate the wheel assembly of the cart in accordance with another embodiment the invention where the axles are slide between a stowed and a deployed position.

Like reference numerals have been used to identify like elements throughout this disclosure.

DETAILED DESCRIPTION OF THE INVENTION

Referring to FIGS. 1 and 2, in an embodiment, the cart 10 includes a frame 100 defining a support or platform assembly 105, a handle assembly 110 coupled to the forward portion of the support assembly, and first 115A and second 115B wheel assemblies coupled to the rearward portion of the support assembly. The frame 100 may be formed of any material suitable for its described purpose. By way of example, the frame may be formed of generally cylindrical hollow bars formed of metal.

The cart 10 may further include supporting members 120A, 120B, 120C disposed on selected locations along the frame. The supporting members 120A, 120B, 120C may each define a generally planar member having a top surface and a bottom surface. The supporting members 120A, 120B, 120C each provides a support surface on which to place and carry items. In the illustrated embodiment, the supporting members define a seating or support surfaces operable to support a user seated therein or to support goods during transport. The material forming the supporting members 120A, 120B, 120C may include soft goods material such as cloth, canvas, mesh, etc. As another example of soft goods material, a plurality of flexible plastic strips similar to those utilized in patio and pool furniture can be utilized to form a resting or carrying surface. In an embodiment, the supporting material may be sewn so that it spans a gap existing within the frame 100. The supporting members may also be formed of rigid material such as sheet metal, hard plastic (e.g., polypropylene or polystyrene) or other material such as wood.

Figure 3:
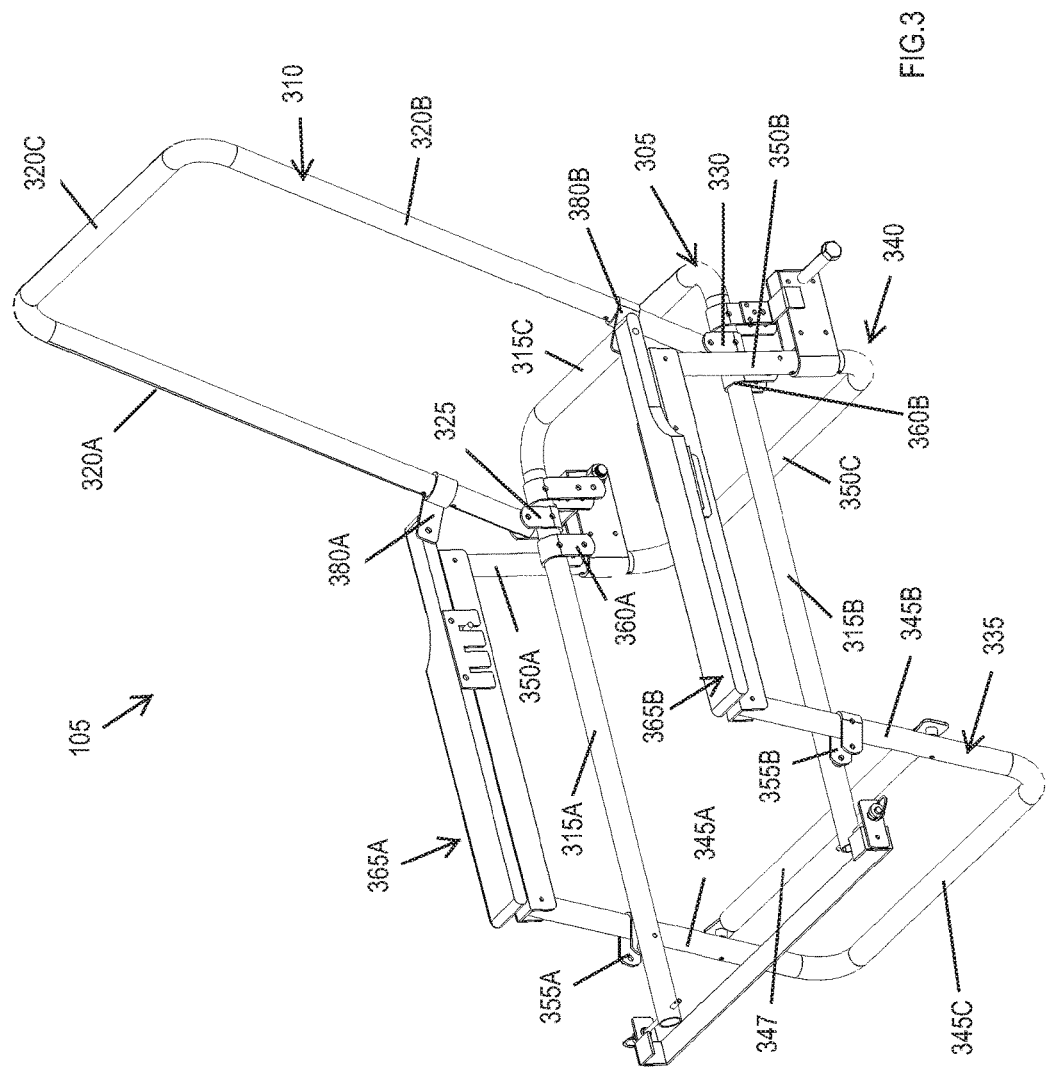
FIG. 3 illustrates an isolated view of the support assembly of the cart shown in FIG. 1.

Referring to FIG. 3, the support assembly 105 includes a seat member 305 and a seatback member 310. In an embodiment, the seat member 305 of the frame 100 includes a generally U-shaped bar (e.g., a generally hollow, cylindrical bar) defined by a first arm or portion 315A and a second arm or portion 315B laterally spaced from the first arm by a medial portion or crossbar 315C. Similarly, the seatback member 310 of the frame 100 includes a generally U-shaped bar (e.g., a generally hollow, cylindrical bar) defined by a first arm or portion 320A and a second arm or portion 320B laterally spaced from the first arm by a medial portion or crossbar 320C.

The seatback member 310 is pivotally coupled to the seat member 305. Specifically, the distal portion (e.g., the distal end) of the first seatback arm 320A is pivotally coupled to the first seat arm 315A via a first seating connector 325 disposed proximate the seat intermediate portion 315C. Similarly, the distal portion (e.g., the distal end) of the second seatback arm 320B is pivotally coupled to the second seat arm 315B via a second seating connector 330 disposed proximate the seat intermediate portion 315C. Each seating connector 325, 330 may be a generally U-shaped connector having an arcuate medial portion contoured to the bars forming the seat member. When mounted on the seat member 305, moreover, the seating connectors 325, 330 are oriented generally upright such that the arms of the "U" extend above the seating surface (as defined by supporting member 120B). In their deployed positions, the seat member 305 is oriented in a generally horizontal position, while the seatback member 310 is disposed in a generally vertical position (e.g., it may be oriented slightly angularly offset from vertical). With this configuration, the seat member 305 and the seatback member 310 define the seating or supporting area of the cart, being configured to support a user seated therein (or an object placed thereon).

The support assembly 105 of the frame 100 further includes a leg assembly with a first or forward leg member 335 and a second or rearward leg member 340. The forward leg member 335 may be in the form of a generally U-shaped bar (e.g., a generally hollow, cylindrical bar) including a first upright arm or portion 345A laterally spaced from a second upright arm or portion 345B by a medial or crossbar portion 345C. Similarly, the second leg member 340 may be in the form of a generally U-shaped bar (e.g., a hollow cylinder) including a first upright arm or portion 350A laterally spaced from a second upright arm portion 350B by an intermediate portion or crossbar 350C. When the cart is in its deployed position, the crossbars 345C, 350C contact the supporting surface (e.g., the ground).

One or both leg members 335, 340 may further include a cross brace 347 operable to provide additional support to the leg member. In an embodiment, the cross brace 347 on the forward leg member 335 is attached to the rear side of member (i.e., the side facing the rear leg member 340 when the cart is in its deployed position). In such embodiments, the forward cross brace 347 may not be attached directly to arms 345A, 345B of the forward leg 335, but may instead be separated from forward leg member by a bushing or other means. The gap created by the bushings between the arms 345A, 345B of the forward leg member 335 and the forward cross brace 347 creates sufficient clearance between cross brace 347 and the seat member 305 for the forward leg to fold into a plane that is generally parallel to the plane defined by the seat member. Without the bushings, forward cross brace 347 may impede the folding of the forward leg member 335 against the seat member 305, causing the forward leg member 335 to protrude when the cart is stowed, thereby reducing the compactness of the cart in its stowed configuration.

Each of the first 335 and second 340 leg members is pivotally coupled to the seat member 305 via leg member connectors. Specifically, the first arm 345A of the forward leg member 335 is coupled to the first arm 315A of the seat member 305 (proximate the forward (distal) portion of the seat member first arm 315A) via a first forward leg connector 355A, while the second arm 345B of the forward leg member 335 is coupled to the second arm 315B of the seat member 305 (proximate the forward (distal) portion of the seat member second arm 315B) via a second forward leg connector 355B.

Similarly, the first arm 350A of the rearward leg member 340 is coupled to the first arm 315A of the seat member 305 (proximate the intermediate portion 315C of the seat section first arm 315A) via a first rearward leg connector 360A, while the second arm 350B of the rearward leg member 340 is coupled to the second arm 315B of the seat member 305 (proximate the intermediate portion 315C of the seat member second arm 315B) via a second rearward leg connector 360B. The leg connectors 355A, 355B, 360A, 360B may be generally U-shaped connectors defining arms and an arcuate medial portion contoured to the curve of the bar forming the leg member portions 350A-350C. As illustrated, each forward leg connector 355A, 355B is oriented forward, while the rearward leg connector 360A, 360B is positioned such that the arms of the connector extend downward, and the distal portions of the arms are disposed below the seating surface (i.e., below seat member 305). It should be understood that while U-shaped leg connectors 355A, 355B, 360A, 360B are illustrated, various other means can be used to couple the leg members 335, 340 to the seat member at a point below the seat member.

In their deployed position, the leg members 335, 340 are attached to seat member 305 so that the leg member arms 345A, 345B, 350A, 350B extend below seat member 305 in a manner that is generally perpendicular to the plane defined by the seat member. As noted above, the leg member arms 345A, 345B, 350A, 350B are pivotally attached to the seat member 305; consequently, the leg members 335, 340 may be pivoted from their deployed configuration to their stowed configuration, in which the leg members are oriented generally parallel to the plane defined by the seat member 305. In an embodiment, the arms of the leg members 335, 340 could include separate pieces, each piece individually and pivotally attached to its corresponding connector 355A, 355B, 360A, 360B.

Figure 4A:
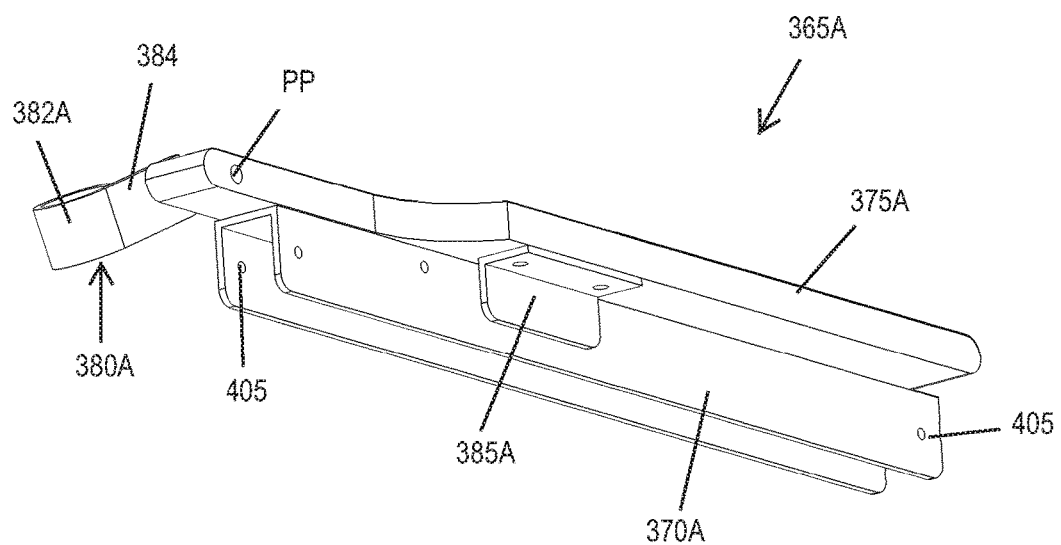
FIGS. 4A and 4B illustrate perspective views of the armrest assembly, shown in isolation.
Figure 4B:
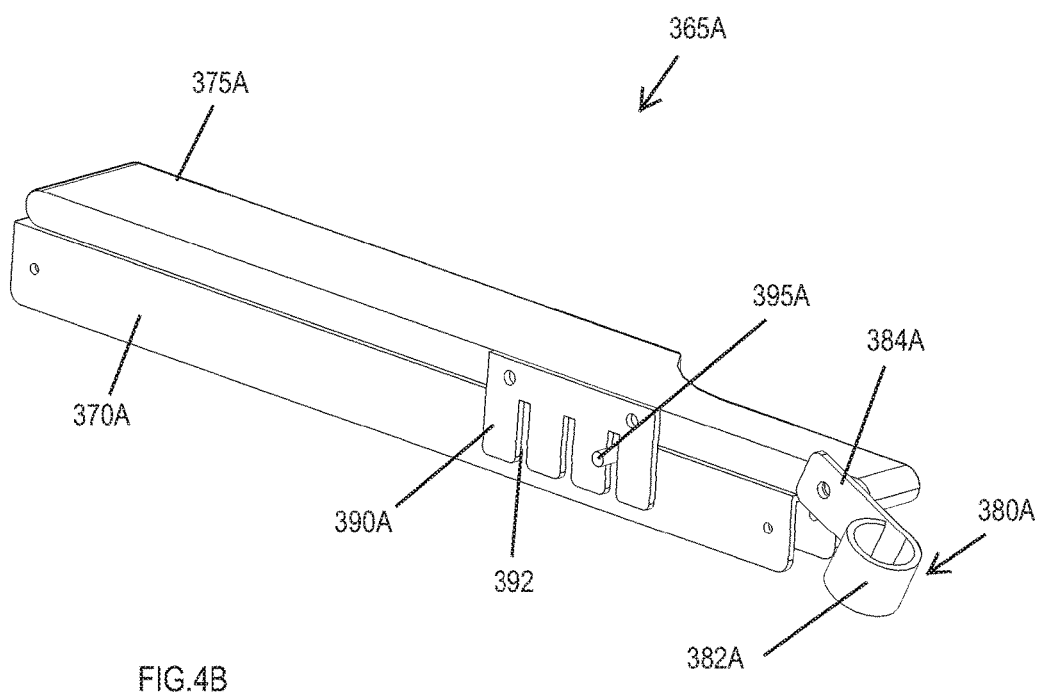

The support assembly 105 further includes one or more armrest assemblies operable to support the arms of a user seated within the support assembly. The armrest assemblies may be coupled to the leg members 335, 340 such that a first armrest assembly 365A spans and is supported by the first arms 345A, 350A of the forward 335 and rearward 340 leg members, and such that a second armrest assembly 365B spans and is supported by the second arms 345B, 350B of the forward 335 and rearward 340 leg members. As seen best in FIGS. 4A and 4B, each armrest assembly 365A, 365B includes a lower armrest support member 370A, 370B and an upper armrest 375A, 375B. The lower armrest support 370A, 370B is pivotally coupled to the distal ends of its corresponding leg member arm 345A, 345B, 350A, 350B. By way of example, the distal (upper) end of each leg member arm 345A, 345B, 350A, 350B may be pivotally coupled to the armrest supports 370A, 370B via a pin extending though apertures 405 formed into the armrest support.

Each armrest assembly 365A, 365B further includes a clamp 380A, 380B including a coupling ring 382A, 382B coupled to arms 320A, 320B of the seatback member 310 and an extension 384 pivotally coupled to the rearward portion of each armrest 375A, 375B along a pivot point PP. The coupling ring 382A, 382B of the clamp 380A, 380B slidingly engages the arms 320A, 320B of the seatback member 310 to permit the repositioning (rotation) of the clamp (and thus the armrest coupled to the ring) about the setback member arm 320A, 320B. The armrest assembly 365A, 365B also includes an L-shaped guide bracket 385A, 385B configured to provide additional support for the armrest. With this configuration, the armrest 375A, 375B is configured to separate from the armrest support 370A, 370B, selectively pivoting toward and away from the armrest support. In addition, the rotational position of the armrest about the seatback member 310 may be selectively adjusted.

The longitudinal positioning of the armrest 375A, 375B with respect to the support 370A, 370B is also adjustable, and may be secured in a desired longitudinal position via a lock assembly including a notched plate 390A, 390B secured to the armrest 375A, 375B and including a plurality of elongated, laterally-spaced slots 392. Each slot 392 mates with a guide pin 395A, 395B extending from the armrest support 370A, 370B. The distal end of the guide pin may be flanged or bent to better maintain the engagement of the notched plate 390A, 390B. In operation, a user pivots the armrest 375A, 375B downward, toward the armrest support 370A, 370B, aligning the desired slot with the guide pin 395A, 395B and inserting the pin into the slot 392 to secure the armrest in the desired position. The longitudinal positioning of the armrest controls the angle of recline between the seatback member 310 and the seat member 305; consequently, adjusting the position of armrest 375A, 375B along the armrest support 370A, 370B adjusts the angle of recline of the setback member 310 with respect to the seat member 305.

With the above described configuration, the clamps 380A, 380B may pivot along a plane oriented generally perpendicular to seatback member 310. In some embodiments, to facilitate maintaining the clamps 380A, 380B in the same vertical position on seatback member 310, the arms 320A, 320B of the setback member 310 may include upper and lower protrusions or nubs to prevent the coupling ring from sliding up and down the arms. Additionally, the armrests 375A, 375B are pivotally attached to arm coupling rings 380A, 380B so that the armrests 375A, 375B pivot in a plane that is perpendicular to the plane in which coupling rings 380A, 380B pivot. The ability of coupling rings 380A, 380B and armrests 375A, 375B to rotate in a combination of two different planes allows armrests to lay flat in the middle of the spans between the backseat member 310 and the seat member 305, thereby increasing the compactness of the cart when it is stowed.

Referring back to FIGS. 2A-2E, the handle assembly 110 includes a handle member 205 and one or more cross bracket members 210A, 210B. The handle member 205 may be a generally U-shaped bar (e.g., a hollow, generally cylindrical bar) defined by a first arm or portion 215A laterally spaced from a second arm or portion 215B via a medial portion or crossbar 215C. The distal portion of the handle first arm 215A is pivotally coupled to the first arm 345A of the forward leg member 335 via the first forward leg connector 355A. Similarly, the distal portion of the second arm 215B of the handle member 205 is pivotally coupled to the second arm 345B of the forward leg member 335 via the second forward leg connector 355B. With this configuration, the handle member 205 pivots with respect to the seat member 305 via the pivot connection P provided by the forward leg connectors 355A, 355B. As shown, the distal ends of the handle arms 215A, 215B are configured to overlap with the distal ends of the seat member arms 315A, 315B, with the arms being oriented adjacent and generally parallel to each other in their deployed positions.

The handle assembly bracket members 210A, 210B are configured to stabilize the handle member. Referring to FIG.

2D, each bracket member 210A, 210B may have a generally planar, elongated body 225 with L-shaped terminal ends 230, 235. The bracket members 210A, 210B may be adapted to secure the rotational position of the handle member 205 with respect to the seat member 305. Specifically, referring to FIG. 2E, the handle assembly bracket members 210A, 210B may include a fastener mechanism including a locking pin 240A, 240B and a connection plate 242A, 242B. In the embodiment illustrated, a connection plate 242A, 242B is pivotally mounted on each of the terminal ends 230, 235 of the first bracket member 210A. The connection plate 242A, 242B extends rearward, toward the forward leg connector 355A, 355B.

The connection plate 242A, 242B, the handle arm 215A, 215B, and the seat member arm 315A, 315B each include an aperture A operable to the receive the locking pin 240A, 240B. The apertures are oriented such that, when the distal ends of the arms 215A, 215B, 315A, 315B are oriented in their deployed position (i.e., the handle arms 215A, 215B are oriented generally parallel to the seat member arms 315A, 315B), the apertures align, enabling the insertion of the locking pin 240A, 240B through the connection plate 242A, 242B and across both its associated arms (215A, 315A and 215B, 315B, respectively). Once the locking pin 240A, 240B extends through the arms, the handle assembly 110 is locked into position with respect to the seat member 305, and vice versa.

In some embodiments the distal ends of the handle arms do not align with the distal ends of the seat member arms 315A, 315B. Instead the handle arms align with the arms of the forward leg connectors 355A, 355B such that they are generally parallel to the plane of the seat member arms. Forward leg connectors 355A, 355B each include a set of apertures that align with the apertures in handle arms 215A, 215B so that locking pins 240A, 240B can be inserted into the aligned apertures on forward leg connectors 355A, 355B and handle arms 215A, 215B to maintain handle assembly 205 in place.

Figure 2A:
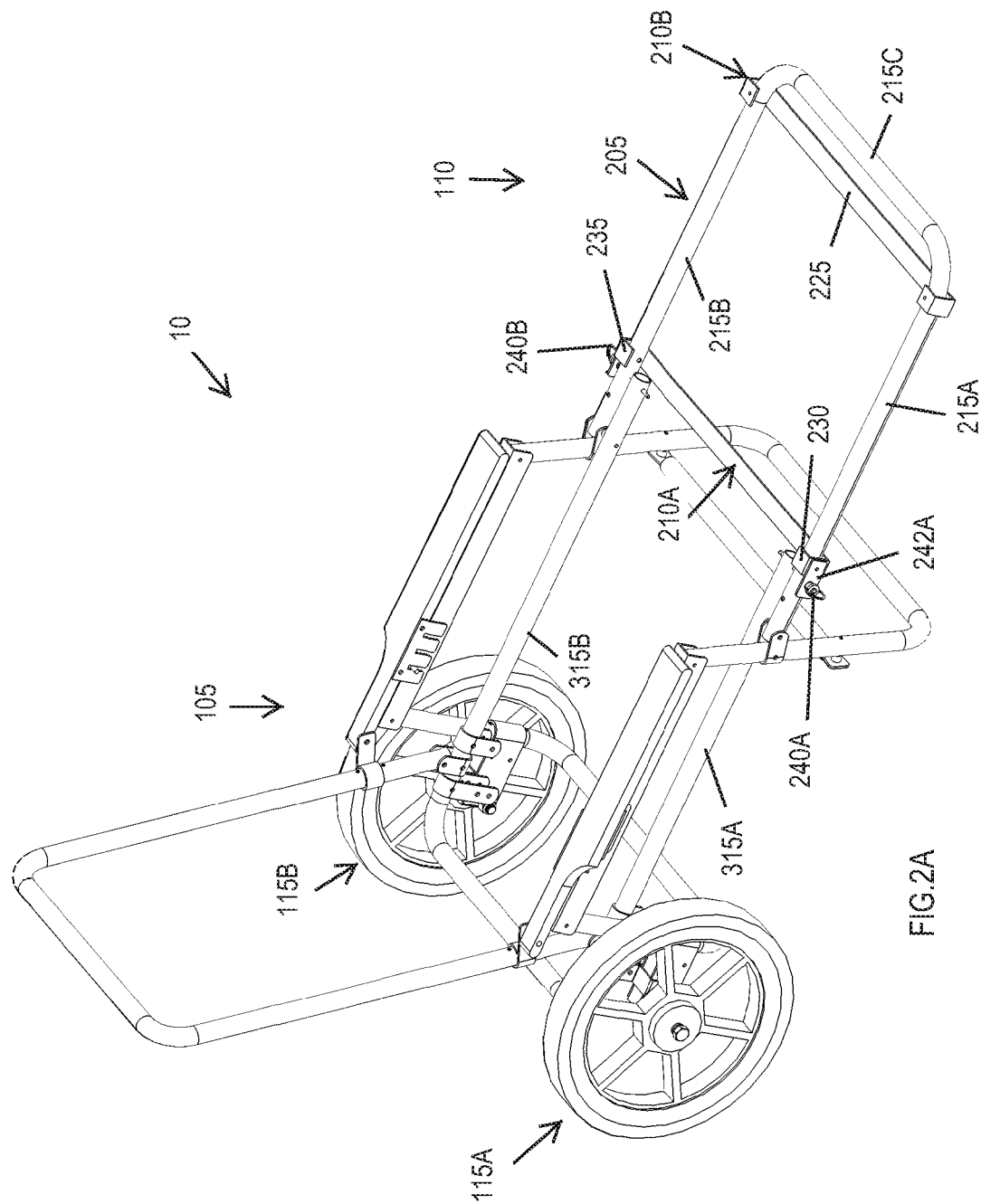
FIG. 2A illustrates a perspective view of the frame of the cart shown in FIG. 1.
Figure 2B:
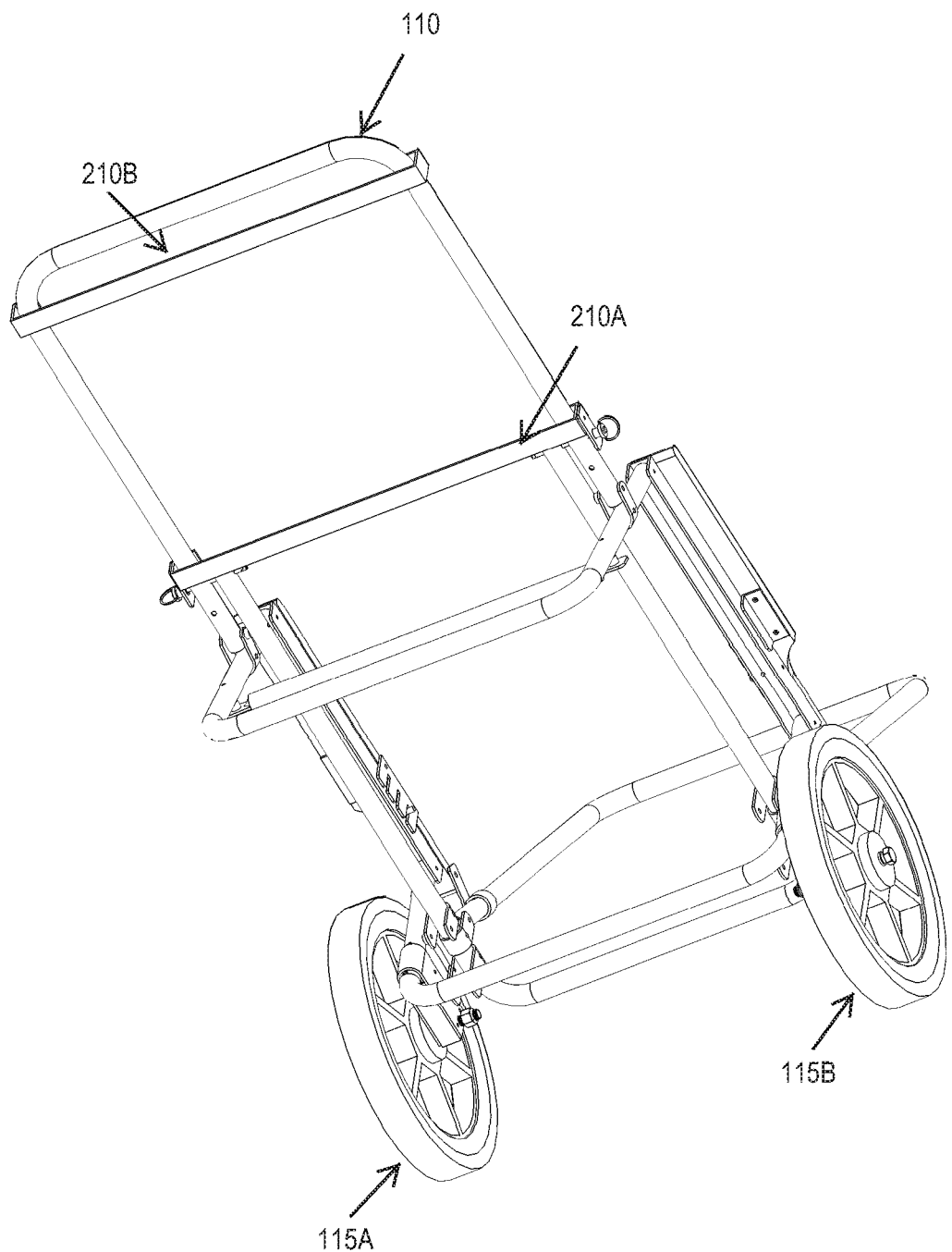
FIG. 2B illustrates a bottom perspective view of the cart frame shown in FIG. 2A
Figure 2D:
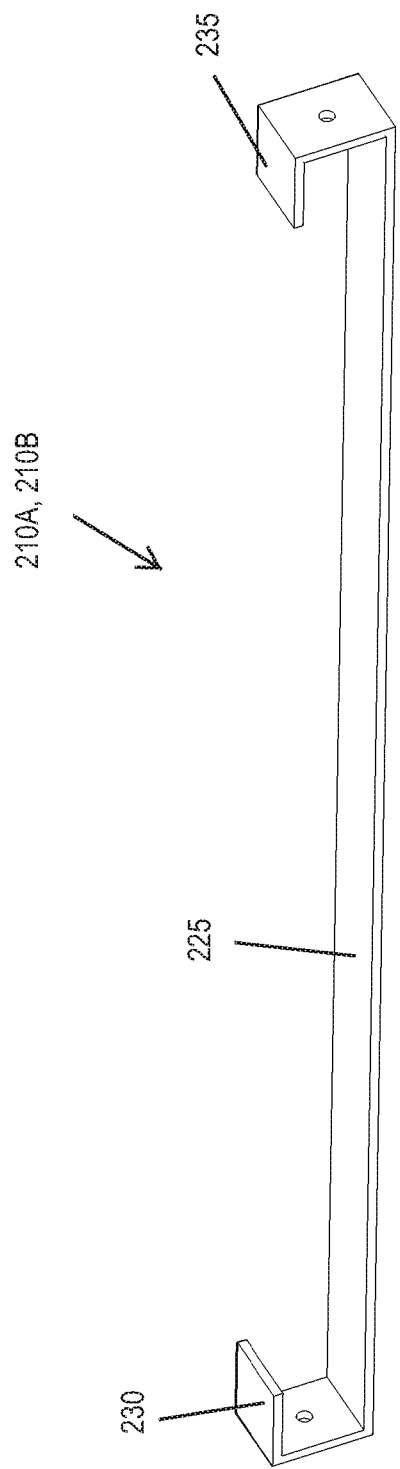
FIG. 2D illustrates a perspective view of a bracket member, shown in isolation.
Figure 2F:
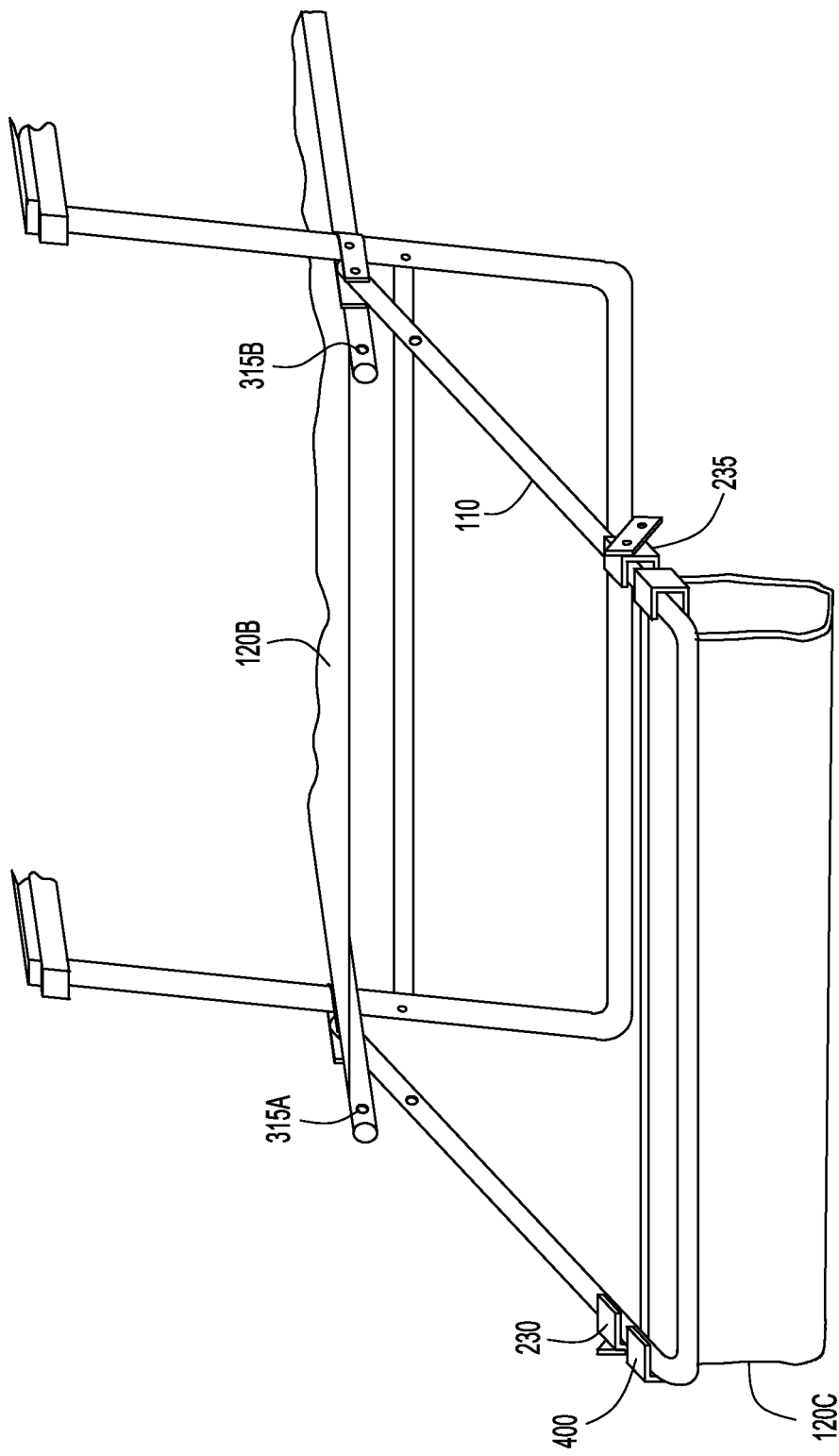
FIG. 2F illustrates the handle assembly with the support member in its collapsed position.

Referring to FIG. 2F, the first bracket member 110A may be configured to slide forward along the handle assembly 110. Specifically, the C-shaped distal ends 230, 235 are slidingly captured to its associated handle arm 215A, 215B. Consequently, the supporting material 120C disposed on the handle assembly 110 can be configured in an expanded or deployed position (FIG. 1) to a collapsed or stowed position (FIG. 2F). Specifically, material is attached to both of the medial portion 215C of the handle member 205 and the first bracket member 210A such that when first bracket member 210A is secured, the supporting material 120C is deployed and spans the space between first bracket member 210A and the handle assembly intermediate portion 215C to define a supporting surface that will allow additional items to be carried on the cart. When the cart is to be stowed, the handle locking pins 240A, 240B are removed from the apertures that are formed into the connection plates 242A, 242B, handle assembly arms 215A, 215B and seat member arms 315A, 315B so that the first bracket member 210A can be slid toward the second bracket member 210B to collapse the supporting member 120C and open the span between the arms of handle assembly 110, allowing the handle assembly to pivot over the seatback member 310, resting on top of the seatback.

Figure 6:
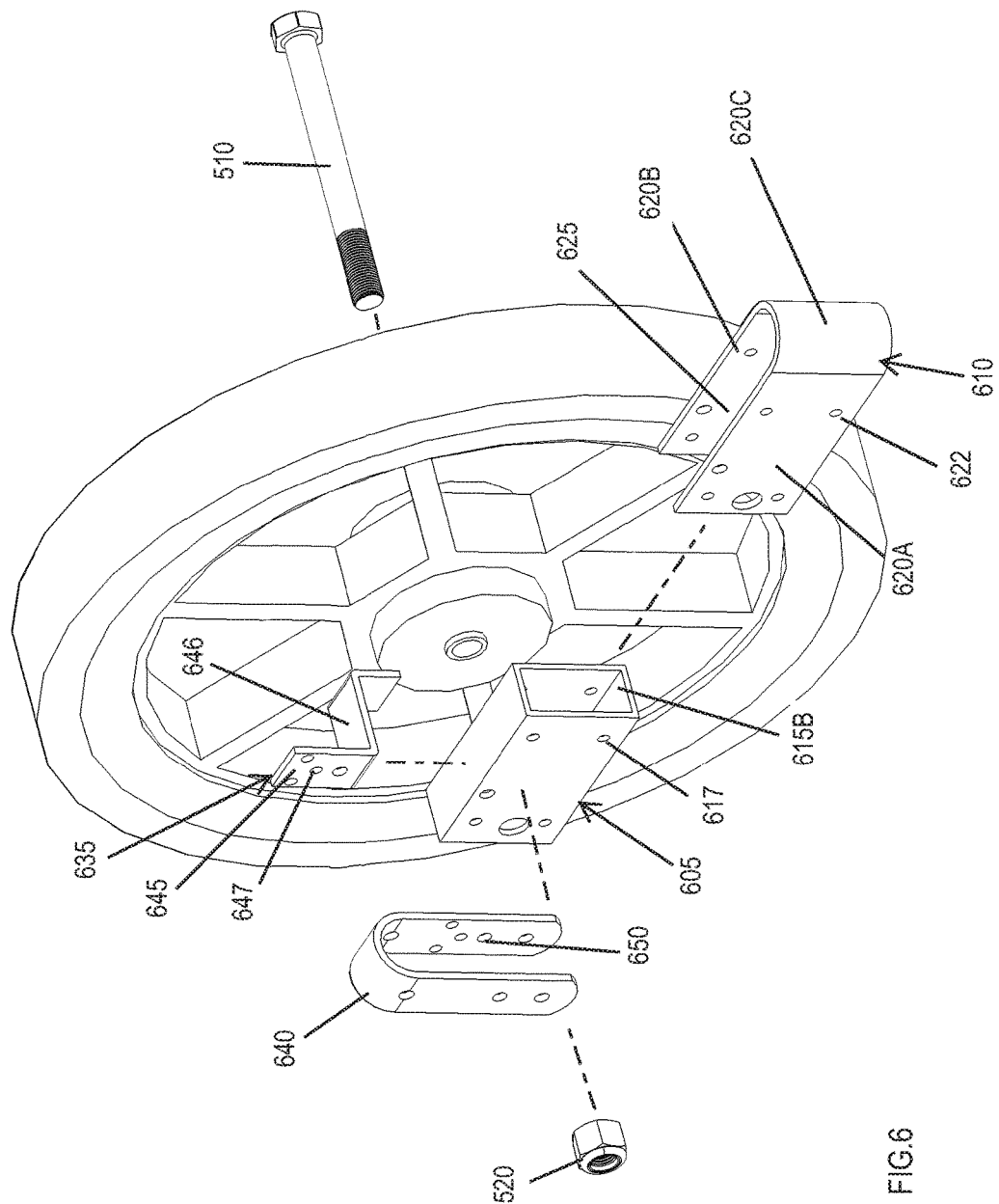
FIG. 6 illustrates an exploded view of the wheel assembly.

The wheel assemblies 115A, 115B are adapted to be coupled to the frame 100 such that each is independently selectively positioned in a deployed configuration and a stowed configuration. Referring the FIGS. 5A-5C, each wheel assembly 115A, 115B includes a wheel 505 rotatably mounted on an axle 510. The axle 510, in turn, is coupled to a mounting assembly 515. By way of example, the axle 510 may be a bolt 520 having a threaded end that engages a threaded fastener 520. Referring to FIG. 6, the mounting assembly 515 includes an inner spacer or mounting block 605 and an outer sleeve or mounting plate 610. The mounting block 605 may possess any dimensions (shape and size) suitable for its described purpose. In the illustrated embodiment, the mounting block 605 is generally rectangular, defining a hollow block with a first open end 615A and a second open end 615B. The mounting block 605 includes a plurality of apertures 617 operable to receive fasteners, thereby permitting the selective fastening of components thereto.

The sleeve 610 may be in the form of a generally U-shaped plate defined by a first wall 620A spaced from a second wall 620B by a medial portion 620C. The medial portion may be generally arcuate, being contoured to accommodate the exterior curve of the bars forming the frame. With this configuration, the walls 620A, 620B and medial portion 620C cooperate to define an opened sleeve cavity 625. The walls 620A, 620B of the sleeve may further include apertures 622 corresponding to apertures 617 on the mounting block 605. As seen best in FIG. 5C, the sleeve 610 is configured to enclose the mounting block 605. Specifically, the sleeve 610 is mounted onto the second arm 350B of the rearward leg member 340 such that the mounting block 605 is received within the sleeve cavity 625 of the sleeve 610. In addition, the second arm 350B of the rearward leg member 340 is captured between the mounting block 605 and the arcuate medial portion 620C of the sleeve 610. With this configuration, the mounting assembly 515 is configured to rotate about its respective arm 350A, 350B of rear leg member 240 along a plane that is generally parallel to the seating surface of the cart when the cart is deployed.

The mounting assembly 515 further includes a stop member 635 and a mounting assembly connector 640. The stop member 635 is adapted to prevent over outward rotation of the mounting assembly 515 and thus wheel 505. As illustrated, the stop member 635 may be in the form a planar or flattened, generally-S-shaped bracket including upper and lower vertical portions 645 offset via a horizontal portion 646. The upper vertical portion 645 includes one or more apertures 647 configured to receive fasteners (e.g., bolts) that connect off the stop member 635 to the mounting assembly (e.g. to the connector 640). The mounting assembly connector 640 provides a contact point for the stop member 635 to rest against the frame 105, dispersing the weight of a seated user (or an object placed thereon) to the frame, thereby relieving the force against bosses 710A, 710B (FIG. 7). The mounting assembly connector 640 is a generally U-shaped member including an arcuate portion contoured to engage a bar forming the frame member.

The mounting assembly connector 640 further includes one or more apertures 650 configured to receive fasteners (e.g., bolts) that enable the connection of the stop member to, e.g., engage the stop member 635 and/or the sleeve 610. Referring to FIGS. 5A-5C, the mounting assembly connector 640 is mounted on the arm 315A, 315B of the seat member 305, being secured to the stop member 635, e.g., via a removable pin 705 (FIG. 7). For embodiments lacking bosses 710A, 710B, mounting assembly connector 640 likewise disperses the weight exerted against the pivot point between rear leg member arms 350A, 350B and rear leg connectors 360A, 360B when the cart is deployed. In operation, the stop member 635 (the bent portion at the free end of each of bracket) acts to restrain the lateral movement of mounting assemblies 515 and thus maintain wheels 505 in a direction that is parallel to the length of the deployed cart once they engage the connectors while the cart is in use. Such restraint of mounting assemblies 515 and wheels 505 by the bent end portion of stop member 635 thus ensures that the deployed cart can be pulled in a straight direction rather than swerving unintentionally. Restraint of mounting assemblies 515 and wheels 505 by the bent portion of stop member 635 also makes alignment of aperture 650 with the holes in mounting block 605 easier for insertion of removable pin 705.

Other means can be utilized to maintain mounting assemblies in place when the cart is in use. For example, holes could be located in the stop member that aligns with corresponding holes in the tops of sleeves through which the pins could be inserted.

Figure 8B:
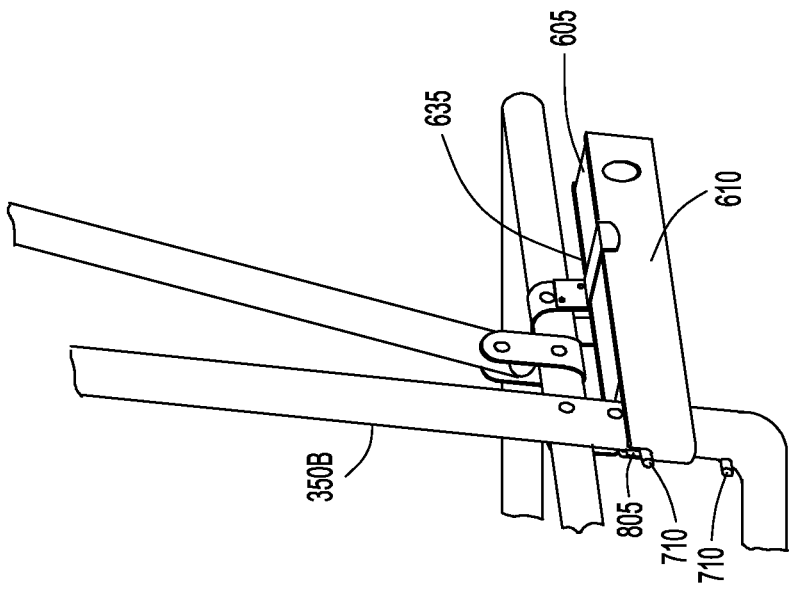
FIGS. 8A and 8B illustrate a wheel assembly in accordance with an embodiment of the invention, showing stop posts configured to limit the vertical movement of the wheel assembly on the frame.
Figure 8A:
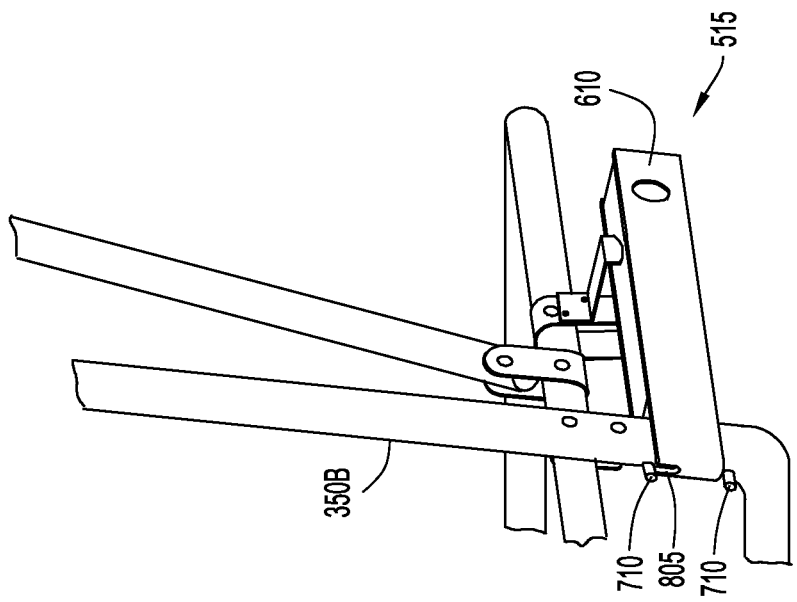
Figure 9B:
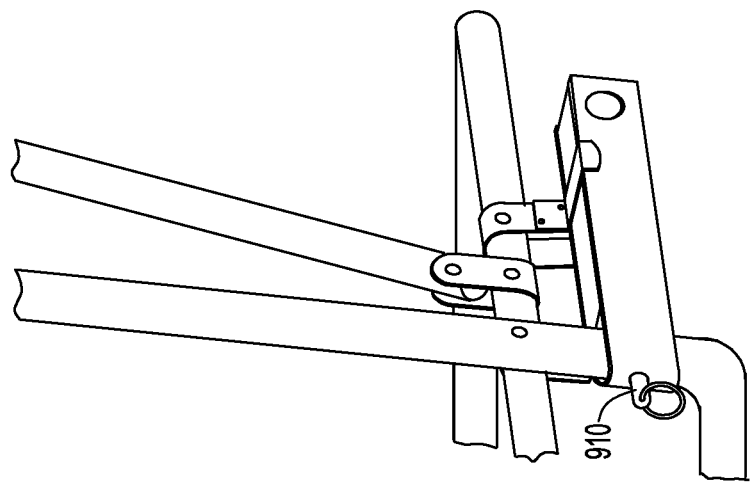
FIGS. 9A and 9B illustrate a wheel assembly in accordance with an embodiment of the invention, showing a locking pin configured to limit the vertical movement of the wheel assembly on the frame.
Figure 9A:
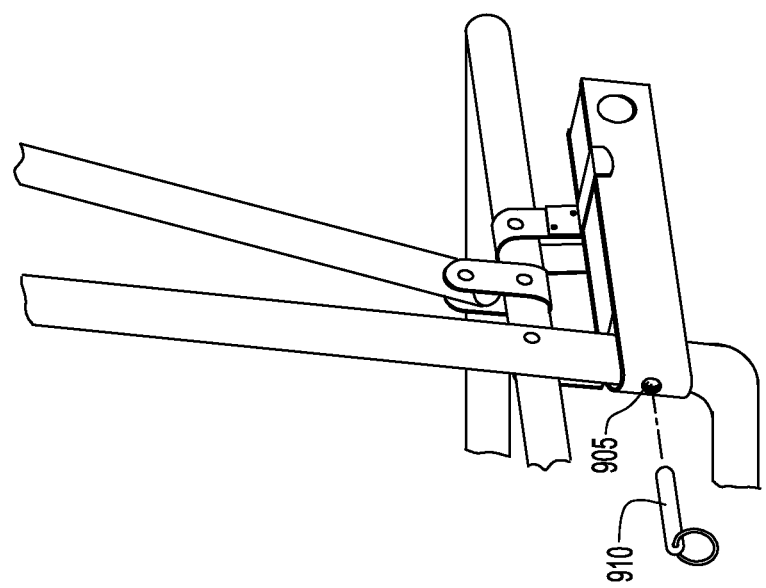
Figure 12A:
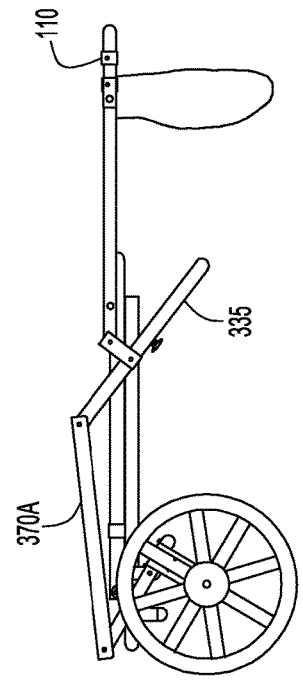
FIGS. 12A-12D show the deployment of the armrest assemblies.
Figure 12B:
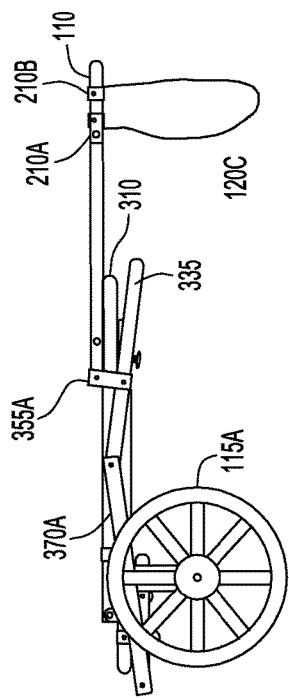
Figure 12C:
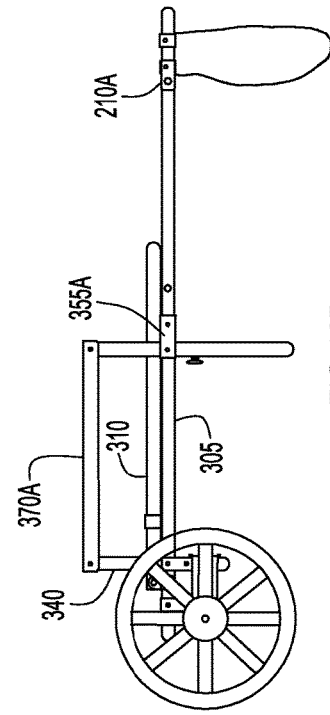
Figure 12D:
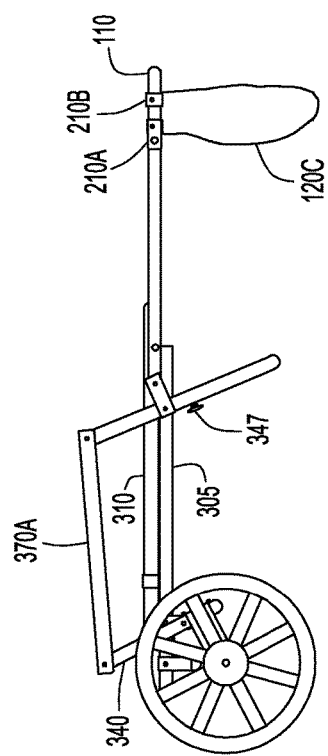
Figure 13A:
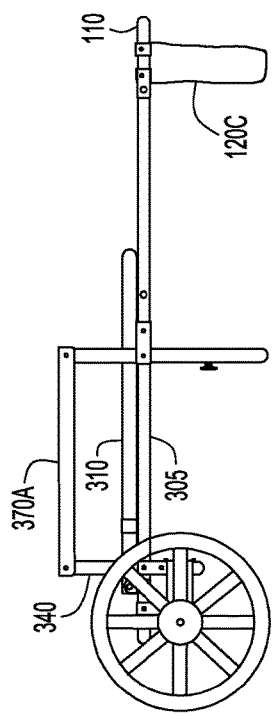
FIGS. 13A-13D show the deployment of the backrest.
Figure 13B:
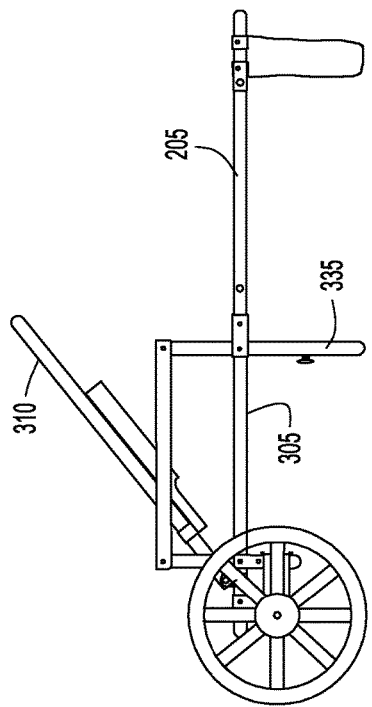
Figure 13C:
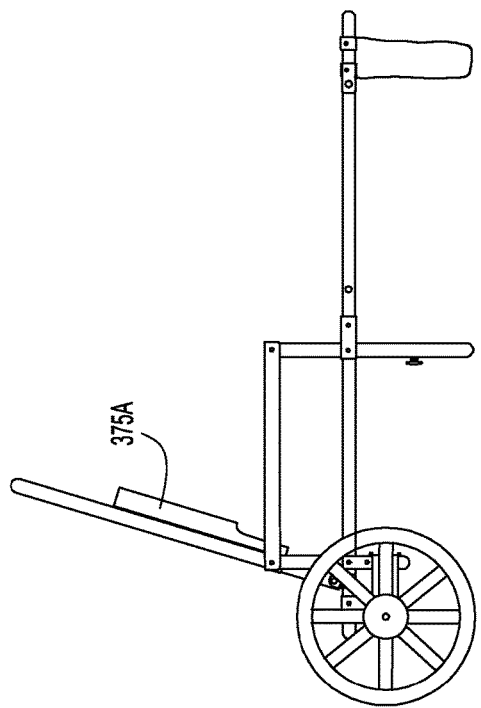
Figure 13D:
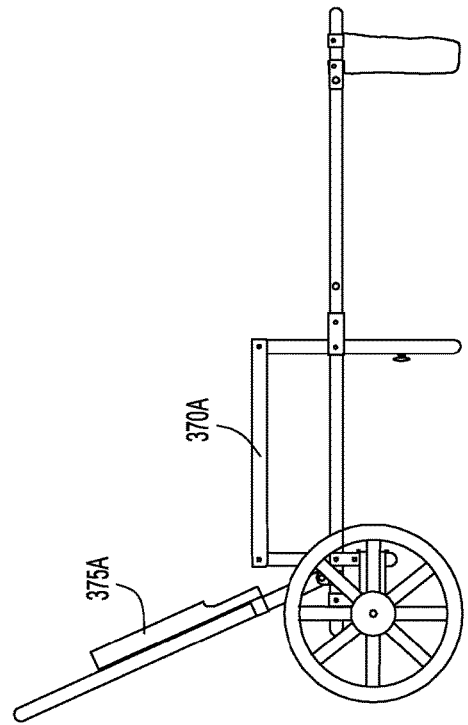

As noted above, the mounting assembly 515 is configured to rotate about its corresponding rear leg member arm 350A, 350B of rear leg member 340. To secure the position of the mounting assembly 515 on the rear leg member arm 350A, 350B, a pair of bosses or protrusions 710A, 710B may be disposed on the rear leg member arm, as illustrated in FIG. 7. The protrusions 710A, 710B are oriented above and below the sleeve 610, thereby maintaining the sleeve within the area defined by the bosses. Additionally, the mounting assembly 515 may include a lock mechanism operable to secure the rotational position of the mounting assembly, preventing its rotation about the rear leg member arm 350A, 350B. As illustrated in FIGS. 8A and 8B, the sleeve 610 may include notch 805 that engages one of the protrusions 710A, 710B preventing the rotation of the sleeve about the arm 350A, 350B. When deployed, the weight of the cart on protrusion 710A, 710B maintains the protrusion in the notch 805, preventing the mounting assembly 515 from pivoting around the leg member arm 350A, 350B when the cart is in use. Referring to FIGS. 9A and 9B, in an alternative embodiment, the medial portion of the sleeve 610, as well as the leg member arm 350A, 350B may each include an aperture 905 that receives a locking pin 910 effective to secure both the vertical and rotational positions on the arm.

The procedure for deploying the cart is explained with reference to FIGS. 10-15. The cart begins in its stowed position as illustrated in FIG. 10A. When the cart is stowed, the wheel assembly sleeves 610 are folded under the seat member 305, resting in a plane that is parallel to that of supporting member 120B. The direction of each of sleeve 610 is perpendicular to that of the arms 315A, 315B of the seat member 310. The wheel assemblies 115A, 115B (and thus wheels 505) also reside in a plane that is parallel to the plane of support member 120B when the cart is stowed. When the cart is deployed, the lengths of sleeves reside in a direction that is parallel to the length of cart 10. The wheels 505 are folded under the frame 10, residing in planes that are perpendicular or approximately perpendicular to the plane of support member 120B when the cart is deployed.

As shown in FIGS. 10A-10E, the handle assembly 110 is folded or pivoted away from the seatback 310, exposing the backstop when the cart is stowed and laying on a surface with the wheels 505 folded under the cart. The wheel assemblies 115A, 115B are then rotated downward, out from under the seat member 305 so that the wheels 505 reside in a plane that is perpendicular to the plane defined by the supporting member 120B of the seat member 305 (as shown in FIGS. 11A-11C). Once in their deployed positions, the pins 705 are inserted into the mounting assembly (i.e., the sleeve and mounting block). This embodiment has particular utility in situations where the user may encounter a bumpy surface. In such circumstances, if the cart is jolted enough by a bump, the wheels may be lifted off of the ground sufficiently to otherwise permit the sleeve 610 to fall away or disengage from one or both of the connectors, causing the wheels not to stay aligned with the length of the cart. However, the insertion of pins 705 will prevent the sleeves from moving vertically and disengaging from connector members. In circumstances where the cart's user is encountering a bumpy surface he or she is thus assured that wheels will be maintained in the same direction as the cart when the cart is jolted by bumps.

Referring to FIGS. 12A-12D, the armrest supports 270A, 270B and the forward 335 and rearward 340 leg members are placed into their deployed position by pulling the armrest supports 270A, 270B upward. Since the armrest supports 270A, 270B are pivotally connected to the rear leg member 340, the upward motion of the armrest supports causes rear leg member 340 to pivot toward the wheel assembly supports 640A and 640B. The same upward motion of armrest supports 270A, 270B causes front leg member 335 to pivot away from seat member 305 in the same direction as and in synchrony with the rear leg member 340 because the front leg member is also pivotally coupled to the armrest supports 370A, 370B.

At this stage, the sleeves 610 of the wheel mounting assemblies 515 are positioned to fit between the bent ends of the stop member 635 and the faces of the wheel assembly supports 640. The sleeves 610 are further positioned for wheel assembly support apertures 622 to respectively align with sleeve apertures 617. Locking pins 705 are then inserted through each of aligned holes to secure the mounting assemblies 515 in place. If there is other or alternative means to maintain wheel assemblies 115A, 115B in place, such means are engaged after sleeves are positioned to rest against the stop members 635. In some embodiments, particularly variations of the embodiments illustrated in FIGS. 8 and 9, there are no stop members so that the alternative means are solely used to maintain the wheel mounting assemblies in place.

Figure 14C:
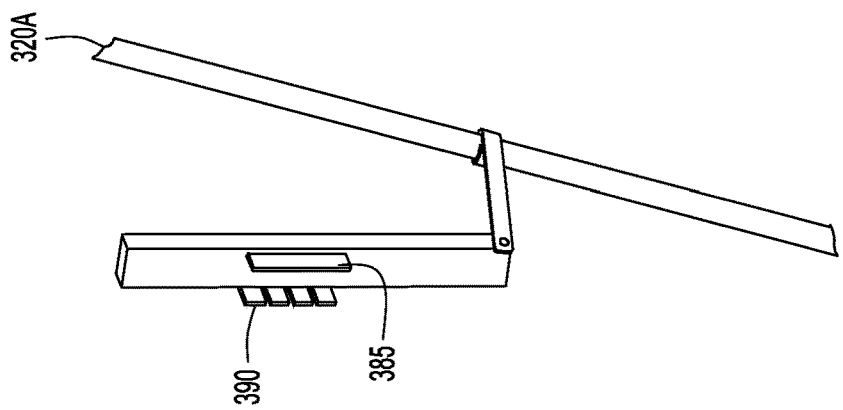
Figure 14B:
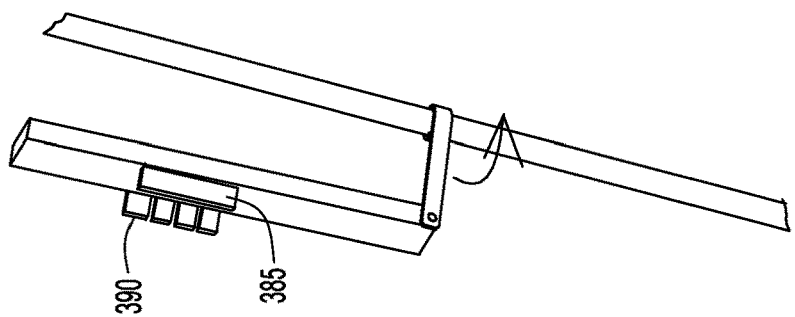
Figure 14A:
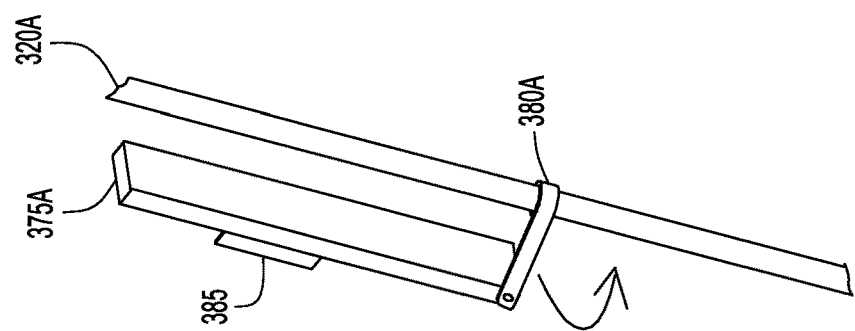

Next, as shown in FIGS. 13A-13D, the seatback 310 is folded or pivoted away from the seat member 305. As shown in FIGS. 14A-14C, each of the coupling rings 380A, 380B are rotated or pivoted around the corresponding arm 320A, 320B of the seatback member 310 to approximately align with the length of the armrest 375A, 375B that is attached to the corresponding side of seatback member 310. Each armrest 375A, 375B is then pivoted downward to the armrest support 370A, 370B, as shown in FIGS. 15A and 15B. The slots 392 are selected on plates 390A, 390B according to the angle of recline desired for seatback member 310 and the selected slots used to engage the arm plates 390A, 390B with corresponding boss 395A, 395B.

At this stage, the first bracket member 210A is configured to its deployed position by sliding the bracket member toward seat member 305. The apertures A formed into the first bracket member, the connection plates 242A, 242B, handle assembly arms 215A, 215B, and seat member arms 315A, 315B are aligned as described above, and the locking pins 240A, 240B are inserted through the aligned holes to secure the first bracket member 210A, the seat member 305, and the handle assembly 110 in place.

In addition to the procedures described in herein for deploying the cart, other combinations of folding the components of the cart may be used to deploy it.

Another embodiment of the invention is illustrated in FIGS. 16A and 16B. As shown, in this embodiment, the wheel assembly support bar 1605 is a single U-shaped piece that is pivotally attached to the platform 1610 where wheel assembly supports would otherwise be attached. A hole is located on each of the arms of wheel assembly support bar 1605 that aligns with wheel plate holes 1620 when the wheel assembly support bar 1605 is pivoted to fit between the sides of the wheel plate 1625A and 1625B, respectively. To secure wheel assembly support bar 1605 in place with wheel assemblies 1625A and 1625B, wheel plate pins 1630 are inserted through the apertures in the arms of wheel assembly support bar 1605 and wheel plate holes 1620.

Figure 17:
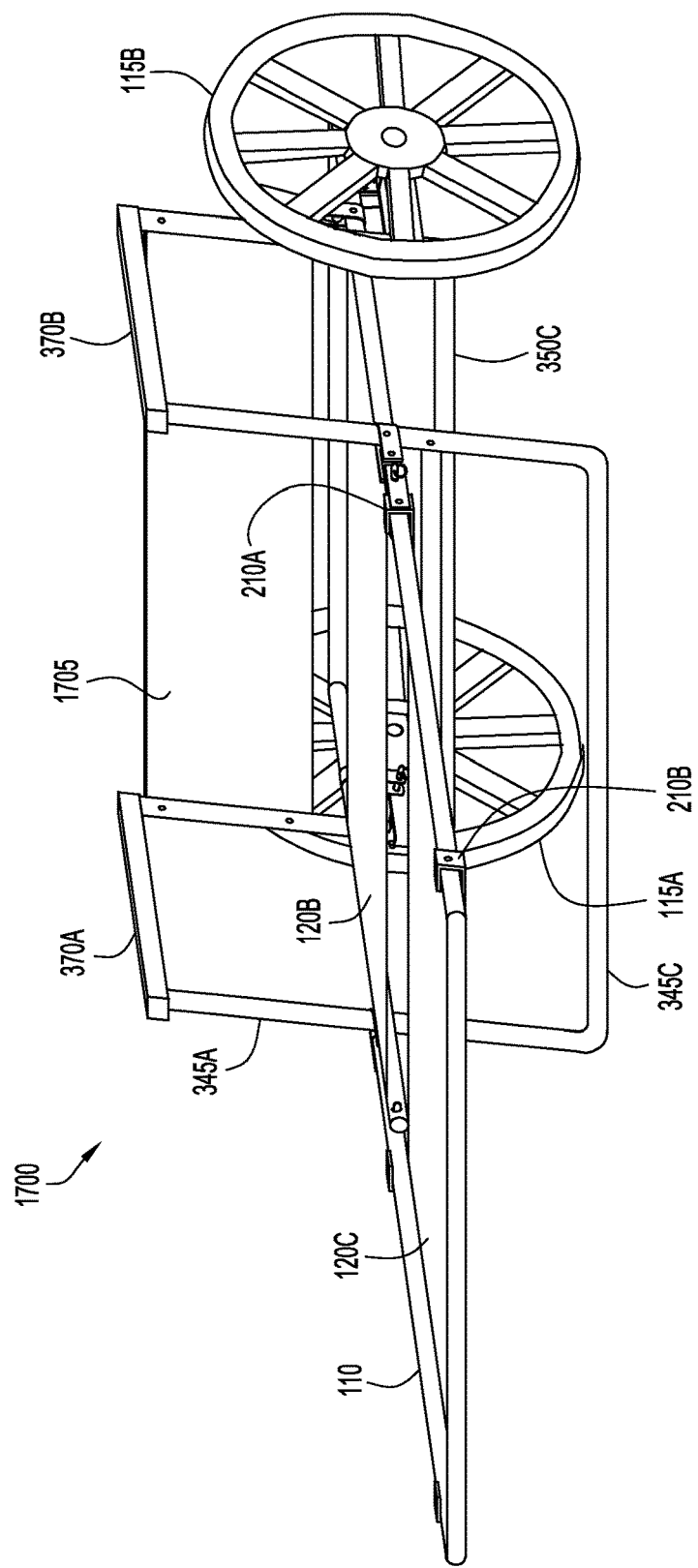
FIG. 17 illustrates a reconfigurable cart in accordance with another embodiment of the invention.
Figure 18:
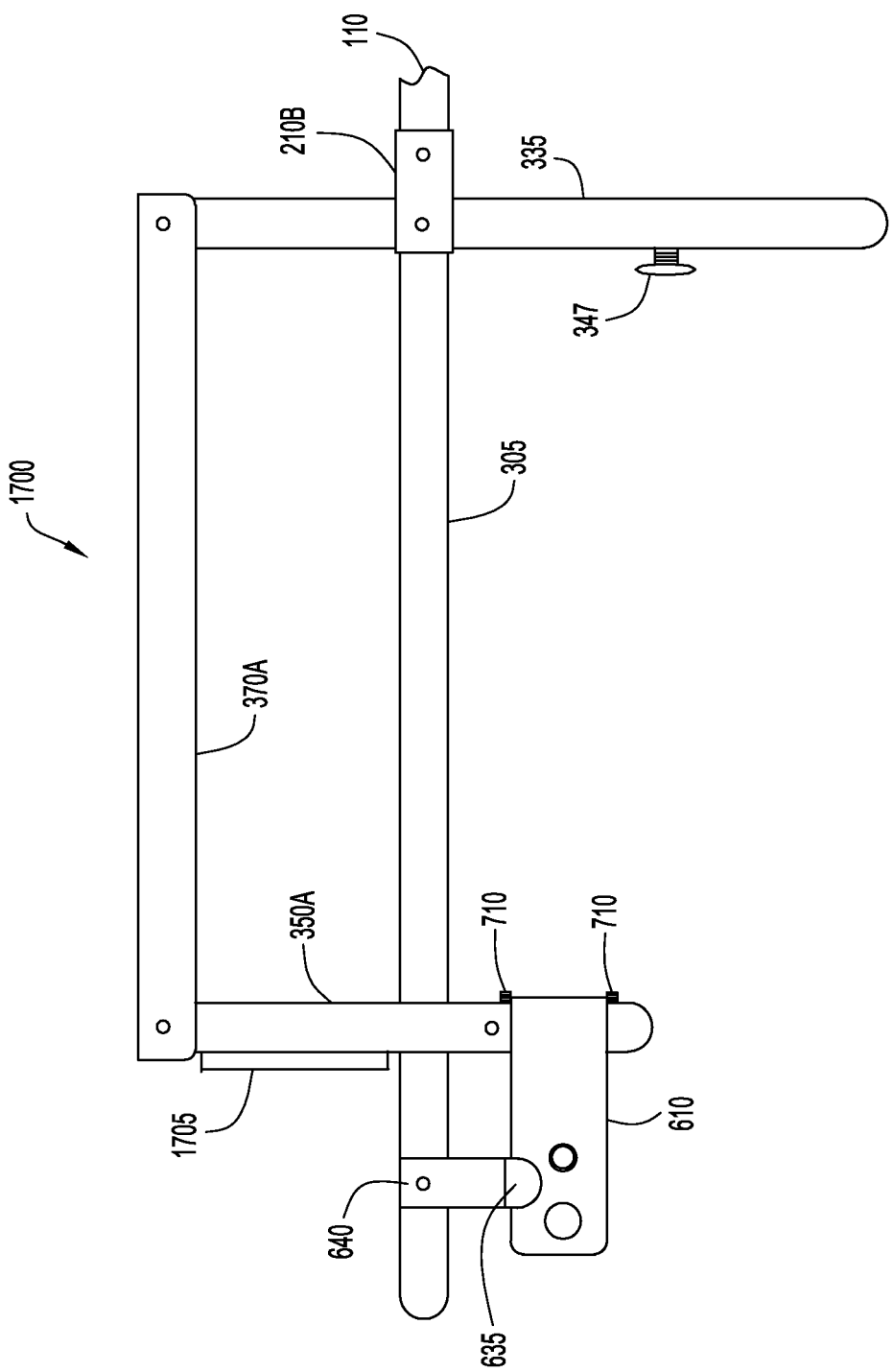
FIG. 18 illustrates a side view of the cart shown in FIG. 17, with the side post of the supporting assembly shown in isolation.

Another embodiment of the invention is illustrated FIGS. 17 and 18. In this embodiment, the cart 1700 includes a support assembly 105, a handle assembly 110, and wheel assemblies 115A, 115B similar to that described above. The support assembly 105, however, further includes a backstop 1705 that is directly attached to the portions of the arms 350A, 350B of the rear leg member 340 that extends above seat member 305 (i.e., the material 120B defining the seating/support area) when the cart 1700 is deployed. Depending on the particular embodiment, means may be included to prevent backstop 1705 from impeding the folding of the arms 350A, 350B of rear leg member 340. Such means could comprise a gap between the bottom of backstop 1705 and the seat member 305 to create the clearance needed for the bottom of backstop to avoid butting against or otherwise impeding rear leg member 340 from folding as compactly as possible.

Other means to achieve the same result may further include the location of pliable or soft goods material of sufficient width between seat member 340 and the backstop 1705 that will bend or fold rather than butt up against seat member when the rear leg member 340 is being folded for stowing. Further means could include a backstop 1705 and the seat member 305 having a supporting member extending from the backstop and to the seat member 305, e.g., a continuous piece of pliable or soft goods material spanning both components that is configured to bend or fold rather than butt up against backstop 1705 when the rear leg member 340 is being folded for stowing. In another embodiment, spacers are inserted between the arms 350A, 350B of the rear leg member 340 and the attachment points of backstop 1705 so that when the cart is stowed, the distance between the arms 350A, 350B of the rear leg member 340 and the backstop 1705 created by the spacers allow the backstop to rest above seat member 305 (i.e., the seating or support surface). In embodiments such as those depicted in FIGS. 17 and 18, the armrests 375A, 375B, notched plate 390A, 390B, and guide plates 385A, 385B may be omitted.

In another embodiment, the backstop 1705 may include a lower hinge portion that can be pivoted to rest against the top portion of the backstop 1705 thereby creating a gap between the backstop 1705 and the seat member 305. In embodiments in which the backstop 1705 is attached to the rear leg member 340, the angle of recline for backstop may not be adjustable.

Figure 19B:
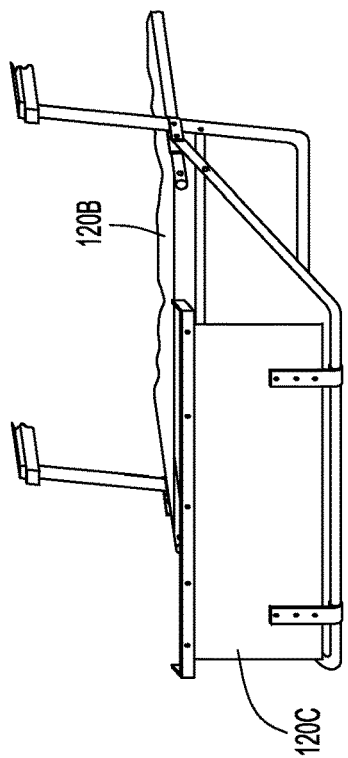
FIGS. 19A and 19B illustrate a perspective view of the handle assembly in accordance with another embodiment of the invention.
Figure 19A:
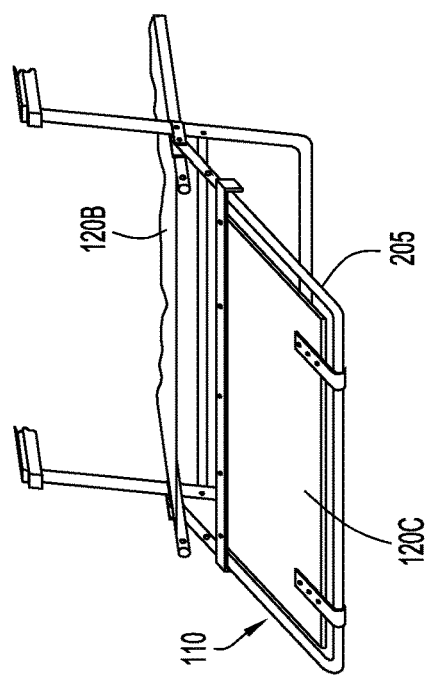

Another mechanism for deploying the handle assembly 110 and its associated support member 120C is illustrated in FIGS. 19A and 19B. As shown, one end of support member 120C is pivotally attached to the medial portion 215C of the handle assembly 110, which spans and connects it two arms. The unattached end of support member 120C would have short arms which project from it and rest on the arms of handle assembly 110. The rigid material could comprise metal, plastic, wood and/or other rigid or solid materials. In other embodiments, the length of seatback member 310 can simply be short enough to permit the handle assembly 110 to pivot over the unattached end of seatback member 310 and rest on top of seatback member without being required to retract, fold or otherwise stow the support member 120C. Other embodiments may include the handle assembly 110, but omit the handle assembly support member 120C, as well as the bracket members 210A, 210B so that the only support means is the support member 120 disposed on the seat member 305.

Figure 20:
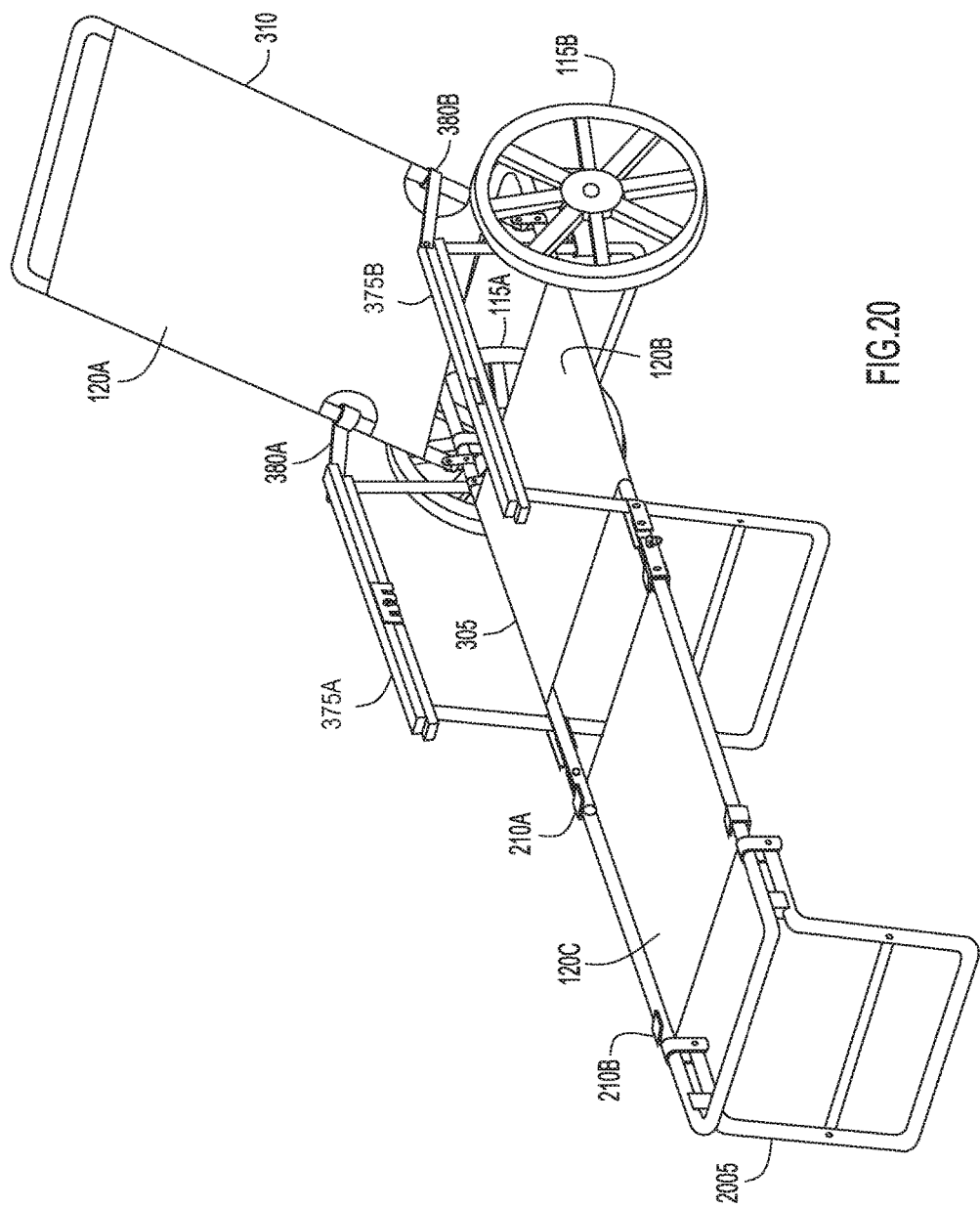
FIG. 20 illustrates a perspective view of a cart in accordance with another embodiment of the invention.

To add additional stability to the cart when it is deployed but not being used to transport items, a folding leg 2005 can be added to handle assembly 110, which is depicted in FIG. 20. If the cart is intended to also serve as a folding chaise lounge, the folding leg 2005 will add additional support for the user when the user is sitting or laying on it.

The cart described herein has utility where compactness, ease of deployment and strength would be ideal due to the circumstances of use.

One use is as a garden cart or utility cart with sides to contain items or material. As depicted in FIGS. 21A and 21B, sides 2105A and 2105B are included in the support assembly 105. Each of side 2105A, 2105B has a hole located in the edge that is opposite the edge pivotally attached to arms 315A, 315B of the seat member 305. When each of side 2105A, 2105B is pivoted toward the armrests 265A, 265B, the holes are aligned with a hole formed in each of the armrests 275A, 275B or armrest supports 270A, 270B respectively. Side pins 2110A and 2110B are then inserted into the aligned holes to hold sides 2105A, 2105B in place. Other means may be used to attach the sides 2105A, 2105B to the cart and maintain them in place.

The garden or utility cart embodiment may also comprise side pieces that are pivotally attached to the arms 215A, 215B of the handle assembly 110, which serve in the same manner as sides 2105A, 2105B to retain items resting on the support member 120C while they are being transported. The sides on the handle assembly 110 would also have a means to maintain them in place during the cart's deployment. Such means could be similar to or different from the means to maintain the sides 2105A, 2105B in place.

In the embodiment comprising a garden cart, the cart includes a backstop 1705 directly attached to rear leg member 340 instead of the seat member 305 via backstop connectors 325, 330. Alternatively, the backstop 1705 may be pivotally attached to the seat member 305 and secured in place using the same or similar means as used for sides 2105A, 2105B. In such an embodiment, the backstop 1205 may have a length which is short enough to avoid impeding the support member 120B from folding against backstop 1705 when the garden cart is being stowed.

Figure 22A:
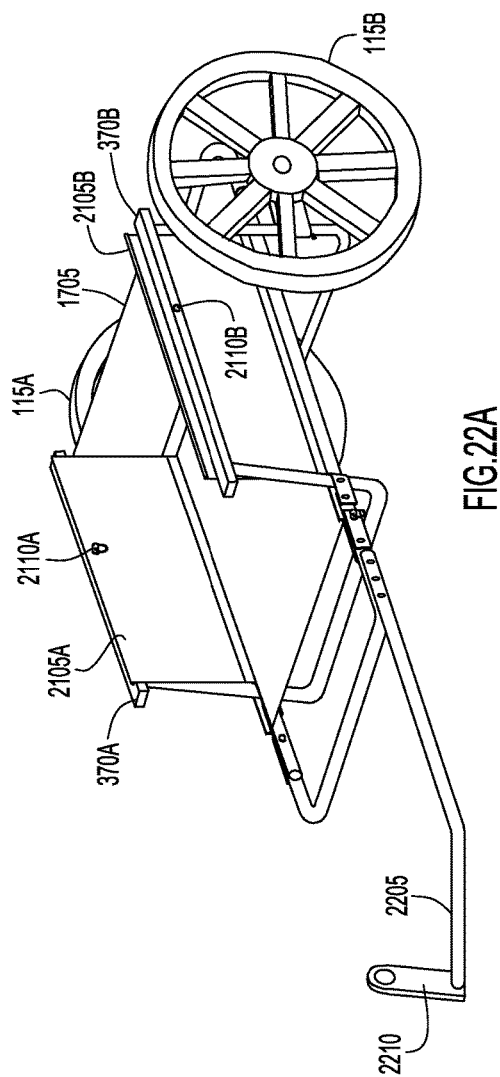
FIGS. 22A and 22B illustrate a perspective view of a cart in accordance with another embodiment of the invention.
Figure 22B:
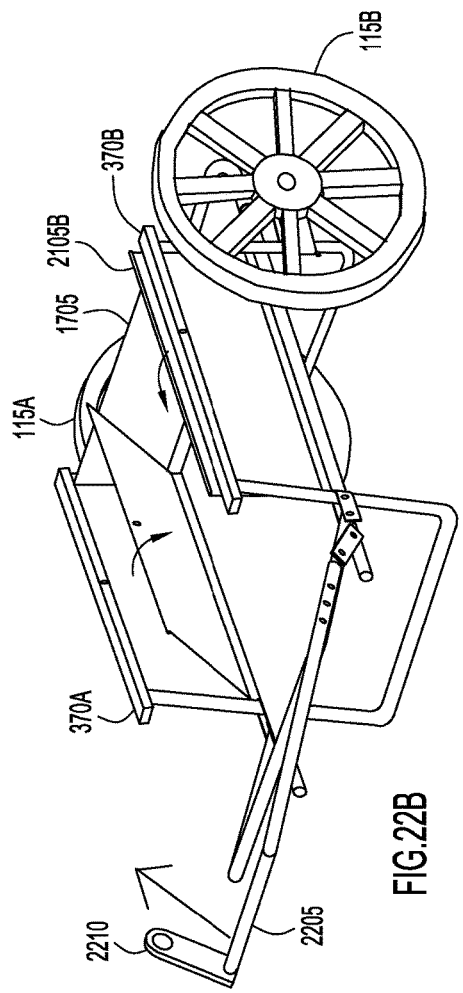

In instances where the user is riding a bicycle, the cart herein would have particular utility. In such case, the cart could be deployed and attached to the bicycle to be towed behind it. As shown in FIGS. 22A and 22B, one embodiment of the cart described herein may comprise a cart with sides 2105A, 2105B, a handle extension 2205, and hitch 2210. Hitch 2210 would be used to attach the cart to a bicycle for towing.

Figure 23:
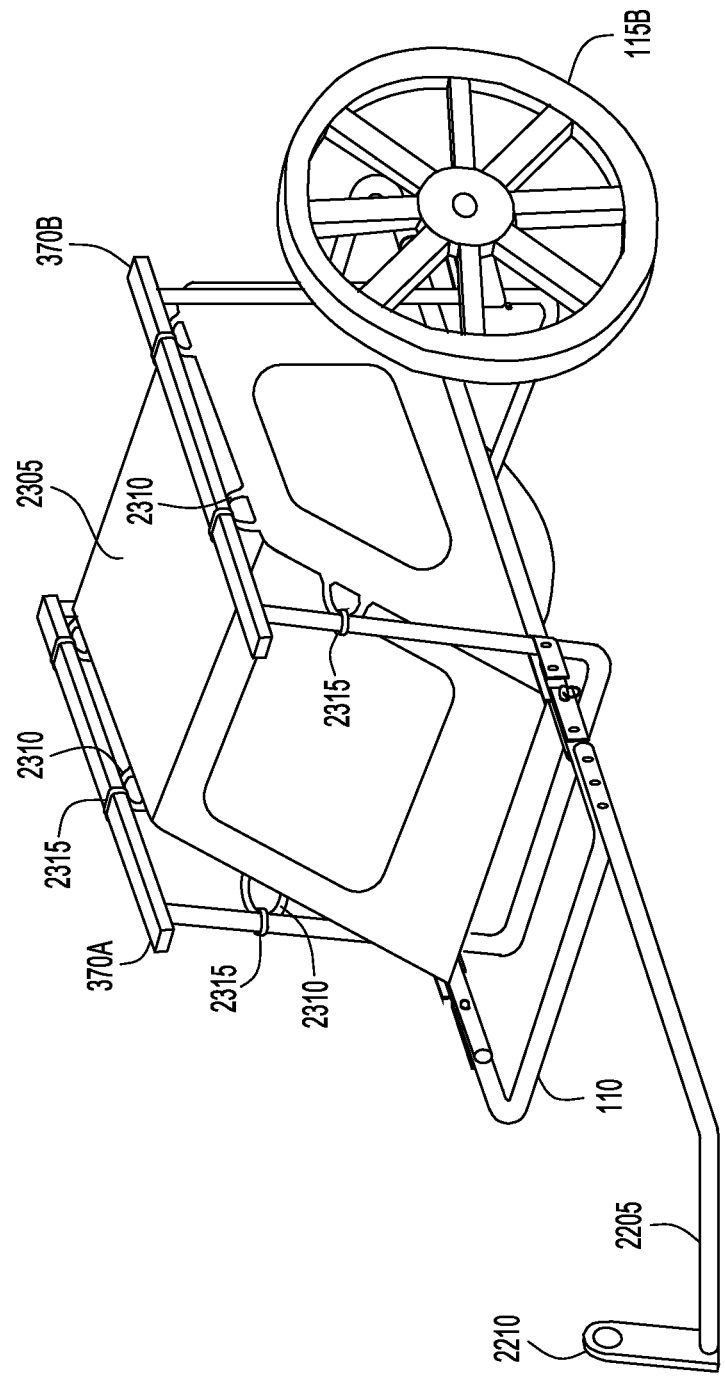
FIG. 23 illustrates a perspective view of a cart in accordance with another embodiment of the invention.

In the alternative embodiment shown in FIG. 23, the cart described herein can comprise a children's bicycle trailer or trailer to tow pets. In such embodiment, compartment 2305 is attached to the seat member 305. Loops 2310 are attached to compartment 2305 and are held in place against armrests 265A, 265B by bands 2315. The compartment 2305 may be made of soft material such as nylon or canvas. It may also comprise solid or rigid pieces to lend support for the structure and provide protection for the passengers. The compartment 2305 may comprise other structures and means to erect and secure it in place. The cart described herein may comprise other embodiments that comprise the features shown herein or additional features.

While the invention has been described in detail and with reference to specific embodiments thereof, it will be apparent to one skilled in the art that various changes and modifications can be made therein without departing from the spirit and scope thereof. For example, the number of wheel assemblies is not limited. While a two-wheeled cart is illustrated, carts including four or more wheel assemblies are contemplated. Instead of U-shaped frames with material spanning the gap of the "U," the assemblies could comprise other configurations. For example, it could comprise a solid piece of plastic, wood metal or other material. It could also comprise a square or rectangular frame with multiple cross pieces to form a lattice or similar configuration made of solid materials such as metal, plastic, wood or other materials.

Other means can be used to set seatback member in a selected angle of recline. One such means may comprise a series of holes located in a notched plate, each capable of being aligned with a hole in the armrest supports. The hole on each of notched plate which will result in the desired angle decline for backseat member is then selected and aligned with the hole on armrest support. A pin is then inserted into each set of the aligned holes which secures armrests in place Another embodiment of the invention is illustrated FIGS. 24 and 25. In this embodiment, the cart 3000 includes a frame 3100 that defines a support assembly 3105, a handle assembly 3110, and wheel assemblies 3115A, 3115B similar to that described above. The support assembly 3105 includes a seat member 3305 and a seatback member 3310. According to this embodiment, the seat member 3305 of the frame 3100 includes a generally U-shaped bar (e.g., a generally hollow, cylindrical bar) defined by a first arm or portion 3315A and a second arm or portion 3315B laterally spaced from the first arm by a medial portion or crossbar 3315C. Similarly, the seatback member 3310 of the frame 3100 includes a generally U-shaped bar (e.g., a generally hollow, cylindrical bar) defined by a first arm or portion 3320A and a second arm or portion 3320B laterally spaced from the first arm by a medial portion or crossbar 3320C.

The seatback member 3310 is pivotally coupled to the seat member 3305. Specifically, the distal portion (e.g., the distal end) of the first seatback arm 3320A is pivotally coupled to the first seat arm 3315A via a first seating connector 3325 disposed proximate the seat intermediate portion 3315C. Similarly, the distal portion (e.g., the distal end) of the second seatback arm 3320B is pivotally coupled to the second seat arm 3315B via a second seating connector 3330 disposed proximate the seat intermediate portion 3315C. Each seating connector 3325, 3330 may be a generally U-shaped connector having an arcuate medial portion contoured to the bars forming the seat member. When mounted on the seat member 3305, moreover, the seating connectors 3325, 3330 are oriented generally upright such that the arms of the "U" extend above the seating surface (as defined by supporting member 120B). In their deployed positions, the seat member 3305 is oriented in a generally horizontal position, while the seatback member 3310 is disposed in a generally vertical position (e.g., it may be oriented slightly angularly offset from vertical). With this configuration, the seat member 3305 and the seatback member 3310 define the seating or supporting area of the cart, being configured to support a user seated therein (or an object placed thereon).

The support assembly 3105 of the frame 3100 further includes a leg assembly with a first or forward leg member 3335 and a second or rearwardly angled leg member 3340. The forward leg member 3335 may be in the form of a generally U-shaped bar (e.g., a generally hollow, cylindrical bar) including a first upright arm or portion 3345A laterally spaced from a second upright arm or portion 3345B by a medial or crossbar portion 3345C. The second leg member 3340, however, may be in the form of a generally U-shaped bar (e.g., a hollow cylinder) with a slight bend. The second leg member 3340 includes a first rearwardly angled arm or portion 3350A laterally spaced from a second rearwardly angled arm portion 3350B by an intermediate portion or crossbar 3350C. When the cart 3000 is in its deployed position, the crossbar 3345C contacts the supporting surface (e.g., the ground).

One or both leg members 3335, 3340 may further include a cross brace 3347 operable to provide additional support to the leg member. In the embodiment shown in FIGS. 24 and 25, the cross brace 3347 on the forward leg member 3335 is attached to the front side of member (i.e., the side facing away from the cart). In this embodiment, the second leg member 3340 does not include a cross brace.

Each of the first 3335 and second 3340 leg members is pivotally coupled to the seat member 3305. Specifically, the first arm 3345A of the forward leg member 3335 is pivotally attached or coupled to the first arm 3315A of the seat member 3305 (proximate the forward (distal) portion of the seat member first arm 3315A), while the second arm 3345B of the forward leg member 3335 is pivotally attached or coupled to the second arm 3315B of the seat member 3305 (proximate the forward (distal) portion of the seat member second arm 3315B). Handle assembly connector 3355A is attached to first arm 3345A of forward leg member 3335 at the juncture of attachment of first arm 3345A and first arm 3315A of seat member 3305. Likewise, handle assembly connector 3355B is attached to second arm 3345B of forward leg member 3335 at the juncture of attachment of second arm 3345B and second arm 3315B of seat member 3305. Handle assembly connectors 3355A, 3355B can be attached at other locations on first arm 3345A and second arm 3345B respectively. Each of these handle assembly connectors 3355A, 3355B may be a generally U-shaped connector having an arcuate medial portion contoured to the first and second arms 3345A, 3345B of the forward leg member 3335. When mounted on the forward leg member 3335, moreover, the handle assembly connectors 3355A, 3355B are oriented generally horizontal such that the arms of the "U" extend forward from cart 3000.

The first rearwardly angled arm 3350A of the rearward leg member 3340 is coupled to the first arm 3315A of the seat member 3305 (proximate the intermediate portion 3315C of the seat section first arm 3315A) via a first rearward leg connector 3360A, while the second rearwardly angled arm 3350B of the rearward leg member 3340 is coupled to the second arm 3315B of the seat member 3305 (proximate the intermediate portion 3315C of the seat member second arm 3315B) via a second rearward leg connector 3360B (not shown). The leg connectors 3360A and 3360B may be a bar or member that is pivotally connected at one end to the rearwardly angled arms 3350A, 3350B and pivotally connected to the exterior portion 3328, 3333 (not shown) of axles 3327, 3332, respectively. As illustrated, first seating connector 3325 includes an axle 3327 that extends outwardly from the seating connector 3325. Similarly, second seating connector 3330 includes an axle 3332 (not shown) that extends outwardly from the seating connector 3330. Each of the axles 3327, 3332 extend outwardly from the seating connectors 3325, 3330 a distance where a portion of the axles 3327, 3332 contact the first and second reawardly angled arms 3350A, 3350B. This retains the first and second rearwardly angled arms 3350A, 3350B in the proper position whether the cart 3000 is in a stowed position or a deployed position. The axles 3327, 3332 prevent the first and second rearwardly angled arms 3350A, 3350B from folding past the first and second seating connectors 3325, 3330.

In its deployed position, the leg member 3335 is attached to seat member 3305 so that the leg member arms 3345A, 3345B extend below seat member 3305 in a manner that is generally perpendicular to the plane defined by the seat member. Conversely, in its deployed position, leg member 3340 is attached to seat member 3305 so that the leg member arms 3350A, 3350B extend below seat member 3305 in a manner that is angled between perpendicular to the plane defined by the seat member 3305 and parallel to the plane defined by the seat member 3305. As noted above, the leg member arms 3345A, 3345B, 3350A, 3350B are pivotally attached, or pivotally coupled, to the seat member 3305; consequently, the leg members 3335, 3340 may be pivoted from their deployed configuration to their stowed configuration, in which the leg members 3335, 3340 are oriented generally parallel to the plane defined by the seat member 3305. Additionally, the ends of leg member arms 3345A, 3345B of the forward leg member 3335 are pivotally connected to the ends of leg member arms 3350A, 3350B of the rearward leg member 3340 via pins or joining members.

Figure 24:
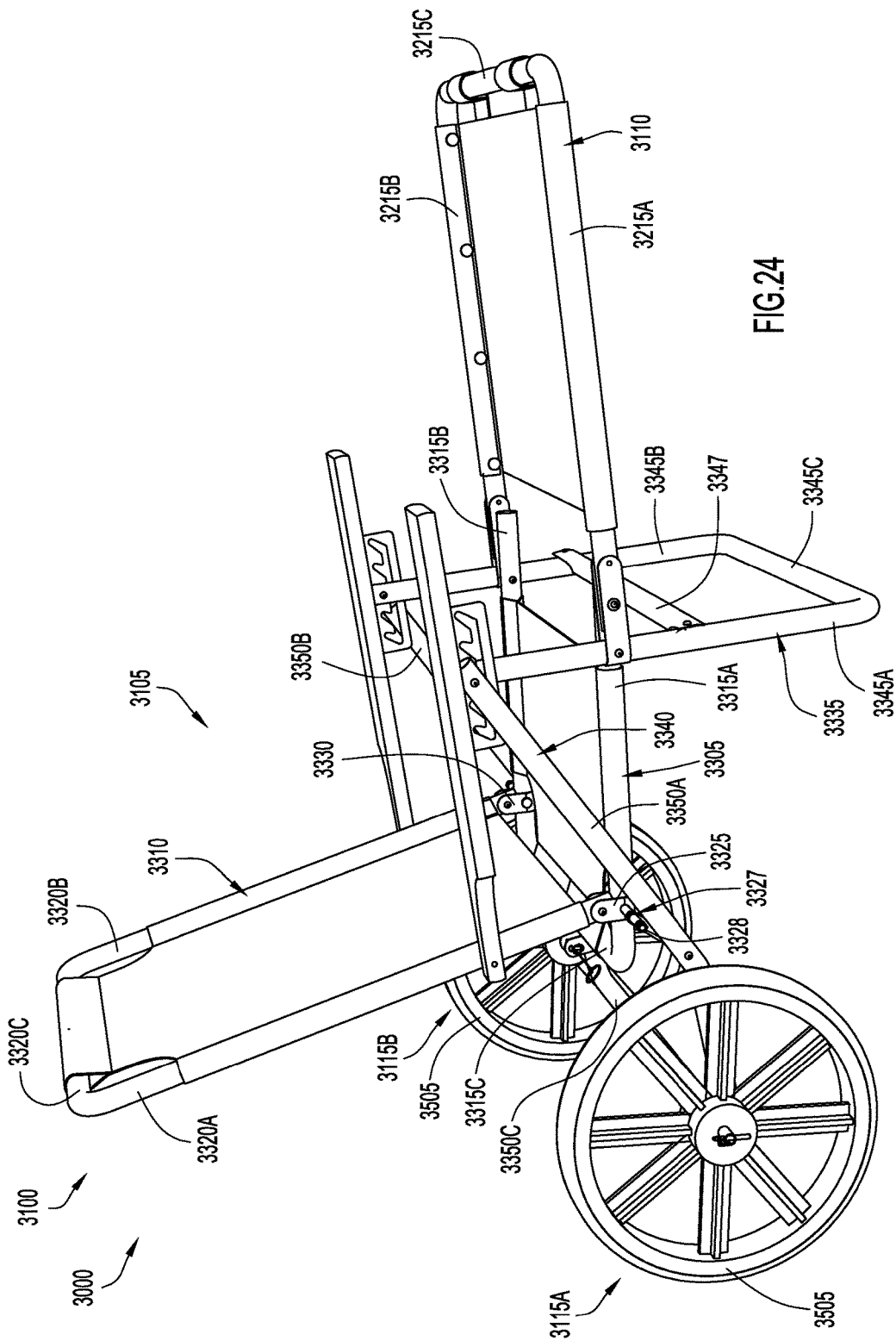
FIG. 24 illustrates a perspective view of a cart in accordance with another embodiment of the invention, showing the cart in its deployed configuration.
Figure 25:
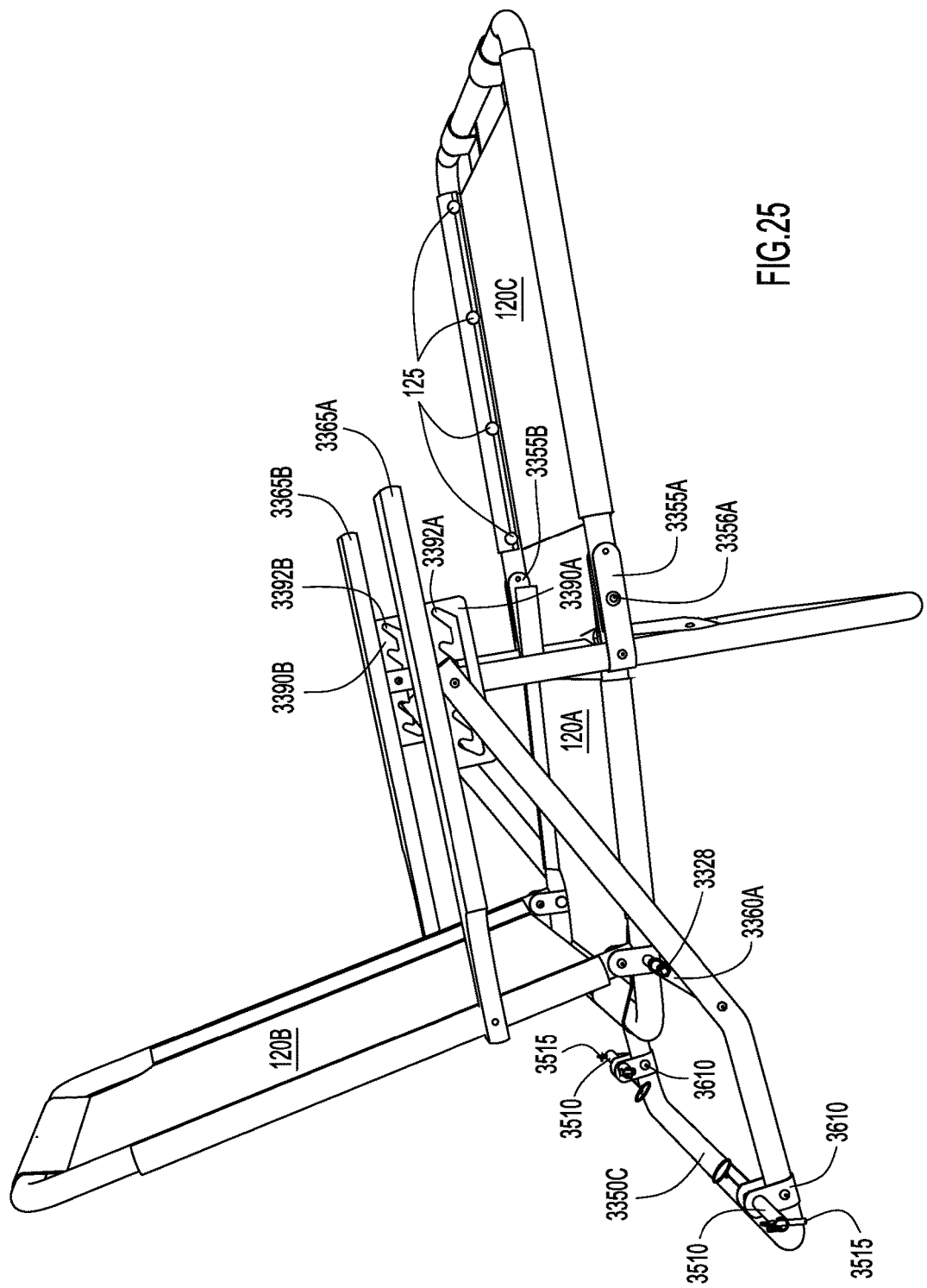
FIG. 25 illustrates a perspective view of a cart shown in FIG. 24 with the wheels removed for clarity.

The support assembly 3105 further includes one or more armrest assemblies 3365A, 3365B operable to support the arms of a user seated within the support assembly. The first armrest 3365A is pivotally coupled to the first arm 3320A of the seatback member 3310 via a pin. Similarly, the second armrest 3365B is pivotally coupled to the second arm 3320B of the seatback member 3310 via a pin. As illustrated, the first armrest 3365A spans and is supported by the connection of the ends of the first arms 3345A, 3350A of the forward 3335 and rearward 3340 leg members, and the second armrest 3365B spans and is supported by the connection of the ends of the second arms 3345B, 3350B of the forward 3335 and rearward 3340 leg members. The first arm rest 3365A includes a positioning plate 3390A, while the second arm rest 3365B includes a positioning plate 3390B. As illustrated in FIGS. 24 and 25, the pins that pivotally connect the ends of the leg member arms 3345A, 3345B of the forward leg member 3335 to the ends of leg member arms 3350A, 3350B of the rearward leg member 3340 are inserted through the positioning plates 3390A, 3390B. The positioning plates 3390A, 3390B include a plurality of elongated, laterally-spaced slots 3392 that mate with the pins that connect the ends of the forward leg member arms 3345A, 3345B with the ends of the rearward leg member arms 3350A, 3350B. In operation, a user pivots the armrests 3365A, 3365B downward, aligning the desired slot with the pins and inserting the pins into the slots 392 to secure the armrest 3365A, 3365B in the desired position. The longitudinal positioning of the armrests 3365A, 3365B control the angle of recline between the seatback member 3310 and the seat member 3305; consequently, adjusting the position of armrests 3365A, 3365B also controls whether the cart 3000 is in the deployed or stowed position.

Figure 26:
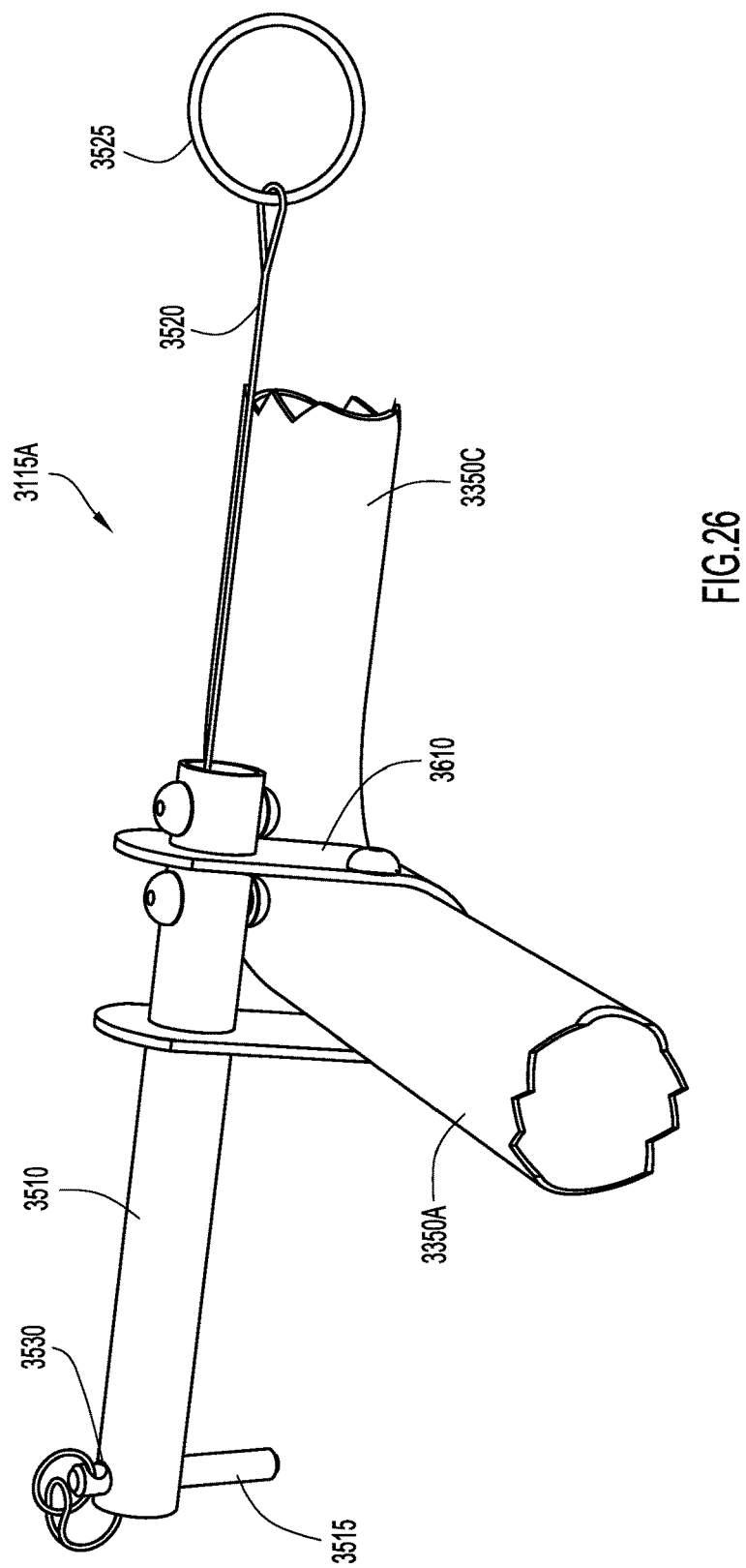
FIG. 26 illustrates the wheel assembly of the cart shown in FIG. 24, with the wheel removed for clarity.

Turning to FIG. 26, illustrated is an embodiment of the wheel assembly 3115A with the wheel 3505 removed for illustration. While FIG. 26 only illustrates wheel assembly 3115A, the discussion of FIG. 26 and wheel assembly 3115A applies to wheel assembly 3115B, as wheel assembly 3115A and wheel assembly 3115B are identical to one another. Each wheel assembly 3115A, 3115B includes a wheel 3505 rotatably mounted on a hollow axle 3510. The hollow axle 3510, in turn, is coupled to a mounting plate 3610 mounted on the first and second rearwardly angled arms 3350A, 3350B. The mounting plate 3610 may be a generally U-shaped connector having an arcuate medial portion contoured to the first and second rearwardly angled arms 3350A, 3350B of the rearward leg member 3340. As illustrated, the hollow axle 3510 is maintained in mounting plate 3610 via a pair of bolts through the hollow axle 3510. Threaded through the hollow axle 3510 is a tether 3520 with a ring 3525 coupled to one end of the tether 3520 and a pull pin 3515 coupled to the other end of the tether 3520. The ring 3525 is sized larger than the diameter of the axle 3510, preventing the ring 3525 and the end of the tether 3520 coupled to the ring 3525 from being pulled through the axle 3510. Additionally, the pair of bolts through the hollow axle 3510 prevent the pull pin 3515 and end of the tether 3520 coupled to the pull pin 3515 from being pull entirely through the hollow axle 3510. The hollow axle 3510 further includes a pair of apertures 3530 through the sidewalls of the end of the hollow axle 3510 positioned farthest from the mounting plate 3610. The apertures 3530 are sized and configured to receive the pull pin 3515. In the configuration illustrated in FIG. 26, the pull pin 3515 is inserted into the pair of apertures 3530, which can be used to either retain a wheel 3505 on the hollow axle 3510 or prevent a wheel 3505 from being placed on the hollow axle 3510.

Referring back to FIGS. 24-25, the handle assembly 3110 includes a generally U-shaped bar (e.g., a hollow, generally cylindrical bar) defined by a first arm or portion 3215A laterally spaced from a second arm or portion 3215B via a medial portion or crossbar 3215C. The distal portion of the handle first arm 3215A is pivotally coupled to the first handle assembly connector 3355A. Similarly, the distal portion of the second arm 3215B of the handle assembly 3110 is pivotally coupled to the second handle assembly connector 3355B. With this configuration, the handle assembly pivots with respect to the seat member 3305 via the pivot connection provided by the handle assembly connectors 3355A, 3355B. As shown, the distal ends of the handle arms 3215A, 3215B may be configured to overlap with the distal ends of the seat member arms 3315A, 3315B, with the arms being oriented adjacent and generally parallel to each other in their deployed positions.

Figure 30:
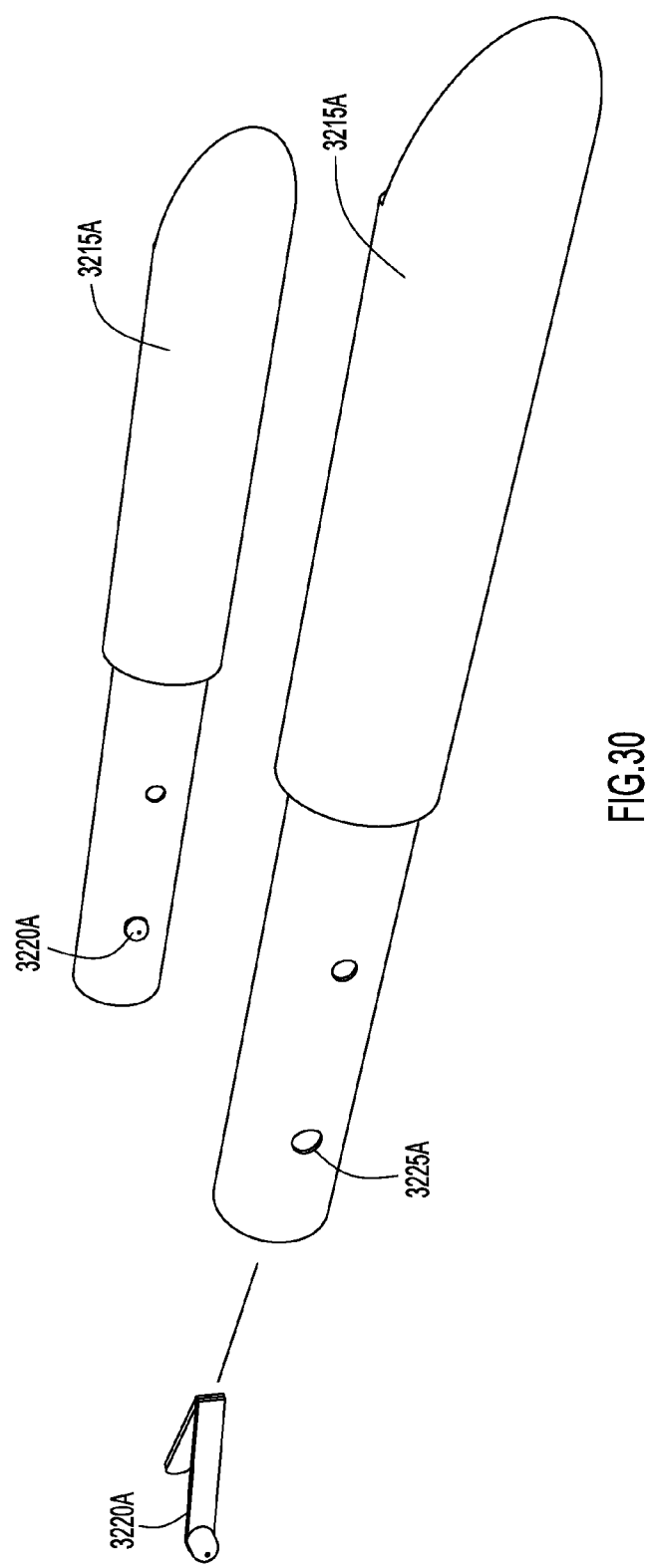
FIG. 30 illustrates an exploded view of the handle arms and snap button of the handle of the cart shown in FIG. 24.

The handle assembly connectors 3355A, 3355B include an aperture 3356A, 3356B (not shown). Furthermore, as illustrated in FIG. 30, the handle arms 3215A, 3215B each include an aperture 3225A, 3225B (not shown). The apertures 3225A, 3225B of the handle arms 3215A, 3215B are oriented such that, when the distal ends of the arms 3215A, 3215B are oriented in their deployed position (i.e., the handle arms 3215A, 3215B are oriented generally parallel to the seat member arms 3315A, 3315B), the apertures 3225A, 3225B align with the apertures 3356A, 3356B of the forward leg connectors. This enables the snap buttons 3220A, 3220B located within the distal ends of the arms 3215A, 3215B to snap into the apertures 3356A, 3356B of the handle assembly connectors 3355A, 3355B. The apertures 3356A, 3356B of the handle assembly connectors 3355A, 3355B are disposed in the middle of the handle assembly connectors 3355A, 3355B, with the handle arms 3215A, 3215B pivoting about the pin in the end of the handle assembly connectors 3355A, 3355B. Once the snap buttons 3220A, 3220B extends through the arms the arms, the handle assembly 3110 is locked into position with respect to the seat member 3305. When the cart is to be stowed, the snap buttons 3220A, 3220B are pushed inward from the apertures 3356A, 3356B of the handle assembly connectors 3355A, 3355B so that the snap buttons 3220A, 3220B disengage apertures 3356A and 3356B, enabling the handle arms 3215A, 3215B to pivot about the handle assembly connectors 3355A, 3355B to a stowed position.

Referring to FIGS. 27A-27E, the wheel assembly 3115A is illustrated demonstrating the removal of the wheel 3505 from the wheel assembly 3115A. While FIGS. 27A-27E only illustrates wheel assembly 3115A, the discussion of FIGS. 27A-27E and wheel assembly 3115A applies to wheel assembly 3115B, as wheel assembly 3115A and wheel assembly 3115B are identical to one another. As illustrated in FIG. 27A, wheel 3505 is rotatably coupled to the hollow axle 3510 and held in place by the pull pin 3515. In FIGS. 27B and 27C, the pull pin 3515 has been pulled out of the apertures 3530 of the hollow axle 3510, and the ring 3525 is then pulled to thread the tether 3520 and the pull pin 3515 through the longitudinal opening of the hollow axle 3510 as far as possible. As illustrated in FIG. 27D, with the pull pin 3515 pulled as far into the longitudinal opening of the hollow axle 3510 as possible, the wheel 3505 can be removed from the hollow axle 3510. Finally, in FIG. 27E, illustrated is the wheel 3505 pulled off of the hollow axle 3510, completing removal of the wheel 3505 from the cart 3000.

Figure 28A:
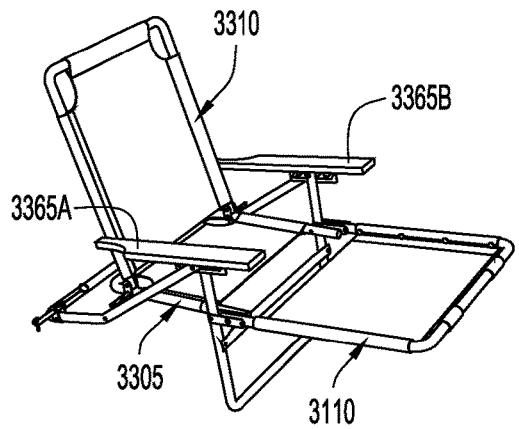
FIGS. 28A-28E illustrate the folding process of the cart shown in FIG. 24.
Figure 28B:
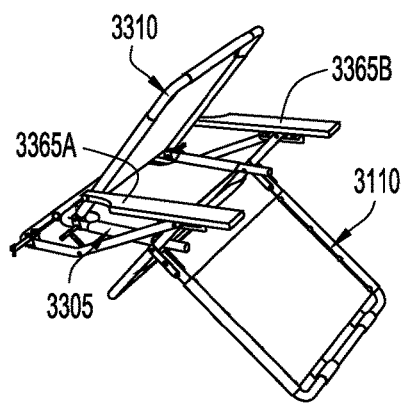
Figure 28C:
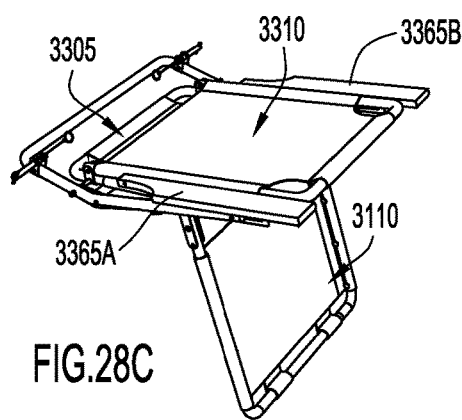
Figure 28D:
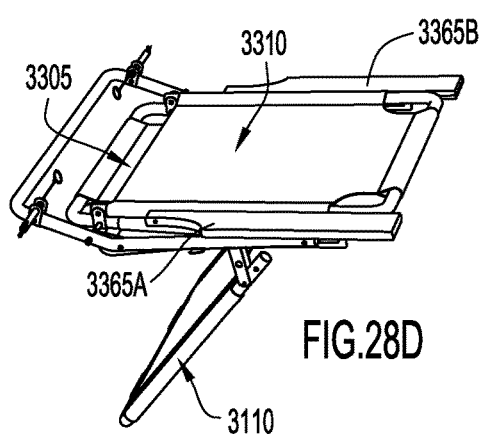
Figure 28E:
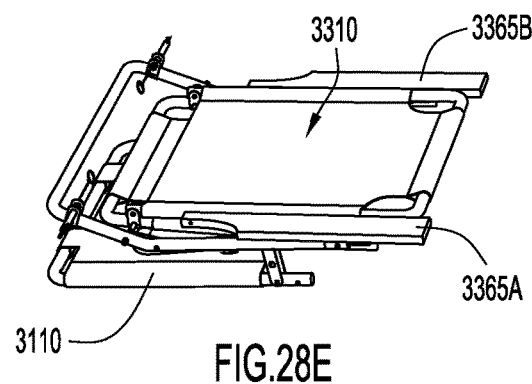

Referring to FIGS. 28A-28E, the cart 3000 is illustrated demonstrating the folding process, folding the cart 3000 from its deployed position FIG. 28A to its stowed position FIG. 28E. For illustrative purposes, the wheels 3505 have been removed from the wheel assemblies 3115A, 3115B. As illustrated in FIG. 28A, the cart 3000 is in the deployed position with the seatback member 3310 being substantially perpendicular to the seat member 3305. Furthermore, the handle assembly 3110 is extending substantially parallel from the front of the seat member 3305. As illustrated in FIGS. 28B and 28C, the seatback member 3310 is being folded towards the seat member 3305. The seatback member 3310 is pivoting with respect to the seat member 3305 about the first and second seating connectors 3325, 3330. The seatback member 3310 is being pivoting about the first and second seating connectors 3325, 3330 from being substantially perpendicular to the seat member 3305 to being substantially parallel to the seat member 3305. Because of the connection of the seat member 3305 to the forward leg member 3335, the connection of the seat member 3305 to the rearward leg member 3340 via the rearward leg connectors 3360A, 3360B, and the connection of the seatback member 3310 to the forward leg member 3335 and the rearward leg member 3340 via the arm rests 3365A, 3365B, when the seatback member 3310 is folded to be parallel with the seat member 3305, the forward leg member 3335 and rearward leg member 3340 are pivoted to be substantially parallel to the seat member 3305. Once the seatback member 3310 has been folded to be substantially parallel to the seat member 3305, as illustrated in FIG. 28C, the handle assembly 3310 is extending substantially perpendicular from the bottom of the seat member 3305. As the forward leg member 3335 pivoted to be parallel with the seat member 3305, the handle assembly connectors 3355A, 3355B, along with the handle assembly 3110, were pivoted to a position substantially perpendicular to the seat member 3305. As illustrated in FIGS. 28D and 28E, the handle assembly 3110 is pivoted from its deployed position to its stowed position by pivoting about the handle assembly connectors 3355A, 3355B. As explained previously, the snap buttons 3220A, 3220B located within the distal ends of the arms 3215A, 3215B of the handle assembly 3110 enable the handle assembly to be locked into the deployed position by snapping into the apertures 3356A, 3356B of the handle assembly connectors 3355A, 3355B. In the stowed position, the handle assembly is aligned substantially parallel to the seat member 3305, but with the handle assembly being positioned proximate to the bottom of the seat member 3305. The complete stowed position of the cart 3000 is illustrated in FIG. 28E.

Figure 29A:
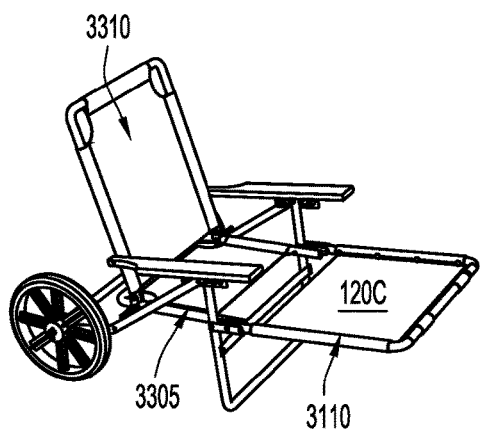
FIGS. 29A-29D illustrate the deployment of the handle and supporting platform of the cart shown in FIG. 24 so the cart may be used as a chair.
Figure 29B:
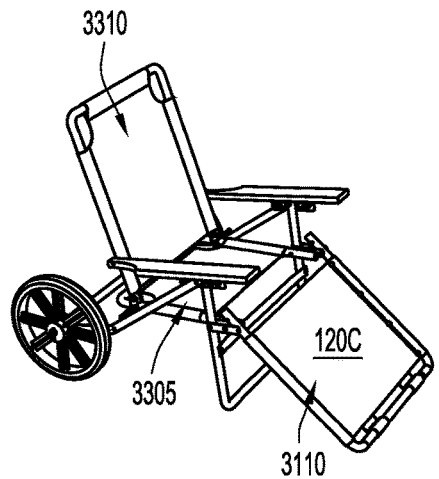
Figure 29C:
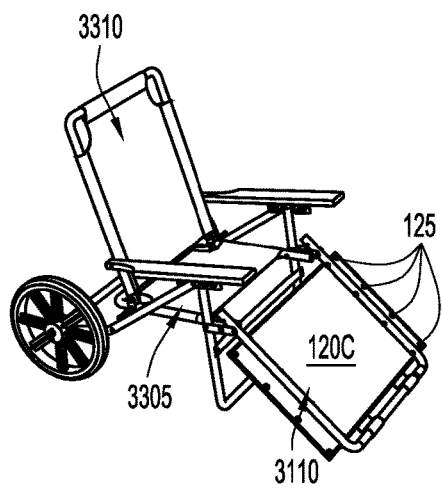
Figure 29D:
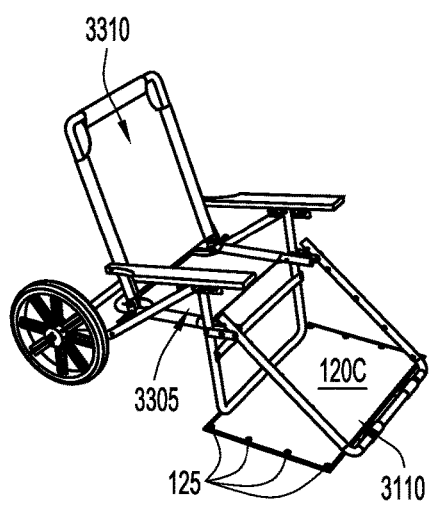

Referring to FIGS. 29A-29D, the cart 3000 is illustrated demonstrating the conversion of the cart 3000 to be used as a chair. As illustrated by the FIGS., the conversion of the cart 3000 into a configuration to be used as a chair requires a repositioning of the handle assembly 3110. As previously described, the snap buttons 3220A, 3220B, located within the distal ends of the arms 3215A, 3215B of the handle assembly 3110, snap into the apertures 3356A, 3356B of the handle assembly connectors 3355A, 3355B. By pressing the snap buttons 3220A, 3220B, the handle assembly 3110 can be released to pivot about the handle assembly connectors 3355A, 3355B. As illustrated in FIG. 29B, the handle assembly 3110 has been released from its deployed position to pivot downwardly so crossbar 3215C is resting on the support surface. As illustrated in FIG. 29C, the supporting member 120C is disconnected from the arms 3215A, 3215B of the handle assembly 3110 by releasing the plurality of connections 125. These connections 125 may be buttons, hook and loop fasteners, snaps, or any other similar means for connecting the supporting member 120C to the handle assembly arms 3215A, 3215B. The supporting member 120C is pivotally connected to the crossbar 3215C so that once the connections 125 are undone, the supporting member 120C can be configured to rest on the supporting surface, as illustrated in FIG. 29D. In this chair configuration, a users feet and legs are free to intersect the plane defined by the handle assembly 3110 so the users feet can ultimately rest upon the supporting member 120C as it is resting on the support surface.

Figure 31B:
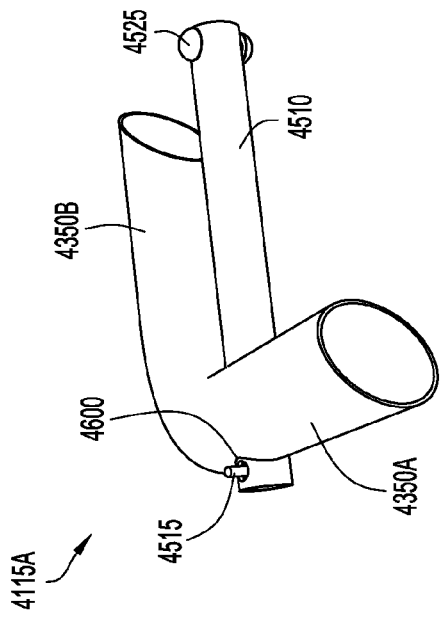
FIGS. 31A-31B illustrate a wheel assembly of a cart in accordance with another embodiment of the invention, the wheel assembly being shown in a deployed and stowed configuration.
Figure 31A:
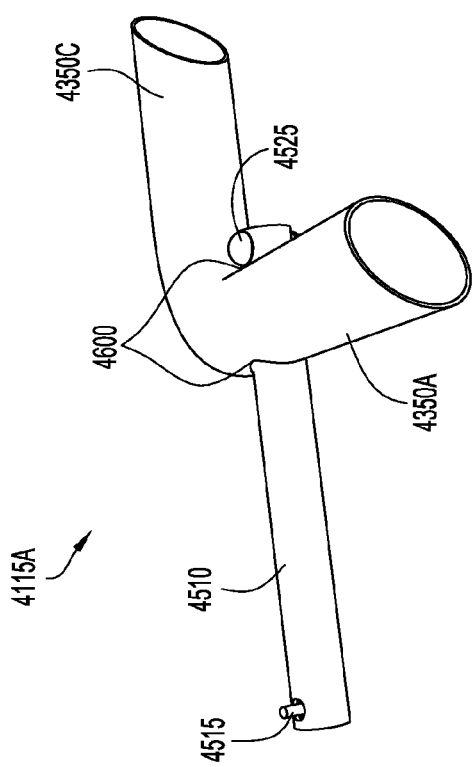

Turning to FIGS. 31A and 31B, illustrated is another embodiment of the wheel assembly 4115A with the wheel removed for illustration. While FIGS. 31A and 31B only illustrates one wheel assembly 4115A, the discussion of FIGS. 31A and 31B and wheel assembly 4115A applies to a second wheel assembly that is identical, but mirrored, to wheel assembly 4115A. As illustrated, a set of apertures 4600 are disposed on the rearwardly angled arm 4350A at a location in the proximity to the connection of the rearwardly angled arm 4350A and the crossbar portion 4350C. The apertures 4600 are sized and configured to receive an axle 4510. The axle 4510 includes a bolt 4525 through one end and a snap button 4515 extending through a portion of the axle 4510 on the opposite end. The snap button 4515 is similar to the snap button 3220A embodiment illustrated in FIG. 30. The bolt 4525 is disposed on the first end of the axle 4525 with two protrusions extending outwardly from the axle 4525 at two locations opposite of one another. Furthermore, the snap button 4515 is disposed within the second end of the axle 4510 and includes a portion that extends through only one location on the axle 4510. The axle 4510 is configured to slide through the apertures 4600 in the rearwardly angled arm 4350A. The snap button 4515 and the bolt 4525 extending outwardly from the axle 4510 allow the axle to slide between a deployed configuration, illustrated in FIG. 31A, and a stowed configuration, illustrated in FIG. 31B. When the axle 4510 is in the deployed configuration, the axle 4510 is slid outwardly through the apertures 4600 so bolt 4525 is positioned adjacent to the rearwardly angled arm 4350A. In the deployed configuration, the snap button 4515 can be depressed so that a wheel can be slid onto the axle 4510. Conversely, when the axle 4510 is in the stowed configuration, the axle 4510 is slide inwardly through the apertures 4600 so the snap button 4525 is positioned adjacent to the rearwardly angled arm 4350A. When in the stowed configuration, the axle 4510 is not able to receive a wheel.

Referring to FIGS. 32A-32C, another embodiment of the wheel assembly 5115A is illustrated demonstrating the placement of the wheel 5505 on the wheel assembly 5115A. While FIGS. 32A-32C only illustrates wheel assembly 5115A, the discussion of FIGS. 32A-32C and wheel assembly 5115A applies a second wheel assembly that is identical, but mirrored, to wheel assembly 5115A. In this embodiment, the wheel assembly 5115A includes an axle 5510 that extends through the rearwardly angled arm 5350A at a location proximate to the connection between the rearwardly angled arm 5350A and crossbar portion 5350C. Unlike previous embodiments of the wheel assemblies, where each wheel assembly included its own axle, the axle 5510 in this embodiment is a single axle that extends between this wheel assembly 5115A and a second wheel assembly not shown. Other embodiments may employ two axles to achieve the same effect. The axle 5510 includes a first aperture 5511 and a second aperture 5513 that are positioned on the portion of the axle 5510 that is outside of the rearwardly angled arm 5350A. Moreover, as illustrated in FIG. 32A, a double snap button 5515, which includes a first snap button 5517 and a second snap button 5519 located on the same resilient member, is inserted into the end of the axle 5510 so that the first snap button 5517 extends through the first aperture 5511 and the second snap button 5519 extends through the second aperture 5513. Additionally, in this embodiment, the wheel 5505 includes two bearings 5507A, 5507B that couple to the two sides of the wheel 5505 before the wheel 5505 is placed on the axle 5510. As illustrated in FIGS. 32A and 32B, each of the bearings 5507A, 5507B fit onto each side of the wheel 5505 at the openings that receive the axle 5510. When coupled to the wheel 5505, the bearings 5507A, 5507B do not extend into the interior of the wheel 5505 far enough to contact each other. Therefore, a space (not shown) is located between the bearings 5507A, 5507B within the interior of the wheel 5505. The bearings 5507A, 5507B enable the wheel 5505 to rotate more smoothly about the axle 5510 than in other embodiments when a wheel is rotatably placed on an axle without any bearings.

As illustrated in FIGS. 32B and 32C, once the bearings 5507A, 5507B have been coupled to the wheel 5505 and the double snap button 5515 has been inserted into the end of the axle 5510, the wheel 5505 is rotatably coupled to the axle 5510. In the embodiment illustrated in FIG. 32C, the wheel 5505 is inserted onto the axle 5510 so that the bearing 5507B is located between the first snap button 5517 and the second snap button 5519. Therefore, the distance between the first and second snap buttons 5517, 5519, and the first and second apertures 5511, 5513 is greater than the width of the bearing 5507B coupled to the wheel 5505, so that the second snap button 5519 extends outwardly from the axle 5510 into the space between the bearings 5507A, 5507B. In another embodiment not illustrated, the wheel 5505 may be inserted onto the axle 5510 so that the wheel 5505 and the bearings 5507A, 5507B are located between the first snap button 5517 and the second snap button 5519. Therefore, the distance between the first and second snap buttons 5517, 5519, and the first and second apertures 5511, 5513 is greater than the width of the wheel 5505 with the bearings 5507A, 5507B coupled to the wheel 5505.

The purpose of the double snap button 5515 is to ensure proper placement of the wheel 5505 on the axle 5510 while still allowing the wheel 5505 to be removed from the axle 5510 when the cart is placed in its stowed configuration. As stated previously, the interior of the wheel 5505 contains a space between the bearings 5507A, 5507B. If the axle 5510 only included one snap button 5519, instead of two snap buttons 5517, 5519, once the wheel 5505 starts to slide over the location of the one snap button 5519, the snap button 5519 would extend outwardly from the axle 5510 into the space between the bearings 5507A, 5507B. Because this space is within the interior of the wheel 5505, access to the one snap button 5519 is no longer available. Thus, making removal of the wheel 5505 from the axle 5510 cumbersome and difficult. However, the double snap button 5515 with first snap button 5517 and second snap button 5519 allows for proper placement and removal of the wheel 5505 from the axle 5510. During operation, once the wheel 5505 is placed on the axle 5510 and is slid toward the rearwardly angled arm 5350A, the second snap button 5519 is pressed down into the second aperture 5513 so that the second snap button 5519 does not extend through the second aperture 5513. Once the wheel 5505 is slid over the second aperture 5513, the second snap button 5519 may return to extending from the second aperture 5513, which would result in the second snap button 5519 is extending into the space between the bearings 5507A, 5507B. However, because the first and second snap buttons 5517, 5519 are located on the same resilient member of the double snap button 5515, pressing the first snap button 5517 into the first aperture 5511 until the first snap button 5517 no longer extends through the first aperture 5511 also depresses the second snap button 5519 so that second snap button 5519 no longer extends through the second aperture 5513. This allows the wheel 5505 to slide completely past the second snap button 5519 on the axle 5510 and into a position where the first snap button 5517 is located on one side of the wheel 5505 and the second snap button 5519 is located on another side of the wheel 5505. Removing the wheel 5505 from the axle 5510 requires pressing the first snap button 5517 until it no longer extends through the aperture 5511 so that the second snap button 5519 no longer extends through the second aperture 5513 as the wheel 5505 is slid off of the axle 5505.

Figure 33B:
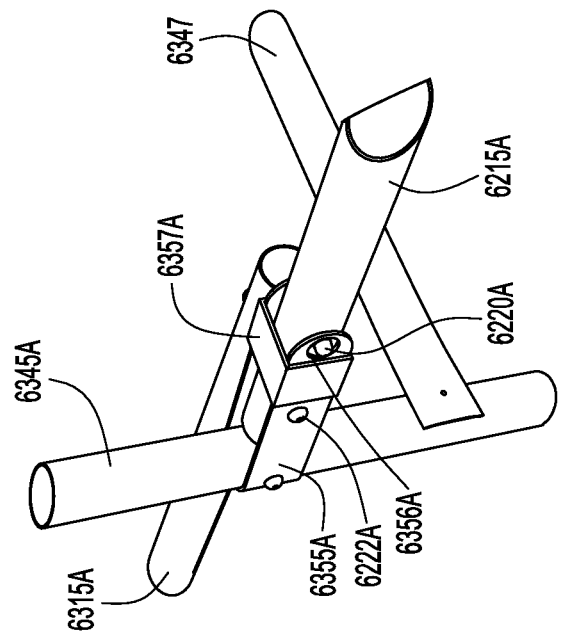
FIGS. 33A-33B illustrate the connection of a handle with a leg connector of a cart in accordance with another embodiment of the invention, showing the handle arm being reconfigurable between a first and a second configuration.
Figure 33A:
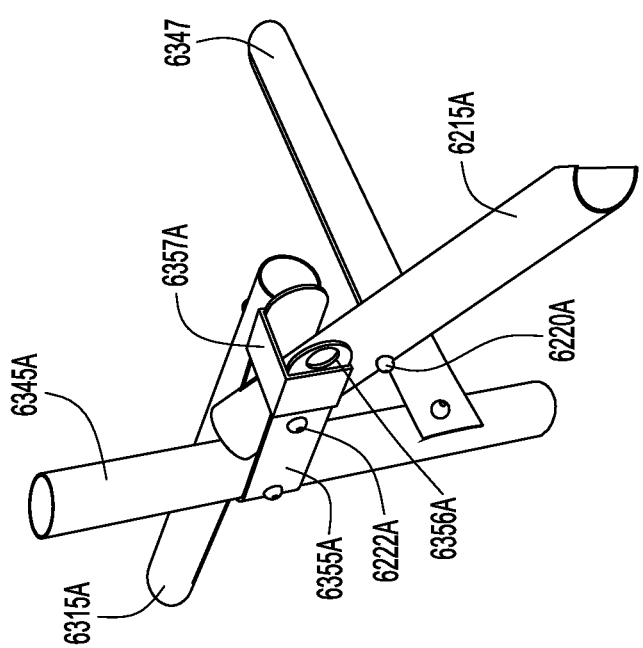

Turning to FIGS. 33A and 33B, illustrated is the connection of a handle with a leg connector of a cart in accordance with another embodiment of the invention. As stated previously, a handle assembly 6110 (not shown), which has a similar structure to that described for handle assembly 3110, includes a generally U-shaped bar (e.g., a hollow, generally cylindrical bar) defined by a first arm or portion 6215A laterally spaced from a second arm or portion 6215B (not shown) via a medial portion or crossbar 6215C (not shown). As illustrated in FIGS. 33A and 33B, the distal portion of the handle first arm 6215A is pivotally coupled to the first forward leg connector 6355A. Similarly, but not shown, the distal portion of the second arm 6215B of the handle assembly 6110 is pivotally coupled to the second forward leg connector 6355B. While FIGS. 33A and 33B only illustrates the first arm 6215A attached to first forward leg connector 6335A, the discussion of FIGS. 33A and 33B applies to the attachment of the second arm 6215B to the second forward leg connector 6355B. As illustrated in FIGS. 33A and 33B, and as similarly discussed for the embodiment illustrated in FIGS. 24 and 25, the first upright arm 6345A of the forward leg member 6335 (not shown) is connected to the first arm 6315A of seat member 6305 (not shown). Moreover, coupled to the first upright arm 6345A is a forward leg connector 6355A, which may be a generally U-shaped connector having an arcuate medial portion contoured to the first arm 6345A of the forward leg member 6335 (not shown). When mounted on the forward upright arm 6345A, the leg connector 6355A is oriented generally horizontal such that the arms of the "U" extend forward.

As illustrated in FIGS. 33A and 33B, the distal ends of the first arm 6215A of the handle assembly 6110 (not shown) are placed within the arms of the leg connector 6355A. The distal end of the first arm 6215A is pivotally coupled to the middle portion of the leg connector 6355A at pivotal connection 6222A. Additionally, disposed on the outer arm of the leg connector 6355A is an opening 6356A. Moreover, a snap button 6220A extends from the first arm 6215A at a location that is aligned with the aperture 6356A when the first arm 6215A is in a deployed position. The first arm 6215A is configured to pivot about the pivotal connection 6222A of the leg connector 6355A between a deployed position, illustrated in FIG. 33B, and a stowed position, illustrated in FIG. 33A. When in the deployed position, the first arm 6215A is aligned parallel with the arm of the leg connector 6355A, while the snap button 6220A extends within the opening 6356A, preventing the first arm 6215A from pivoting about pivotal connection 6222A. To reposition the first arm 6215A from the deployed position to the stowed position, the snap button 6220A must be pressed inward from the aperture 6356A and into the first arm 6215A. The first arm 6215A can then pivot about pivotal connection 6222A so that the first arm 6215A is parallel to the first upright arm 6345A of the forward leg member 6335 (not shown). Additionally, the arms of the leg connector 6355A include a bracket 6357A connecting one side of the leg connector 6355A to the other. In this embodiment, the bracket 6357A is configured to connect the arms of the leg connector 6355A over the top of the leg connector 6355A. Thus, when pivoting the first arm 6215A to the stowed position, the first arm 6215A can only be pivoted downwardly from the leg connector 6355A. Moreover, the bracket 6357A provides reinforcement to the arms of the leg connector 6355A, preventing the arms of the leg connector 6355A from bending outwardly from use and inadvertent side forces. If the bracket 6357A is not connected to the arms of the leg connector 6355A, and the arms of the leg connector 6355A are bent outwardly, the snap button 6220A will no longer extend into the aperture 6356A, and the first arm 6357A will no longer be able to be positioned in the deployed position.

Figure 34A:
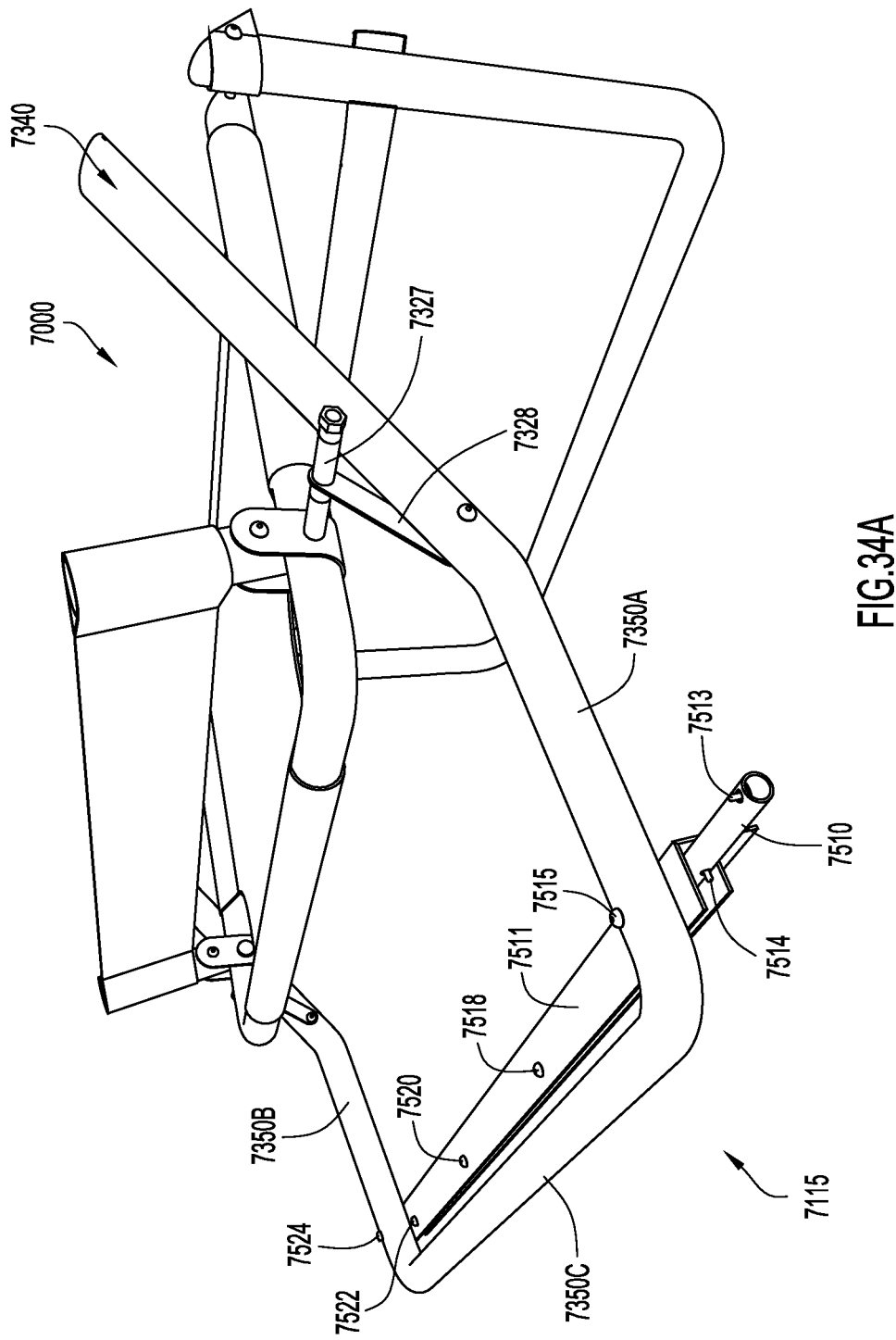

Turning to FIGS. 34A, 34B, and 34C, illustrated is another embodiment of a wheel assembly 7115 coupled to a cart 7000 with the wheels removed for illustration. While FIGS. 34B and 34C only illustrate one side of the wheel assembly 7115, the discussion of FIGS. 34B and 34C applies to the other side of wheel assembly 7115 that is identical, but mirrored, to wheel the side of the wheel assembly 7115 illustrated. The cart 7000 includes a second leg member 7340 that may be in the form of a generally U-shaped bar (e.g., a hollow cylinder), similar to the second leg member 3340 described for the cart 3000 and illustrated in FIGS. 24 and 25. The second leg member 7340 includes a first rearwardly angled arm or portion 7350A laterally spaced from a second rearwardly angled arm portion 7350B by an intermediate portion or crossbar 7350C. As illustrated, a housing 7511 is coupled to the first rearwardly angled arm 7350A and the second rearwardly angled arm 7350B. The housing 7511 is parallel to the crossbar 7350C. The housing 7511 may be coupled to the rearwardly angled arms 7350A, 7350B at a location proximate to the crossbar 7350C.

Furthermore, the housing 7511 is attached to the rearwardly angled arms 7350A, 7350B via bolts 7515, 7524. Bolt 7515 attaches the housing 7511 to the first rearwardly angled arm 7350A, while bolt 7524 attaches the housing 7511 to the second rearwardly angled arm 7350B.

As illustrated in FIGS. 34a, 34b, 34c, the housing 7511 includes three sides that form a channel 7512 with an open side that faces in the rearward direction of the cart 7000. Moreover, the housing 7511 includes four bolts 7516, 7518, 7520, 7522 that intersect the channel 7512 of the housing 7511. Furthermore, two axles 7510, 7530 (not illustrated) are slidingly engaged within the channel 7512. While FIGS. 34A, 34B, and 34C only illustrate the first axle 7510, the discussion of FIGS. 34A, 34B, and 34C applies to the second axle 7530 that is identical, but mirrored, to the first axle 7510 illustrated. First axle 7510 includes a first snap button 7513 disposed within and extending from one end of the axle 7510, and a protrusion 7517, such as a bolt or rivet, disposed through the other end of the axle 7510. As best illustrated in FIGS. 34B and 34C, the first snap button 7513 extends through an opening in the sidewall of the first axle 7510, and is oriented to extend in an upward direction away from the support surface. Furthermore, the protrusion 7517 extends from the sidewall of the first axle 7510 in a rearward direction, in the same direction of open side of the housing 7511. In addition, a second snap button 7514 is disposed within the first axle 7510 at a location intermediate the first snap button 7513 and the protrusion 7517. The second snap button 7514 extends through an opening in the sidewall of the first axle 7510, and is oriented to extend in a rearward direction, similar to that of the protrusion 7517. In other words, the second snap button 7514 and the protrusion 7517 extends from the first axle 7510 at an orientation that is ninety degrees offset from the direction that the first snap button 7513 extends from the first axle 7510.

Continuing with FIGS. 34B and 34C, illustrated is the first axle 7510 in a stowed position and a deployed position. The first axle 7510 has a length that enables it to extend into the channel 7512 and past two of the bolts 7516, 7518. The bolts 7516, 7518 intersect the channel 7512 of the housing 7511 at a distance spaced from the front side of the housing 7511 to slidingly engage first axle 7510 within the channel 7512 between bolts 7516, 7518 and the front side of the housing 7511. As illustrated in FIG. 34B, the first axle 7510 is inserted into the channel 7512 of the housing 7511 until the second snap button 7514 has slid past the first bolt 7516. Moreover, this places the first snap button 7513 adjacent to the end of the housing 7511. As further illustrated by FIG. 34B, when the first axle 7510 is in the stowed position, the protrusion 7517 is positioned away from the second bolt 7518. Furthermore, the positioning of the second snap button 7514 prevents the first axle 7510 from sliding outward from the housing 7511 to the deployed position because the second snap button 7514 extends from the first axle 7510 and contacts the first bolt 7516. Once the second snap button 7514 has been pushed inward towards the first axle 7510, the first axle 7510 is free to slide outward to the deployed position, illustrated in FIG. 34C. As illustrated in FIG. 34C, first axle 7510 slides out from the housing 7511 until the protrusion 7517 contacts the second bolt 7518. The contact between the housing second bolt 7518 and the protrusion 7517 prevents the first axle 7510 from sliding completely out of the housing 7511. However, in the deployed position, a portion of the first axle 7510 is positioned outside of the housing 7511. The portion of the axle 7510 that is between the first snap button 7513 and the housing 7511 when the axle is in the deployed position is sized and configured to receive a wheel (not shown). Therefore, the distance between the first snap button 7513 and the housing 7511 when the axle is in the deployed position is greater than the width of the wheel that is to be rotatably coupled to the axle 7510. Once the axle 7510 is to be repositioned from the deployed position to the stowed position, the second snap button 7514 must be pushed into the axle 7510 while the axle 7510 is slid into the channel 7512 until the second snap button 7514 passes the first bolt 7516, where the second snap button 7514 returns to extending from the sidewall of the axle 7510.

While the invention has been described in detail and with reference to specific embodiments thereof, it will be apparent to one skilled in the art that various changes and modifications can be made therein without departing from the spirit and scope thereof. It is to be understood that terms of reference such as "top", "bottom", "front", "rear", "side", "height", "length", "width", "upper", "lower", "interior", "exterior", and the like as may be used herein, merely describe points of reference and do not limit the present invention to any particular orientation or configuration. Similarly, various words and phrases, such as "perpendicular", and "parallel", are used to describe the location of the invention's components in space, direction, orientation or in relation to other components. Where applicable such, words and phrases also incorporate adjectives such as "approximately" to encompass the full range of embodiments possible. Thus, it is intended that the present invention covers the modifications and variations of this invention provided they come within the scope of the appended claims and their equivalents.

What is claimed is:

1. A collapsible cart comprising:
a support member defining a surface configured to support an object;
a first leg member coupled to the support member, the first leg member configured to pivot between a stowed position and a deployed position;
a second leg member coupled to the support member, the second leg member being spaced from the first leg member and configured to pivot between a stowed position and a deployed position;
at least one axle coupled to the second leg member, the at least one axle including a distal end, a proximal end, and at least one aperture disposed in the at least one axle proximate to the distal end of the axle, the at least one axle configured to removably receive at least one wheel proximate to the aperture; and
a resilient member disposed within the at least one axle and at least partially extending through the aperture in the at least one axle to retain the at least one wheel on the at least one axle when the resilient member extends through the aperture.

2. The collapsible cart of claim 1, wherein the first leg member and second leg member cooperate to support the support member over a surface when in the deployed position.

3. The collapsible cart of claim 1, wherein the at least one axle is slidable between a stowed position and a deployed position.

4. The collapsible cart of claim 1, wherein the aperture of the at least one axle is a first aperture and the at least one axle includes:
a second aperture disposed in the at least one axle proximate to the proximal end of the axle.

5. The collapsible cart of claim 4, wherein the resilient member is a first resilient member and further comprising:
a second resilient member disposed within the at least one axle and configured to at least partially extend through the second aperture of the at least one axle.

6. The collapsible cart of claim 5, wherein at least one wheel is a first wheel and further comprising:
a second wheel removably coupled to the at least one axle proximate to the second aperture, the second wheel being retained to the at least one axle when the second resilient member extends through the second aperture.

7. The collapsible cart of claim 5, wherein the first and second resilient members are snap buttons.

8. A cart comprising:
a support member defining a surface configured to support an object;
a first leg member coupled to the support member;
a second leg member coupled to the support member;
a housing coupled to the second leg member, the housing including an at least partially enclosed channel; and
at least one axle slidingly disposed within the at least partially enclosed channel and configured to slide between a deployed position and a stored position, the at least one axle extending from the housing in the deployed position, the at least one axle configured to removably receive at least one wheel when the at least one axle is in the deployed position.

9. The cart of claim 8, wherein the support member comprises a frame and supporting material coupled to the frame.

10. The cart of claim 8, wherein the first leg member and second leg member are pivotally coupled to the support member.

11. The cart of claim 10, wherein the first leg member and second leg member are pivotable between a stowed position to a deployed position, the first and second leg members cooperate to support the support member over a surface when in the deployed position.

12. The cart of claim 8, wherein the housing includes a distal end and a proximal end opposite the distal end.

13. The cart of claim 12, wherein the at least one axle is slidably received in the housing proximate to the distal end of the housing, the at least one axle extending from the distal end of the housing when the at least one axle is in the deployed position.

14. The cart of claim 13, wherein the at least one axle is a first axle and further comprising:
a second axle slidably received in the housing proximate to the proximal end of the housing, the second axle being configured to slide between a deployed position and a stored position where the second axle extends from proximal end of the housing when in the deployed position.

15. A cart comprising:
a support member defining a surface configured to support an object;
a first leg member coupled to the support member;
a second leg member coupled to the support member; and
at least one hollow axle coupled to the second leg member, the at least one hollow axle configured to slide between a deployed position and a stored position, the at least one axle configured to removably receive at least one wheel when the at least one hollow axle is in the deployed position.

16. The cart of claim 15, wherein the at least one hollow axle comprises a proximal end and a distal end, the distal end including an aperture.

17. The cart of claim 16, further comprising a pin removably disposed within the aperture to retain the at least one wheel on the at least one hollow axle when the at least one hollow axle is in the deployed position.

18. The cart of claim 16, further comprising a resilient member disposed in the distal end of the axle and configured to extend through the aperture, the resilient member retaining the at least one wheel on the at least one hollow axle when the at least one hollow axle is in the deployed position and the resilient member extends from the aperture.

\* \* \* \* \*